United States Patent
Beckham et al.

(10) Patent No.: US 12,460,176 B2
(45) Date of Patent: *Nov. 4, 2025

(54) ENGINEERED MICROORGANISMS FOR THE DECONSTRUCTION OF POLYMERS

(71) Applicants: Alliance for Sustainable Energy, LLC, Golden, CO (US); UT-Battelle, LLC, Oak Ridge, TN (US)

(72) Inventors: Gregg Tyler Beckham, Golden, CO (US); Thelhawadigedara Lahiru Niroshan Jayakody, Wheat Ridge, CO (US); Adam Michael Guss, Oak Ridge, TN (US); Thomas David Mand, Oak Ridge, TN (US); Christopher W. Johnson, Denver, CO (US); Isabel Pardo Mendoza, Dos Hermanas (ES)

(73) Assignees: Alliance for Sustainable Energy, LLC, Golden, CO (US); UT-Battelle, LLC, Oak Ridge, TN (US)

(*) Notice: Subject to any disclaimer, the term of this patent is extended or adjusted under 35 U.S.C. 154(b) by 1081 days.

This patent is subject to a terminal disclaimer.

(21) Appl. No.: 17/055,626

(22) PCT Filed: May 15, 2019

(86) PCT No.: PCT/US2019/032480
§ 371 (c)(1),
(2) Date: Nov. 16, 2020

(87) PCT Pub. No.: WO2019/222396
PCT Pub. Date: Nov. 21, 2019

(65) Prior Publication Data
US 2021/0180007 A1 Jun. 17, 2021

Related U.S. Application Data

(60) Provisional application No. 62/671,477, filed on May 15, 2018.

(51) Int. Cl.
*C12N 15/52* (2006.01)
*C12N 1/20* (2006.01)
*C12N 9/18* (2006.01)

(52) U.S. Cl.
CPC .............. *C12N 1/20* (2013.01); *C12N 9/18* (2013.01); *C12Y 301/01* (2013.01)

(58) Field of Classification Search
None
See application file for complete search history.

(56) References Cited

U.S. PATENT DOCUMENTS

2021/0285019 A1 9/2021 Beckham et al.

FOREIGN PATENT DOCUMENTS

CN 106754600 A 5/2017
CN 107794252 A 3/2018

OTHER PUBLICATIONS

BiologicsCorp, "Codon Optimization", Mar. 12, 2017, retrieved on Aug. 30, 2019 from https://web.archive.org/web/20170312215014/https:f/www .biologicscorp.com/codonoptimization-technical-platform/, pp. 1-5.
Elmore et al., "Development of a high efficiency integration system and promoter library for rapid modification of Pseudomonas putida KT244", Metabolic Engineering Communications, Dec. 2017, vol. 5, pp. 1-8.
Franden et al., "Engineering Pseudomonas putida KT2440 for efficient ethylene glycol utilization", Metabolic engineering, Jul. 2018, vol. 48, pp. 197-207.
Hara et al., "Transcriptomic analysis reveals a bifurcated terephthalate degradation pathway in Rhodococcus sp. strain RHA1", Journal of Bacteriology, Mar. 2007, vol. 189, No. 5, pp. 1641-1647.
Hosaka et al., "Novel Tripartie Aromatic Acid Transporter Essential for Terephthalate Uptake in Comamonas sp. Strain E6", Applied and Environmental Microbiology, Oct. 2013, vol. 79, No. 19, pp. 6148-6155.
Jayakody et al., "Thermochemical wastewater valorization via enhanced microbial toxicity tolerance", Energy & Environmental Science, 2018, vol. 11, pp. 16-25-16-38.
Rorrer et al., "Combining Reclaimed PET with Bio-based Monomers Enables Plastics Upcycling", Joule, Apr. 17, 2019, vol. 3, No. 4, pp. 1006-1027.
Sasoh et al., "Characterization of the Terephthalate Degradation Genes of Comamonas sp. Strain E6", Applied Environmental Microbiology, Mar. 2006, vol. 72, No. 3, pp. 1825-1832.
Yoshida et al., "Discovery of a Bacterium that Degrades and Assimilates Poly(ethylene A terephthalate) could Serve as a Degradation and/or Fermentation Platform for Biological Recycling of PET Waste Products", Press Release Kyoto Institute of Technology, Mar. 30, 2016, retrieved on Aug. 30, 2019 from https://www.keio.ac.jp/en/press releases/2016/cb96u90000005501-att/160330_2.pdf, pp. 1-4.
Yoshida et al., "A bacterium that degrades and assimilates poly(ethylene terephthalate)", Science, Mar. 11, 2016, vol. 351, No. 6278, pp. 1196-1199.

(Continued)

*Primary Examiner* — Jennifer E Graser
(74) *Attorney, Agent, or Firm* — Sam J. Barkley; Michael A. McIntyre

(57) ABSTRACT

Disclosed herein are engineered *P. putida* KT2440 co-expressing PETase and MHETase enzymes that selectively degrades PET into monomers, ethylene glycol and terephthalate (TPA). In another embodiment, disclosed herein are methods for making and using a highly efficient EG metabolizing *P. putida* KT2440 strain. Given that native *P. putida* does not have a TPA metabolic pathway, nor the proteins to transport TPA into the cell, the next metabolic engineering challenge for developing synthetic *P. putida* strain to plastic upcycling was enabling TPA catabolismin *P. putida* KT2440. TPA transporters and catabolic pathway have been characterized in several microorganisms including *Comamonas* sp. strain E6 and *Rhodococcus jostii* RHA1.

13 Claims, 29 Drawing Sheets

Specification includes a Sequence Listing.

(56) References Cited

OTHER PUBLICATIONS

International Search Report and Written Opinion for International (PCT) Application No. PCT/US19/32480, mail date Sep. 30, 2019, pp. 1-10.
Davos et al., "Practical Limits of Function Prediction", Proteins: Structure, Function, and Genetics, 2000, vol. 41, pp. 98-107.
Kisselev, "Polypeptide Release Factors in Prokaryotes and Eukaryotes: Sam Function, Different Structure", Structure, Jan. 2002, vol. 10, pp. 8-9.
Whisstock et al., "Prediction of protein function from protein sequence and structure", Quarterly Reviews of Biophysics, 2003, vol. 36, No. 3, pp. 307-340.
Witkowski et al., "Conversion of a Beta-Ketoacyl Synthase to a Malonyl Decarboxylase by Replacement of the Active-Site Cysteine with Glutamine", Biochemistry, 1999, vol. 38, No. 36, pp. 11643-11650.
Dvorak et al., "Bioremediation 3.0: Engineering pollutant-removing bacteria in the times of systemic biology", Biotechnology Advances, Aug. 2017, vol. 35, No. 5, pp. 845-866.
Patrauchan et al., "Catabolism of Benzoate and Phthalate in Rhodococcus sp. Strain RHA1: Redundancies and Converge", Journal of Bacteriology, Jun. 2005, vol. 187, No. 12, pp. 4050-4063.
Werner et al., "Tandem chemical deconstruction and biological upcycling poly(ethylene terephthalate) to [beta]- ketoadipic acid by Pseudomonas putida KT2440", Metabolic Engineering, Jul. 2021, vol. 67, pp. 250-261.
Extended European Search Report and Preliminary Opinion for European Application No. 19804066.9, dated Feb. 4, 2022, pp. 1-11.

(A) PETase (904 bp)

TCATCAAGTCAAAACACTATATAGGAACGAAACCATGAACTTCCCTCGCGCGTCGCGCCTGATGCAGGCGGCGGTCCTCGGTG
GTCTGATGGCAGTCAGCGCCGCGGCCACCGCTCAGACCAACCCATACGCCCGCGGCCCAAACCCTACCGCGGCCAGCCTGGAA
GCCTCTGCCGGCCCATTCACCGTGCGCAGCTTCACCGTCAGTCGCCCGTCGGGCTATGGTGCCGGCACCGTCTACTACCCAACC
AACGCTGGCGGCACCGTCGGCGCCATCGCAATCGTGCCGGGCTATACCGCCCGCCAGTCCTCGATCAAGTGGTGGGGCCCACG
TCTGGCCTCCCACGGCTTCGTTGTTATCACCATCGACACCAACTCGACCCTGGACCAGCCGTCCTCCCGCTCGAGCCAGCAGAT
GGCTGCTCTGCGCCAGGTAGCTTCGCTGAACGGCACCAGCTCTAGCCCAATCTACGGCAAAGTGGACACCGCTCGCATGGGCG
TGATGGGTTGGTCCATGGGCGGTGGTGGTTCCCTGATCTCCGCTGCTAATAATCCTTCCCTGAAGGCCGCCGCCCCGCAGGCCC
CATGGGACTCCTCGACCAACTTCTCGAGCGTGACCCGTGCCGACCCTGATCTTCGCTTGCGAAAACGACAGCATCGCTCCGGTG
AACTCCTCCGCGCTGCCTATCTACGACTCCATGAGCCGCAACGCCAAGCAATTCCTGGAAATCAACGGCGGTTCCCACTCCTGC
GCTAACTCGGGCAACTCGAACCAAGCCCTGATCGGCAAGAAGGGCGTAGCATGGATGAAGCGTTTCATGGATAACGACACCC
GTTACTCGACCTTCGCCTGCGAAAACCCGAACTCTACTCGCGTCAGCGACTTCCGCACTGCGAACTGCAGC

(B) MEHTase (1809 bp)

TAACAAGGATTACATATAAGGGTATATCAAATGCAGACCACCGTCACCACTATGCTGCTGGCATCGGTCGCCCTGGCCGCCTG
CGCAGGCGGCGGCAGCACCCCGCTGCCGCTGCCGCAGCAACAGCCGCCACAGCAGGAGCCGCCGCCTCCTCCAGTCCCGCTG
GCTTCCCGTGCTGCGTGTGAGGCCCTGAAGGACGGCAACGGGGACATGGTTTGGCCGAACGCCGCCACCGTAGTTGAAGTGGC
CGCATGGCGCGACGCTGCCCCGGCTACCGCGTCCGCCGCCGCTCTGCCGGAACACTGCGAAGTTAGCGGCGCCATCGCCAAGC
GCACTGGTATTGACGGTTATCCGTACGAAATCAAGTTCCGCCTGCGCATGCCGGCGGAGTGGAATGGCCGTTTCTTCATGGAG
GGTGGTTCCGGCACCAACGGCTCCCTGAGCGCGGCCACCGGCAGCATCGGTGGCGGCCAGATCGCCTCGGCCCTGTCCCGCAA
CTTCGCCACCATCGCGACCGACGGTGGCCACGACAACGCTGTCAACGACAATCCAGACGCCCTGGGTACGGTAGCGTTCGGCC
TGGACCCACAGGCTCGCCTGGACATGGGTTACAATTCGTACGACCAGGTGACCCAAGCTGGCAAAGCCGCCGTTGCCCGTTTC
TACGGCCGTGCCGCCGACAAGTCGTACTTCATCGGCTGCTCGGAAGGTGGTCGGGAGGGCATGATGCTCAGCCAACGCTTCCC
ATCCCACTACGACGGTATCGTCGCCGGTGCCCCTGGCTACCAGCTGCCTAAAGCCGGTATCTCGGGCGCTTGGACCACTCAGTC
GCTGGCCCCGGCGGCGGTGGGCCTGGACGCTCAGGGCGTCCCGCTGATCAACAAGAGCTTCTCCGATGCCGACCTGCACCTGC
TGTCGCAGGCCATCCTCGGTACTTGCGATGCGCTGGACGGCCTGGCTGACGGCATCGTTGACAACTACCGCGCGTGCCAGGCC
GCTTTCGACCCGGCTACCGCGGCTAACCCTGCCAACGGTCAAGCTCTGCAATGTGTGGGTGCCAAAACCGCCGATTGCCTGAG
CCCGGTACAGGTTACCGCCATCAAACGTGCAATGGCCGGCCCGGTCAACAGCGCCGGCACCCCGCTGTACAACCGTTGGGCCT
GGGACGCTGGTATGAGCGGCCTGTCCGGTACCACCTACAATCAGGGCTGGCGTTCCTGGTGGCTGGGTAGCTTCAACTCCTCG
GCGAACAACGCGCAGCGTGTTTCGGGTTTCTCCGCCCGCTCCTGGCTGGTCGACTTCGCCACCCCACCAGAGCCTATGCCGATG
ACCCAGGTGGCTGCACGCATGATGAAATTCGACTTCGACATCGACCCGCTGAAGATCTGGGCCACCAGCGGCCAGTTCACCCA
GTCGAGCATGGACTGGCACGGGGCCACCTCCACCGACCTGGCCGCCTTCCGCGATCGTGGCGGCAAGATGATCCTGTACCACG
GTATGAGCGACGCAGCCTTCTCGGCCCTGGACACCGCTGACTACTACGAACGCCTGGGCGCCGCTATGCCGGGCGCCGCGGGC
TTCGCTCGTCTGTTCCTCGTCCCAGGCATGAACCACTGTTCGGGCGGTCCAGGTACCGACCGTTTCGACATGCTGACCCCTCTG
GTGGCGTGGGTTGAGCGCGGCGAAGCCCCGGACCAGATCTCGGCGTGGAGCGGCACCCCAGGCTACTTCGGCGTCGCTGCCCG
TACCCGCCCGCTGTGCCCGTACCCGCAAATCGCACGCTACAAGGGTTCCGGCGATATCAACACCGAAGCAAACTTCGCCTGCG
CCGCGCCTCCG

FIGs. 6A-6B

| Plasmid sequence 5'-3' |
|---|
| TTGAGATCCTTTTTTTCTGCGCGTAATCTGCTGCTTGCAAACAAAAAAACCACCGCTACCAGCGGTGGTTTGTTTGCCGGATCA |
| AGAGCTACCAACTCTTTTTCCGAAGGTAACTGGCTTCAGCAGAGCGCAGATACCAAATACTGTTCTTCTAGTGTAGCCGTAGTT |
| AGGCCACCACTTCAAGAACTCTGTAGCACCGCCTACATACCTCGCTCTGCTAATCCTGTTACCAGTGGCTGCTGCCAGTGGCGA |
| TAAGTCGTGTCTTACCGGGTTGGACTCAAGACGATAGTTACCGGATAAGGCGCAGCGGTCGGGCTGAACGGGGGGTTCGTGCA |
| CACAGCCCAGCTTGGAGCGAACGACCTACACCGAACTGAGATACCTACAGCGTGAGCTATGAGAAAGCGCCACGCTTCCCGA |
| AGGGAGAAAGGCGGACAGGTATCCGGTAAGCGGCAGGGTCGGAACAGGAGAGCGCACGAGGGAGCTTCCAGGGGGAAACGC |
| CTGGTATCTTTATAGTCCTGTCGGGTTTCGCCACCTCTGACTTGAGCGTCGATTTTTGTGATGCTCGTCAGGGGGGCGGAGCCT |
| ATGGAAAAACGCCTCACACAGGAAACAGCTATGACATGATTACGAATTCGAGCTCGGTACCCGTGCGATTACTGTGGGAGCG |
| GGCATGCCCGCGAATGGGAGCAACACAAGGCTCAATGGTTGACGGTGTGCGCCAGCATCACCGACAACTGGCACAGCGGCCG |
| CCCGCTCTCTGCATGCCACTGGTTGAACGCCTGCTGCACCAGAGCCAGGTCGCGCTGGCTGGTTGGCTGCTTGTCGATCACCTT |
| CTGCGCAATCAACGCCGCTGCCATGTCATCGGTCGGGATGAACGTGTCCTTGCCGACCATGCGCAAGAACCGTGGCGCCGACA |
| ACCCGCCCAACTGGTTGCCGTGCTTGGCCAGGTACTCCACAAGCCGACAATGTCGGTCACTGGCCAATCGGCGATGAATGCA |
| CCAAAACTGCCATGCGCCTTTGCGATATCCAGCACCATTTGCGCATTGCGTGGCACTGTCTTGAGCTTGCCCAGGTGGCGGAT |
| AATGCGCTCATCCTGCATCAACCGCTCCAGATGCTCGGCGCCCATCAGCACCACTTTCTCCGGGTCGAAGCCAAAGAACACCT |
| GCTCGAACGCCGCCCACTTGGCATCCACCAGGCTGTGCTTGAGCCCCGCGCGGAACACGCGCAGGGCCAATGTCGACAGGTA |
| GCGGTCGTCACTGATGTCGCGCAGTTGCGCCGCGTGCGCGGCTGCGGCAGGAAAGCCTCCAGCGCCTGGGCCGAACCAAAG |
| CCGTTCAGGCAATACTCAGTGTGAAATTGTTATCCGCTCACAATTCCACACATTATACGAGCCGATGATTAATTGTCAACAGCT |
| CTTCATCAAGTCAAAACACTATATAGGAACGAAACCATGAACTTCCCTCGCGCGTCGCGCCTGATGCAGGCGGCGGTCCTCGG |
| TGGTCTGATGGCAGTCAGCGCCGCGGCCACCGCTCAGACCAACCCATACGCCCGCGGCCCAAACCCTACCGCGGCCAGCCTGG |
| AAGCCTCTGCCGGCCCATTCACCGTGCGCAGCTTCACCGTCAGTCGCCCGTCGGGCTATGGTGCCGGCACCGTCTACTACCCAA |
| CCAACGCTGGCGGCACCGTCGGCGCCATCGCAATCGTGCCGGGCTATACCGCCGCCAGTCCTCGATCAAGTGGTGGGCCCA |
| CGTCTGGCCTCCCACGGCTTCGTTGTTATCACCATCGACACCAACTCGACCCTGGACCAGCCGTCCTCCCGCTCGAGCCAGCAG |
| ATGGCTGCTCTGCGCCAGGTAGCTTCGCTGAACGGCACCAGCTCTAGCCCAATCTACGGCAAAGTGGACACCGCTCGCATGGG |
| CGTGATGGGTTGGTCCATGGGCGGTGGTGGTTCCCTGATCTCCGCTGCTAATAATCCTTCCCTGAAGGCCGCCGCCCCGCAGGC |
| CCCATGGGACTCCTCGACCAACTTCTCGAGCGTGACCGTGCCGACCCTGATCTTCGCTTGCGAAAACGACAGCATCGCTCCGGT |
| GAACTCCTCCGCGCTGCCTATCTACGACTCCATGAGCCGCAACGCCAAGCAATTCCTGGAAATCAACGGCGGTTCCCACTCCT |
| GCGCTAACTCGGGCAACTCGAACCAAGCCCTGATCGGCAAGAAGGGCGTAGCATGGATGAAGCGTTTCATGGATAACGACAC |
| CCGTTACTCGACCTTCGCCTGCGAAAACCCGAACTCTACTCCGGTCAGCGACTTCCGCACTGCGAACTGCAGCCTATAACAAG |
| GATTACATATAAGGGTATATCAAATGCAGACCACCGTCACCACTATGCTGCTGGCATCGGTCGCCCTGGCCGCCTGCGCAGGC |
| GGCGGCAGCACCCCGCTGCCGCTGCCCGCAGCAACAGCCGCCACAGCAGGAGCCGCCGCCTCCTCCAGTCCCGCTGGCTTCCCG |
| TGCTGCGTGTGAGGCCCTGAAGGACGGCAACGGGGACATGGTTTGGCCGAACGCCGCCACCGTAGTTGAAGTGGCCGCATGG |
| CGCGACGCTGCCCCGGCTACCGCGTCCGCCGCCGCTCTGCCGGAACACTGCGAAGTTAGCGGCGCCATCGCCAAGCGCACTGG |
| TATTGACGGTTATCCGTACGAAATCAAGTTCCGCCTGCGCATGCCGGCGGGAGTGGAATGGCCGTTTCTTCATGGAGGGTGGTTC |
| CGGCACCAACGGCTCCCTGAGCGCGGCCACCGGCAGCATCGGTGGCGGCCAGATCGCCTCGGCCCTGTCCGCAACTTCGCCA |
| CCATCGGCGACCGACGGTGGCCACGACAACGCTGTCAACGACAATCCAGACGCCCTGGGTACCGGTAGCGTTCGGCCTGGACCCA |
| CAGGCTCGCCTGGACATGGTTACAATTCGTACGACCAGGTGACCCAAGCTGGCAAAGCCGCCGTTGCCCGTTTCTACGGCCG |
| TGCCGCCGACAAGTCGTACTTCATCGGCTGCTCGGAAGGTGGTCGGGAGGGCATGATGCTCAGCCAACGCTTCCCATCCCACT |
| ACGACGGTATCGTCGCCGGTGCCCCTGGCTACCAGCTGCCTAAAGCCGGTATCTCGGGCGCTTGGACCACTCAGTCGCTGGCC |
| CCGGCGGCGGTGGGCCTGGACGCTCAGGGCGTCCCGCTGATCAACAAGAGCTTCTCCGATGCCGACCTGCACCGCTGTCGCA |
| GGCCATCCTCGGTACTTGCGATGCGCTGGACGCCCTGGCTGACGGCATCGTTGACAACTACCGCGCGTGCCAGGCCGCTTTCG |
| ACCCGGCTACCGCGGCTAACCCTGCCAACGGTCAAGCTCTGCAATGTGTGGGTGCCAAAACCGCCGATTGCCTGAGCCCGGTA |
| CAGGTTACCGCCATCAAACGTGCAATGCCCGGCCCGGTCAACAGCGCCGGCACCCGCTGTACAACCGTTGGGCCTGGGACGC |
| TGGTATGAGCGGCCTGTCCGGTACCACCTACAATCAGGGCTGGCGTCCTGGTGGCTGGGTAGCTTCAACTCCTCGGCGAACA |
| ACGCGCAGCGTGTTTCGGGTTTCTCCGCCCGCTCCTGGCTGGTCGACTTCGCCACCCCACCAGAGCCTATGCCGATGACCAGG |
| TGGCTGCACGCATGATGAAATTCGACTTCGACATCGACCCGCTGAAGATCTGGGCCACCAGCGGCCAGTTCACCCAGTCGAGC |

FIG. 8

```
ATGGACTGGCACGGGGCCACCTCCACCGACCTGGCCGCCTTCCGCGATCGTGGCGGCAAGATGATCCTGTACCACGGTATGAG
CGACGCAGCCTTCTCGGCCCTGGACACCGCTGACTACTACGAACGCCTGGGCGCCGCTATGCCGGGCGCCGCGGGCTTCCGCTC
GTCTGTTCCTCGTCCCAGGCATGAACCACTGTTCGGGCGGTCCAGGTACCGACCGTTTCGACATGCTGACCCTCTGGTGGCGT
GGGTTGAGCGCGGCGAAGCCCCGGACCAGATCTCGGCGTGGAGCGGCACCCCAGGCTACTTCGGCGTCGCTGCCCGTACCCGC
CCGCTGTGCCCGTACCCGCAAATCGCACGCTACAAGGGTTCCGGCGATATCAACACCGAAGCAAACTTCGCCTCGCCGCGCC
TCCGAGTCAAAAGCCTCCGGTCGGAGGCTTTTGACTTCAAAACCACCCTGCTGTCGATGATGCTGCCGCTGATGCACCACGGC
ATGCTGGTGATGGCCTGCCTACAGCGAGTCGGCACTGCTCGAGACCCGTGGTGGCGCACGCCTTATGGCGCCAGCGTACCA
CGCAGGCGCCGATGGCAAGCGCGAACTCGACCCACACGAAATCGCCCTGTGCCCGCGCCCTGGGGCAACGCCTGGCGACCACG
GCCAAGGCCCTGGAGGCGGCGCGTGGCTAGAAAGCCCAAGGCATTGCCGCCCGGTCCAATGGCTGGTACCACGCCTGCGCCTG
ACGCGGGCATTGAGCCTGGCATGCTTCTTCGGCCCTGATCGCCCTGCTGGTGGTGAACAACCTGTGGTTCGCCAACCTGCATGGG
GCCAGGGTCGAGGTGATCCTGGCGATCGAGCTGGTGCCGTTGCTGTTGCTGTTGCCAGGCATGCTGAAAGGCAGCGCCCGGGC
GCATGCCTGGACCTGCTTCGTGGTGAATATCTATTTCATCAAGGGCGTGCTGGCGGCGGTTCGACCCGGCGCGGGCGGTATTCG
GCTGGCTTGAAGTGCTGGTGAGCCTGGGGCTGTTCATTGCCGGGCTACTGTACGTGCGCTGGAAGTTCCAGCATGAGCGGCGC
ATGGCGGCGAAGGCAGTTAGATTTCCTGCAGGCATGCAAGCTTGGCACTGGCCGTCGTTTTACAACGTCGTGACCGGAATTG
CCAGCTGGGGCGCCCTCTGGTAAGGTTGGGAAGCCCTGCAAACAGGATGAGGATCGTTTCGCATGATTGAACAAGATGGATTG
CACGCAGGTTCTCCGGCCGCTTGGGTGGAGAGGCTATTCGGCTATGACTGGGCACAACAGACAATCGGCTGCTCTGATGCCGC
CGTGTTCCGGCTGTCAGCGCAGGGGCGCCCGGTTCTTTTTGTCAAGACCGACCTGTCCGGTGCCCTGAATGAACTCCAAGACG
AGGCAGCGCGGCTATCGTGGCTGGCCACGACGGGCGTTCCTTGCGCAGCTGTGCTCGACGTTGTCACTGAAGCGGGAAGGGAC
TGGCTGCTATTGGGCGAAGTGCCGGGGCAGGATCTCCTGTCATCTCACCTTGCTCCTGCCGAGAAAGTATCCATCATGGCTGAT
GCAATGCGGCGGCTGCATACGCTTGATCCGGCTACCTGCCCATTCGACCACCAAGCGAAACATCGCATCGAGCGAGCACGTAC
TCGGATGGAAGCCGGTCTTGTCGATCAGGATGATCTGGACGAAGAGCATCAGGGGCTCGCGCCAGCCGAACTGTTCGCCAGGC
TCAAGGCGCGGATGCCCGACGGCGAGGATCTCGTCGTGACCCATGGCGATGCCTGCTTGCCGAATATCATGGTGGAAAATGGC
CGCTTTTCTGGATTCATCGACTGTGGCCGGCTGGGTGTGGCGGACCGCTATCAGGACATAGCGTTGGCTACCCGTGATATTGCT
GAAGAGCTTGGCGGCGAATGGGCTGACCGCTTCCTCGTGCTTTACGGTATCGCCGCTCCCGATTCGCAGCGCATCGCCTTCTAT
CGCCTTCTTGACGAGTTCTTCTGAGCGACGATGAACATCAAAAAGTTTGCAAAACAAGCAACAGTATTAACCTTTACTACCGC
ACTGCTGGCAGGAGGCGCAACTCAAGCGTTTGCGAAAGAAACGAACCAAAAGCCATATAAGGAAACATACGGCATTTCCCAT
ATTACACGCCATGATATGCTGCAAATCCCTGAACAGCAAAAAAATGAAAAATATCAAGTTTCTGAATTTGATTCGTCCACAAT
TAAAAATATCTCTTCTGCAAAAGGCCTGGACGTTTGGGACAGCTGGCCATTACAAAACGCTGACGGCACTGTCGCAAACTATC
ACGGCTACCACATCGTCTTTGCATTAGCCGGAGATCCTAAAAATGCGGATGACACATCGATTTACATGTTCTATCAAAAAGTC
GGCGAAACTTCTATTGACAGCTGGAAAAACGCTGGCCGCGTCTTTAAAGACAGCGACAAATTCGATGCAAATGATTCTATCCT
AAAAGACCAAACACAAGAATGGTCAGGTTCAGCCACATTTACATCTGACGGAAAAATCCGTTTATTCTACACTGATTTCTCCG
GTAAACATTACGGCAAACAAACACTGACAACTGCACAAGTTAACGTATCAGCATCAGACAGCTCTTTGAACATCAACGGTGTA
GAGGATTATAAATCAATCTTTGACGGTGACGGAAAAACGTATCAAAATGTACAGCAGTTCATCGATGAAGGCAACTACAGCTC
AGGCGACAACCATACGCTGAGAGATCCTCACTACGTAGAAGATAAAGGCCACAAATACTTAGTATTTGAAGCAAACACTGGA
ACTGAAGATGGCTACCAAGGCGAAGAATCTTTATTTAACAAAGCATACTATGGCAAAAGCACATCATTCTTCCGTCAAGAAAG
TCAAAAACTTCTGCAAAGCGATAAAAAACGCACGGCTGAGTTAGCAAACGGCGCTCTCGGTATGATTGAGCTAAACGATGATT
ACACACTGAAAAAAGTGATGAAACCGCTGATTGCATCTAACACAGTAACAGATGAAATTGAACGCGCGAACGTCTTTAAAAT
GAACGGCAAATGGTACCTGTTCACTGACTCCCGCGGATCAAAAATGACGATTGACGGCATTACGTCTAACGATATTTACATGC
TTGGTTATGTTTCTAATTCTTTAACTGGCCCATACAAGCCGCTGAACAAAACTGGCCTTGTGTTAAAAATGGATCTTGATCCTA
ACGATGTAACCTTTACTTACTCACACTTCGCTGTACCTCAAGCGAAAGGAAACAATGTCGTGATTACAAGCTATATGACAAAC
AGAGGATTCTACGCAGACAAACAATCAACGTTTGCGCCGAGCTTCCTGCTGAACATCAAAGGCAAGAAAACATCTGTTGTCAA
AGACAGCATCCTTGAACAAGGACAATTAACAGTTAACAAATAATCAGACCCCGTAGAAAAGATCAAGGATCTTC
```

FIG. 8 (continued)

| (A) *PETase* |
|---|
| MNFPRASRLMQAAVLGGLMAVSAAATAQTNPYARGPNPTAASLEASAGPFTVRSFTVSRPSGYGAGTVYYPTNAGGTVGAIAIV PGYTARQSSIKWWGPRLASHGFVVITIDTNSTLDQPSSRSSQQMAALRQVASLNGTSSSPIYGKVDTARMGVMGWSMGGGGSLISA ANNPSLKAAAPQAPWDSSTNFSSVTVPTLIFACENDSIAPVNSSALPIYDSMSRNAKQFLEINGGSHSCANSGNSNQALIGKKGVAW MKRFMDNDTRYSTFACENPNSTRVSDFRTANCS* |
| (B) *MEHTase* |
| MQTTVTTMLLASVALAACAGGGSTPLPLPQQQPPQQEPPPPPVPLASRAACEALKDGNGDMVWPNAATVVEVAAWRDAAPATA SAAALPEHCEVSGAIAKRTGIDGYPYEIKFRLRMPAEWNGRFFMEGGSGTNGSLSAATGSIGGGQIASALSRNFATIATDGGHDNAV NDNPDALGTVAFGLDPQARLDMGYNSYDQVTQAGKAAVARFYGRAADKSYFIGCSEGGREGMMLSQRFPSHYDGIVAGAPGYQL PKAGISGAWTTQSLAPAAVGLDAQGVPLINKSFSDADLHLLSQAILGTCDALDGLADGIVDNYRACQAAFDPATAANPANGQALQC VGAKTADCLSPVQVTAIKRAMAGPVNSAGTPLYNRWAWDAGMSGLSGTTYNQGWRSWWLGSFNSSANNAQRVSGFSARSWLV DFATPPEPMPMTQVAARMMKFDFDIDPLKIWATSGQFTQSSMDWHGATSTDLAAFRDRGGKMILYHGMSDAAFSALDTADYYER LGAAMPGAAGFARLFLVPGMNHCSGGPGTDRFDMLTPLVAWVERGEAPDQISAWSGTPGYFGVAARTRPLCPYPQIARYKGSGDI NTEANFACAAPP |

FIGs. 9A-9B

| PETase_GFP 5'-3' |
|---|
| ATCATTCAGGACGAGCCTCAGACTCCAGCGTAACTGGACTGAAAACAAACTAAAGCGCCCTTGTGGCGCTTTAGTTTTGTTCC
GCGGCCACCGGCTGGCTCGCTTCGCTCGGCCCGTGGACAACCCTGCTGGACAAGCTGATGGACAGGCTGCGCCTGCCCACGAG
CTTGACCACAGGGATTGCCCACCGGCTACCCAGCCTTCGACCACATACCCACCGGCTCCAACTGCGCGGCCTGCGGCCTTGCC
CCATCAATTTTTTTAATTTTCTCTGGGGAAAAGCCTCCGGCCTGCGGCCTGCGCGCTTCGCTTGCCGGTTGGACACCAAGTGGA
AGGCGGGTCAAGGCTCGCGCAGCGACCGCGCAGCGGCTTGGCCTTGACGCGCCTGGAACGACCCAAGCCTATGCGAGTGGGG
GCAGTCGAAGGCGAAGCCCGCCCGCCTGCCCCCCGAGCCTCACGGCGGCGAGTGCGGGGGTTCCAAGGGGGCAGCGCCACCT
TGGGCAAGGCCGAAGGCCGCGCAGTCGATCAACAAGCCCCGGAGGGGCCACTTTTTGCCGGAGGGGGAGCCGCGCCGAAGGC
GTGGGGGAACCCCGCAGGGGTGCCCTTCTTTGGGCACCAAAGAACTAGATATAGGGCGAAATGCGAAAGACTTAAAAATCAA
CAACTTAAAAAAGGGGGGTACGCAACAGCTCATTGCGGCACCCCCCGCAATAGCTCATTGCGTAGGTTAAAGAAAATCTGTAA
TTGACTGCCACTTTTACGCAACGCATAATTGTTGTCGCGCTGCCGAAAAGTTGCAGCTGATTGCGCATGGTGCCGCAACCGTGC
GGCACCCTACCGCATGGAGATAAGCATGGCCACGCAGTCCAGAGAAATCGGCATTCAAGCCAAGAACAAGCCGGTCACTGG
GTGCAAACGGAACGCAAAGCGCATGAGGCGTGGGCCGGGCTTATTGCGAGGAAACCCACGGCGGCAATGCTGCTGCATCACC
TCGTGGCGCAGATGGGCCACCAGAACGCCGTGGTGGTCAGCCAGAAGACACTTTCCAAGCTCATCGGACGTTCTTTGCGGACG
GTCCAATACGCAGTCAAGGACTTGGTGGCCGAGCGCTGGATCTCCGTCGTGAAGCTCAACGGCCCCGGCACCGTGTCGGCCTA
CGTGGTCAATGACCGCGTGGCGTGGGGCCAGCCCCGCGACCAGTTGCGCCTGTCGGTGTTCAGTGCCGCCGTGGTGGTTGATC
ACGACGACCAGGACGAATCGCTGTTGGGGCATGGCGACCTGCGCCGCATCCCGACCCTGTATCCGGGCGAGCAGCAACTACC
GACCGGCCCCGGCGAGGAGCCGCCCAGCCAGCCCGGCATTCCGGGCATGGAACCAGACCTGCCAGCCTTGACCGAAACGGAG
GAATGGGAACGGCGCGGGCAGCAGCGCCTGCCGATGCCCGATGAGCCGTGTTTTCTGGACGATGGCGAGCCGTTGGAGCGC
CGACACGGGTCACGCTGCCGCGCCGGTAGTACGTAAGAGGTTCCAACTTTCACCATAATGAAATAAGATCACTACCGGGCGTA
TTTTTTGAGTTATCGAGATTTTCAGGAGCTAAGGAAGCTAAAATGAGCCATATTCAACGGGAAACGTCTTGCTCGAGGCCGCG
ATTAAATTCCAACATGGATGCTGATTTATATGGGTATAAATGGGCTCGCGATAATGTCGGGCAATCAGGTGCGACAATCTATC
GATTGTATGGGAAGCCCGATGCGCCAGAGTTGTTTCTGAAACATGGCAAAGGTAGCGTTGCCAATGATGTTACAGATGAGATG
GTCAGGCTAAACTGGCTGACGGAATTTATGCCTCTTCCGACCATCAAGCATTTTATCCGTACTCCTGATGATGCATGGTTACTC
ACCACTGCGATCCCAGGGAAAACAGCATTCCAGGTATTAGAAGAATATCCTGATTCAGGTGAAAATATTGTTGATGCGCTGGC
AGTGTTCCTGCGCCGGTTGCATTCGATTCCTGTTTGTAATTGTCCTTTTAACGGCGATCGCGTATTTCGTCTCGCTCAGGCGCAA
TCACGAATGAATAACGGTTTGGTTGGTGCGAGTGATTTTGATGACGAGCGTAATGGCTGGCCTGTTGAACAAGTCTGGAAAGA
AATGCATAAGCTTTTGCCATTCTCACCGGATTCAGTCGTCACTCATGGTGATTTCTCACTTGATAACCTTATTTTTGACGAGGGG
AAATTAATAGGTTGTATTGATGTTGGACGAGTCGGAATCGCAGACCGATACCAGGATCTTGCCATCCTATGGAACTGCCTCGG
TGAGTTTTCTCCTTCATTACAGAAACGGCTTTTTCAAAAATATGGTATTGATAATCCTGATATGAATAAATTGCAGTTTCACTTG
ATGCTCGATGAGTTTTTCTGAGGGCGGATCCCCCTCAAGTCAAAAGCCTCCGGTCGGAGGCTTTTGACTTTCTGCTATGGAGGT
CAGGTATGATTTTGCATTAGGCACCCCAGGCTTTACACTTTATGCTTCCGGCTCGTATGTTGTGTGGAATTGTGAGCGGATAAC
AATTTCACACTTTCATCAAGTCAAAACACTATATAGGAACGAAACCATGAACTTCCCTCGCGCGTCGCGCCTGATGCAGGCGG
CGGTCCTCGGTGGTCTGATGGCAGTCAGCGCCGCGGCCACCGCTCAGACCAACCCATACGCCGGCGGCCCAAACCCTACCGCG
GCCAGCCTGGAAGCCTCTGCCGGCCCATTCACCGTGCGCAGCTTCACCGTCAGCCGTCCGTCGGGCTATGGTGCCGGCACCGT
CTACTACCCAACCAACGCTGGCGGCACCGTCGGCGCCATCGCAATCGTGCCGGGCTATACCGCCCGCCAGTCCTCGATCAAGT
GGTGGGGCCCACGTCTGGCCTCCCACGGCTTCGTTGTTATCACCATCGACACCAACTCGACCCTGGACCAGCCGTCCTCCCGCT
CGAGCCAGCAGATGGCTGCTCTGCGCCAGGTAGCTTCGCTGAACGGCACCAGCTCTAGCCCAATCTACGGCAAAGTGGACACC
GCTCGCATGGGCGTGATGGGTTGGTCCATGGGCGGTGGTGGTTCCCTGATCTCCGCTGCTAATAATCCTTCCCTGAAGGCCGCC
GCCCCGCAGGCCCCATGGGACTCCTCGACCAACTTCTCGAGCGTGACCGTGCCGACCCTGATCTTCGCTTGCGAAAACGACAG
CATCGCTCCGGTGAACTCCTCCGCGCTGCCCTATCTACGACTCCATGAGCCGCAACGCCAAGCAATTCCTGGAAATCAACGGCG
GTTCCCACTCCTGCGCTAACTCGGGCAACTCGAACCAAGCCCTGATCGGCAAGAAGGGCGTAGCATGGATGAAGCGTTTCATG
GATAACGACACCCGTTACTCGACCTTCGCCTGCGAAAACCCGAACTCTACTCGCGTCAGCGACTTCCGCACTGCGAACTGCAG
CGGTGGTTCTGAGGAATCTTACATGAGCAAGGGCGAGGAGCTCTTTACCGGCGTCGTCCCCATTCTCGTTGAGCTGGACGGCG
ACGTGAACGGACATAAGTTCAGTGTCTCGGGCGAGGGCGAAGGAGATGCCACCTATGGGAAGCTAACCCTGAAGTTCATCTG
CACAACCGGGAAGCTGCCGGTCCCCTGGCCGACGCTGGTTACCACCCTGACCTACGGCGTGCAATGCTTCTCGCGCTACCCTG
ACCACATGAAGCGCCACGACTTCTTCAAATCCGCTATGCCGGAGGGCTACGTCCAGGAACGCACCATATTCTTCAAGGACGAC
GGTAACTACAAGACGCGCGCCGAAGTCAAGTTCGAGGGGGATACCCTCGTGAACCGAATCGAGTTGAAGGGGATCGACTTCA
AGGAAGATGGCAACATCCTCGGCCACAAACTGGAGTACAACTACAATTCGCATAACGTGTACATCATGGCCGACAAGCAGAA
GAATGGCATCAAGGTGAACTTCAAGATTCGCCACAACATCGAGGACGGGTCCGTTCAGCTGGCCGACCACTATCAGCAGAAC
ACACCAATTGGAGACGGCCCCGTCCTGCTCCCCGATAACCATTACCTTTCGACACAGTCGGCGCTGTCGAAGGACCCGAACGA
AAAGCGGGACCACATGGTGCTCCTGGAGTTCGTCACGGCGGCCGGGATCACGCACGGAATGGACGAACTCTACAAGTAG |

FIG. 11

```
ATGCGTAACGAATCTATCCGTCGTCGTGAAGCGTTAATTGGTATCGCTGCAGCAGTTGCAGCAACTGGTT
CACTCGCTCAAAGTAACCAACCACTGAAAATCGTTGTGCCTTTTCTGCAGGTGGTACAGCGGACGTATT
ACCACGTCTTGTCGCTGAAAAAATCCGTGCCGATTATGCTGGTGGTGTTATCATCGAAAACAAACCAGGT
GCAGGTGGTAATATTGGTGCAGATCTAGTTTTCCGTGCTCCACCAGACGGTATGACGGTTTTAGCTTCAC
CACCTGGTCCTATCGCTATTAATCACAATCTTTATCAAAAATTATCTTTCGATCCTACTCGTTGGGTACC
AGTAACCATTCTGGCAACAGTTCCTAACGTACTTGTAATTAACCCAAAACTACCTGTTAAAAGCcttGGC
GAATTTATCGCATACGCAAAAGCAAATCCAAAGAAAGTAACCGTAGCGACTCAAGGTGACGGTTCTACTT
CACACCTTACAGCAGCAATGTTTATGCAATTAACTGGTACAGAACTAACTGTTATCCCATACAAAGGTAC
AGCACCAGCTTTAATCGATCTTATTGGTGGTAATGTAGACGTGTTTTTCGATAATATCAGCTCTTCTGCA
ACTTATCACCAAGCAGGAAAAGTTCGTATTCTTGCAGTTGCTGATGAACAACGTTCACAAATTCTTCCAC
AAGTTCCAACGTTCGCAGAACAACAGTGGCCAGCAATGCAAGCTGTGACATTTTTCTCAGTAGTGGCACC
TCCTGGTACATCAGCAGAAATCGCACAAAAACTTCAAAAACAGATGGCTCTTGCCCTTTCTTCGAACGAT
ATTCGTAAGCACTTCCAGGAACAAGGTGCTGTGCCATGTGGTTGGGATCCAAGTAAAACTGCTCAATTTA
TTCGTCAGGAAACCGAAAAATGGAAGAAAGTACTCAAAGCAGCAAACGTAAAACTTTAA
```

FIG. 12

```
ATGCAGGAAAGCATTATTCAATGGCATGGTGCGACCAACACACGCGTTCCATTTGGTATCTATACAGATA
CCGCAAATGCTGACCAAGAACAACAGCGTATTTACCGTGGCGAAGTATGGAATTACCTTTGTTTGGAATC
AGAAATCCCAGGAGCGGGTGATTTTCGTACCACATTTGCGGGTGAAACACCTATTGTCGTAGTTCGTGAT
GCTGATCAAGAAATTTATGCTTTCGAAAATCGTTGTGCTCACCGTGGTGCTTTAATTGCATTAGAAAAGA
GCGGTCGTACTGATTCTTTTCAATGTGTTTATCATGCATGGTCATATAACCGTCAGGGTGACCTTACGGG
TGTGGCTTTCGAAAAGGCGTAAAAGGTCAGGGTGGTATGCCAGCTAGTTTCTGTAAAGAAGAACATGGT
CCACGTAAACTTCGCGTAGCAGTTTTCTGCGGCTTGGTTTTCGGTTCTTTTTCTGAAGACGTTCCAAGTA
TTGAAGATTATTTGGGTCCGGAAATTTGTGAACGTATCGAACGTGTTCTCCATAAGCCTGTAGAAGTTAT
CGGTCGTTTTACTCAGAAATTACCTAATAACTGGAAACTTTATTTTGAAAATGTAAAAGATAGCTACCAT
GCATCTCTTTTACACATGTTTTTCACAACTTTCGAACTGAACCGTTTATCTCAGAAAGGCGGTGTTATTG
TGGATGAGTCTGGCGGCCATCATGTATCCTATAGTATGATTGATCGTGGGGCCAAGGATGATTCATATAA
AGATCAAGCTATTCGTTCTGACAATGAACGTTATCGTTTGAAAGATCCTAGCTTACTAGAAGGTTTTGAA
GAATTCGAAGATGGTGTAACGCTTCAAATTCTTAGCGTATTCCCAGGGTTTGTTTTGCAACAAATCCAAA
ACAGTATTGCAGTGCGTCAGTTATTGCCAAAAAGTATTTCTAGTTCTGAATTGAACTGGACTTATTTAGG
TTATGCCGATGATAGCGCAGAACAACGTAAAGTTCGTCTTAAACAAGCTAATCTGATTGGACCTGCTGGA
TTCATTTCAATGGAAGATGGTGCAGTCGGCGGTTTCGTGCAGCGTGGTATTGCAGGCGCTGCTAACCTTG
ATGCAGTAATCGAAATGGGCGGTGATCATGAAGGCAGCTCTGAAGGTCGCGCTACTGAAACTtcaGTACG
TGGCTTTTGGAAAGCATATCGTAAACATATGGGACAAGAAATGCAGGCATGA
```

FIG. 13

ATGATCAATGAAATACAGATCGCAGCATTTAATGCAGCATATGCAAAAACTATTGACTCTGATGCTATGG
AACAATGGCCTACCTTTTTTACTAAAGATTGCCATTATTGTGTAACGAATGTAGATAATCATGATGAGGG
TTTAGCTGCTGGTATAGTTTGGGCAGATTCACAGGACATGTTGACTGATCGTATCTCAGCTTTGCGTGAA
GCGAACATTTACGAACGTCACCGCTATCGTCACATCTTAGGTCTGCCATCAATTCAATCAGGTGATGCAA
CGCAGGCATCAGCTAGCACACCTTTCATGGTTCTTCGTATCATGCATACTGGCGAAACGGAGGTTTTCGC
ATCGGGTGAATATCTCGATAAATTCACTACTATTGATGGTAAATTGCGCCTTCAGGAACGTATTGCTGTT
TGTGACTCTACAGTAACCGATACCTTAATGGCATTGCCATTATGA

FIG. 14

ATGAACGCAATTGTTCACCGCCGTCTTGCACTTGCAATTGGTGATCCACATGGTATTGGTCCTGAAATCG
CATTGAAAGCTCTTCAACAGCTTTCGGTAACTGAACGTAGCTTAATTAAAGTATACGGTCCGTGGTCTGC
ACTTGAACAAGCAGCACGCGTTTGCGAAATGGAACCACTCTTACAAGATATCGTACACGAAGAAGCAGGT
ACCTTGACCCAACCAGTACAGTGGGGTGAAATTACACCACAAGCTGGTCTTAGTACAGTACAATCAGCTA
CTGCTGCGATCCGTGCATGTGAAAATGGTGAGGTAGATGCAGTTATTGCGTGTCCACACCATGAAACTGC
AATCCACCGTGCTGGTATCGCCTTCTCTGGTTATCCAAGCcttTTAGCGAATGTGTTGGGTATGAACGAA
GATCAAGTTTTTCTTATGTTGGTTGGTGCTGGTCTTCGTATCGTTCATGTGACTCTACACGAATCTGTAC
GTTCTGCACTTGAACGTCTTTCTCCACAACTTGTTGTAAATGCAGCACAAGCAGCAGTTCAAACCTGTAC
ATTGCTTGGTGTTCCTAAACCGAAAGTGGCAGTGTTCGGCATTAACCCACATGCATCAGAAGGTCAACTT
TTCGGCTTGGAAGATAGCCAAATTACCGTTCCAGCAGTTGAAACCCTTCGTAAACGTGGTCTAGCTGTTG
ATGGTCCAATGGGTGCGGATATGGTACTGGCACAACGTAAACATGATTTATATGTTGCGATGCTTCATGA
TCAGGGTCATATACCAATTAAACTTCTTGCACCAAATGGTGCGAGTGCTCTCTCAATCGGTGGTCGTGTT
GTATTGTCATCAGTTGGACACGGCAGCGCAATGGACATCGCTGGCCGTGGCGTAGCTGATGCCACTGC
TCTTTTACGTACCATTGCTCTTCTTGGCGCTCAGCCAGTTTGA

FIG. 15

```
ATGAACCATCAAATCCACATCCATGACTCAGATATTGCATTTCCATGTGCACCTGGTCAATCAGTTTTGG
ATGCGGCCTTACAAGCAGGTATCGAATTGCCTTATAGCTGCCGTAAAGGTTCATGTGGGAATTGTGCAAG
TACTCTTTTAGATGGTAATATTGCATCTTTCAACGGTATGGCTGTTCGTAATGAATTATGTGCGTCTGAA
CAAGTGTTATTGTGTGGTTGCACGGCGGCATCTGATATACGTATTCATCCTTCTTCTTTCCGTCGTCTTG
ACCCAGAAGCTCGTAAACGTTTCACTGCTAAGGTATATTCAAATACTCTTGCTGCTCCAGATGTATCTCT
TCTCCGTCTCCGTTTACCTGTTGGTAAACGTGCTAAATTTGAAGCTGGTCAATATTTACTAATCCACTTA
GATGACGGTGAGAGCCGTAGCTACAGCATGGCAAATCCACCACATGAATCTGATGGTATCACCTTACATG
TTCGTCATGTTCCAGGTGGGCGTTTTAGTACTATTGTACAACAATTGAAATCAGGAGATACTTTGGACAT
TGAATTACCTTTTGGTTCTATTGCGCTTAAACCTGATGACGCTCGTCCTCTGATCTGTGTAGCTGGTGGT
ACCGGCTTTGCTCCAATCAAATCCGTTTTAGACGATCTCGCGAAACGTAAAGTACAGCGCGATATCACAC
TTATCTGGGGCGCACGCAATCCATCTGGCTTATATCTTCCATCAGCTATCGATAAGTGGCGTAAGGTATG
GCCACAATTCCGTTACATCGCCGCTATCACTGATCTTGGGGATATGCCAGCTGATGCACACGCTGGTCGT
GTGGACGACGCATTACGTACTCATTTTGGTAATCTGCATGATCATGTTGTTCATTGTGTGGTTCGCCTG
CtCTAGTTCAAAGTGTCCGTACAGCCGCCTCGGACATGGGTCTACTAGCGCAAGATTTCCATGCAGATGT
ATTTGCAACTGGTCCTACAGGTCACCACTAG
```

FIG. 16

```
ATGAAAATTAAAAGTCAAAAAGATTTTTTTTCTGGTTTGATGTTCCTTGCAGTTGGTTTAGCATTTGCAA
TTGGTGCTTCAAATTATACTATTGGTACTGGTGCTCGTATGGGTCCAGGTTATTTCCCTCTTATACTTGG
TGTACTGATGGCGATTCTAGGTGCAGCTATCTGTGTTGGTGGTCTTACTAAAGGTCCAGAGGGTGGTGAT
AAAATTGGTAAATGGGCATGGCGTCAAGTTTTTTTTATCTTGGCAGCAAATTTTGCATTCGGCATTTTGT
TAGTGGGTGTACCAGCAGTTGGTATTCCACAATTTGGTCTTATTATCGCAATTTATGCGTTAGTCTTCAT
CGCGTCTTTGGGTGGCCACTCTTTCAACTTCAAAGAAACCGCGATCCTTGCAACGGTGCTTGCAGTTGGT
TCTTACTTCGCTTTTGTTTGGGCATTAAACTTACAATTCCCAGTATGGCCATCATTTATCGCGGGTTAA
```

FIG. 17

```
ATGGATCTTATTCAAAACTTAAGTACCGGCTTCGGTGTGGCTTTCACTTTCCAAAATTTGATTTATTGTT
TCGTTGGTTGTCTTTTAGGTACTTTAATTGGCGTACTTCCAGGCATTGGTCCAGTTGCTACAATTGCAAT
GTTATTGCCTGCAACCTATGCTTTACCACCAGTGGCTGCATTGATTATGTTGGCTGGTATCTACTATGGT
GCGCAGTATGGTGGTAGTACTACTGCTATTTTGGTAAATCTTCCGGGTGAATCTTCTTCTGTAGTCACCG
TTATCGATGGTTACCAAATGGCTCGTAAAGGTCGTGCAGGTCCAGCGCTTGCTGCTGCTGGTATTGGTTC
TTTTTTCGCAGGTTGTGTTGGTACAGTGATCTTAGCGGCTTTCGCTCCACCTCTCACGGAAGTTGCATTC
AAGTTTGGACCTGCAGAGTATTTTTCTTTAATGACATTGGGTCTAATTGGTGCAGTTGTCCTTGCTTCAG
GCTCTTTGCTCAAAGCAATTGCAATGATCGTACTCGGTCTTTTGCTTGGCATGGTTGGTACGGACGTAAA
TTCAGGTGTAGCGCGTTACTCATTTGACATTCCAGAGCTAACAGATGGTATTGATTTGTTGTGATCGCA
ATGGGTGTTTTTGGTTACGGTGAAATTATTGCAAATCTTTCAAAGCCTGATGATGAACGTGAGGTTTTG
CAGCGAAAGTGACTGGTCTTCTTCCAACAAGTGAAGACTTCAAACGTATGTTGCCAGCAATGTTGCGTGG
TACAGCATTAGGTTCAGCTTTAGGAATTTTGCCAGGTGGTGGTGCTATGTTGAGTGCATTTGCAGCTTAT
ACAATTGAAAAAAAAACCAAATTAAAACCTGGTGAAGTACCATTTGGTCAGGGCAATATTCGTGGCGTTT
GCGCTCCGGAATCAGCAAACAACGCTGGTAGTCAAACATCTTTCATTCCACTGTTAACATTGGGCATTCC
TCCAAACGCCGTAATGGCTCTCATGGTAGGCGAATGACTATTCACAACATTCAACCAGGACCACAAGTG
ATGACATCTAACCCTGAACTATTTTGGGGTCTTATTGCAAGCATGTGGATTGGTAATTTGATGTTAATTA
TTTTGAACCTACCACTTATCGGTGTGTGGATCAAGTTGCTTACAGTACCATATCGTTGGTTGTTTCCATC
TATCGTATTATTTTGTGCAATTGGTGTGTATGGTACTAATAACAACGTTTGGGATGTTTGGATGGTAGGT
ATTTTTGGTTTCATTGGTTATGTATTCCACAAGTTAGGGACTGAACCTGCTCCTTTGTTGTTGGGTTTCA
TTTTAGGTCCAATGATGGAAGAAAACCTTCGCCGTGCTCTATTGCTATCGCGTGGCGACTGGTCTGTATT
TGTTACGCGTCCAATTAGTGCATGCTTACTGGCAGCGGCTGTTGTGCTTCTTGTAATCGTTCTTATGCCT
GCAGTTAAGAATAAACGTGAAGAGGCCTTTGTAGAAGATTGA
```

FIG. 18

GTTTAAACCAAATTACGCAGCTCATTCGCAGTATTGCGTAATAAAGGTAAAACTTGATCGATAAGATACT
GTGGCTGCACCCGATTGGTTTGTGACATACAATTAAGTGCTGCAATGGTAAGCCCCTGTGCGTTTAAAAC
GGGTACCGCAATCGCAATCAGACCCAGTTCATGTTCCTCAGTAGACAAACAGTAGTCCGATTGCCGAACA
GCATCTAATGTTTCTAAAAAAGTATGTTCATCGGTAATGGTATAAGGCGTGAGGCGCTTCAGACCATATT
TTTCAATCCATTCAATTTGTACTTCACGATCCAGAACAGAAAGTAATACTTTACCGGTAGAGGTGGCGTG
GGCAGGCAAACGATTACCCAAATGCATCCCATAGGGGCTCACGCGAAGATTATCTTGCTGGGGTAAATAA
CTACGCGCAACAGGTACAACTTCATGCTCATCGAGCACCACAATTGAAAAGGTGAGGCTGGTTTGAGCAC
ACAGTAGATTTAAAAATGACTGTGCCACTTTGGGTAAATGTGCCGAGCTTAAATAAGAACTAGAAAAACG
TAAAACACGATGTGTAAGCCAAAAATAGTGCTCATCGGTATCTAAATAACCCAAAAATTTAAGTGTCTTT
AAATAACGCCGTGCAGCTGTTCTGCTTATACCAGTACGCTCTGCAACCTGTGTCACGTTCAGTCGTTGTC
TGTCAATTCCAAATGCTTCTAAAAGCGCTAAGCCTTTGGCCAAGCCTGCAATGTAATCTTCCGTACGTAT
TTCTTCACTTGAATGGGGATGTGCAAGGTATTGGTGATGTTGTTCCATAACATTCAAATCCAAAATGGTT
TTGTCCGATCATCGGACAGTTGTAATGCTAATCGGATAATTTTGAGCCTTGATTATAGATGTCTTTTTAA
TGAGGCGGTACTTTAAAAATAGAAAATAGCAAGGATGATGTTATGCAAACTATGAAAACCAAAGTTGCAA
TTATTGGTTCTGGCCCAGCGGGATTACTACTCGGTCAACTGCTTTACAAAGCTGGAATTGAACACGTTAT
TGTGGAACAGCGAAGTGCCGATTACGTTGCATCACGCATTCGTGCAGGAATTTTAGAGCAAGTATCGGTC
GATTTACTCGAGCAAGCTGGAGTTGATCAGAACCTCAAAGAAAAGGATTGCCACATTCGGGCATTGAAA
TTCTGACCAATGGCCAAAAATTCCGTGTCGATTTATCGGCATTGACTCAAGGTAAACAAGTCACGGTATA
TGGGCAGACCGAAGTTACTAAAGATTTAATGCAAGCACGTGAGCAGGCTGGTCTTTGCTCATTTTATGAA
TCGAATGATGTTCAAATTCATGATTTTATAATGCGCCAAAAGTGACTTTTGAATCCAACGGAACTCACT
ATCAAATCGAATGTGATTTCATTGCAGGATGTGATGGTTATCATGGCGTGTGCCGTGCTAGTGTGCCTCA
AGATAAAATTAAAACCTTTGAAAAGGTCTATCCATTTGGTTGGTTAGGTGTACTTGCCGATGTGCCGCCT
GTGGCAGACGAGTTAATTTATGTTCAATCAGAGCGTGGTTTTGCACTGTGTAGCATGCGCTCAGAAACGC
GAAGCCGATATTACATTCAAGTTCCTTTAACCGATCACGTAGAAAACTGGTCGGATGATCAATTTTGGGA
AGAGCTTAAGAATCGCCTCGACCCTGAAAGCTGCGAAAAACTCGTTACAGGCCCTTCAATTGAGAAAAGT
ATTGCACCTTTGCGGAGCTTTGTCACAGAACCGATGCGATTTGGAAAATTATTCTTAGCTGGTGATGCCG
CACATATTGTTCCACCAACGGGTGCCAAAGGATTGAATCTTGCAGCTTCAGATATTGCATATTTGTCGAG
TGCGCTCATTGAATTTTACACGCAAGGATCTGAGCAAGGTATAGATCAATACTCAGAAAAATGCTTGCAA
CGTGTATGGAAAGCAGAGCGTTTTTCATGGTGGATGACCCATTTGTTACATCGCTTTGAAACCGAAAGCG
AGTTTGATCATAAAATTAAACAAGCAGAATTGAGCTATATCTTAGGTTCTACGGCAGGTCAGACCACACT
CGCTGAAAACTATGTGGGTTTACCCTATGAAATCAAATCCCTTGACTATTTAAAACATGCCAGCTAACCA
GACATCAAATAAAACGAAAGGCTCAGTCGAAAGACTGGGCCTTTCGTTTTATCTGTTGTTTGTCGGTGAA
CGCTCTCATTAATTAATCCAGAGGCATGAGCTGTTGACAATTAATCATCGGCTCGTATAATGTGTGGAAT
TGTGAGCGGATAACAATTTCACACAGGAGAGTCTATATATGCGTAACGAATCTATCCGTCGTCGTGAAGC
GTTAATTGGTATCGCTGCAGCAGTTGCAGCAACTGGTTCACTCGCTCAAAGTAACCAACCACTGAAAATC
GTTGTGCCTTTTTCTGCAGGTGGTACAGCGGACGTATTACCACGTCTTGTCGCTGAAAAATCCGTGCCG
ATTATGCTGGTGGTGTTATCATCGAAAACAAACCAGGTGCAGGTGGTAATATTGGTGCAGATCTAGTTTT
CCGTGCTCCACCAGACGGTATGACGGTTTTAGCTTCACCACCTGGTCCTATCGCTATTAATCACAATCTT
TATCAAAAATTATCTTTCGATCCTACTCGTTGGGTACCAGTAACCATTCTGGCAACAGTTCCTAACGTAC
TTGTAATTAACCCAAAACTACCTGTTAAAAGCCTTGGCGAATTTATCGCATACGCAAAAGCAAATCCAAA
GAAAGTAACCGTAGCGACTCAAGGTGACGGTTCTACTTCACACCTTACAGCAGCAATGTTTATGCAATTA
ACTGGTACAGAACTAACTGTTATCCCATACAAAGGTACAGCACCAGCTTTAATCGATCTTATTGGTGGTA
ATGTAGACGTGTTTTTCGATAATATCAGCTCTTCTGCAACTTATCACCAAGCAGGAAAAGTTCGTATTCT
TGCAGTTGCTGATGAACAACGTTCACAAATTCTTCCACAAGTTCCAACGTTCGCAGAACAACAGTGGCCA
GCAATGCAAGCTGTGACATTTTCTCAGTAGTGGCACCTCCTGGTACATCAGCAGAAATCGCACAAAAAC

FIG. 19

TTCAAAAACAGATGGCTCTTGCCCTTTCTTCGAACGATATTCGTAAGCACTTCCAGGAACAAGGTGCTGT
GCCATGTGGTTGGGATCCAAGTAAAACTGCTCAATTTATTCGTCAGGAAACCGAAAAATGGAAGAAAGTA
CTCAAAGCAGCAAACGTAAAACTTTAAGAGAGGAAAGCAATGCAGGAAAGCATTATTCAATGGCATGGTG
CGACCAACACACGCGTTCCATTTGGTATCTATACAGATACCGCAAATGCTGACCAAGAACAACAGCGTAT
TTACCGTGGCGAAGTATGGAATTACCTTTGTTTGGAATCAGAAATCCCAGGAGCGGGTGATTTTCGTACC
ACATTTGCGGGTGAAACACCTATTGTCGTAGTTCGTGATGCTGATCAAGAAATTTATGCTTTCGAAAATC
GTTGTGCTCACCGTGGTGCTTTAATTGCATTAGAAAAGAGCGGTCGTACTGATTCTTTTCAATGTGTTTA
TCATGCATGGTCATATAACCGTCAGGGTGACCTTACGGGTGTGGCTTTCGAAAAAGGCGTAAAAGGTCAG
GGTGGTATGCCAGCTAGTTTCTGTAAAGAAGAACATGGTCCACGTAAACTTCGCGTAGCAGTTTTCTGCG
GCTTGGTTTTCGGTTCTTTTTCTGAAGACGTTCCAAGTATTGAAGATTATTTGGGTCCGGAAATTTGTGA
ACGTATCGAACGTGTTCTCCATAAGCCTGTAGAAGTTATCGGTCGTTTTACTCAGAAATTACCTAATAAC
TGGAAACTTTATTTTGAAAATGTAAAGATAGCTACCATGCATCTCTTTTACACATGTTTTTCACAACTT
TCGAACTGAACCGTTTATCTCAGAAAGGCGGTGTTATTGTGGATGAGTCTGGCGGCCATCATGTATCCTA
TAGTATGATTGATCGTGGGGCCAAGGATGATTCATATAAAGATCAAGCTATTCGTTCTGACAATGAACGT
TATCGTTTGAAAGATCCTAGCTTACTAGAAGGTTTTGAAGAATTCGAAGATGGTGTAACGCTTCAAATTC
TTAGCGTATTCCCAGGGTTTGTTTTGCAACAAATCCAAAACAGTATTGCAGTGCGTCAGTTATTGCCAAA
AAGTATTTCTAGTTCTGAATTGAACTGGACTTATTTAGGTTATGCCGATGATAGCGCAGAACAACGTAAA
GTTCGTCTTAAACAAGCTAATCTGATTGGACCTGCTGGATTCATTTCAATGGAAGATGGTGCAGTCGGCG
GTTTCGTGCAGCGTGGTATTGCAGGCGCTGCTAACCTTGATGCAGTAATCGAAATGGGCGGTGATCATGA
AGGCAGCTCTGAAGGTCGCGCTACTGAAACTTCAGTACGTGGCTTTTGGAAAGCATATCGTAAACATATG
GGACAAGAAATGCAGGCATGAGGAGTCCCTAAACAATGATCAATGAAATACAGATCGCAGCATTTAATGC
AGCATATGCAAAAACTATTGACTCTGATGCTATGGAACAATGGCCTACCTTTTTTACTAAAGATTGCCAT
TATTGTGTAACGAATGTAGATAATCATGATGAGGGTTTAGCTGCTGGTATAGTTTGGGCAGATTCACAGG
ACATGTTGACTGATCGTATCTCAGCTTTGCGTGAAGCGAACATTTACGAACGTCACCGCTATCGTCACAT
CTTAGGTCTGCCATCAATTCAATCAGGTGATGCAACGCAGGCATCAGCTAGCACACCTTTCATGGTTCTT
CGTATCATGCATACTGGCGAAACGGAGGTTTTCGCATCGGGTGAATATCTCGATAAATTCACTACTATTG
ATGGTAAATTGCGCCTTCAGGAACGTATTGCTGTTTGTGACTCTACAGTAACCGATACCTTAATGGCATT
GCCATTATGAAAGGAGGTAACAATGAACGCAATTGTTCACCGCCGTCTTGCACTTGCAATTGGTGATCCA
CATGGTATTGGTCCTGAAATCGCATTGAAAGCTCTTCAACAGCTTTCGGTAACTGAACGTAGCTTAATTA
AAGTATACGGTCCGTGGTCTGCACTTGAACAAGCAGCACGCGTTTGCGAAATGGAACCACTCTTACAAGA
TATCGTACACGAAGAAGCAGGTACCTTGACCCAACCAGTACAGTGGGGTGAAATTACACCACAAGCTGGT
CTTAGTACAGTACAATCAGCTACTGCTGCGATCCGTGCATGTGAAAATGGTGAGGTAGATGCAGTTATTG
CGTGTCCACACCATGAAACTGCAATCCACCGTGCTGGTATCGCCTTCTCTGGTTATCCAAGCCTTTTAGC
GAATGTGTTGGGTATGAACGAAGATCAAGTTTTTCTTATGTTGGTTGGTGCTGGTCTTCGTATCGTTCAT
GTGACTCTACACGAATCTGTACGTTCTGCACTTGAACGTCTTTCTCCACAACTTGTTGTAAATGCAGCAC
AAGCAGCAGTTCAAACCTGTACATTGCTTGGTGTTCCTAAACCGAAAGTGGCAGTGTTCGGCATTAACCC
ACATGCATCAGAAGGTCAACTTTTCGGCTTGGAAGATAGCCAAATTACCGTTCCAGCAGTTGAAACCCTT
CGTAAACGTGGTCTAGCTGTTGATGGTCCAATGGGTGCGGATATGGTACTGGCACAACGTAAACATGATT
TATATGTTGCGATGCTTCATGATCAGGGTCATATACCAATTAAACTTCTTGCACCAAATGGTGCGAGTGC
TCTCTCAATCGGTGGTCGTGTTGTATTGTCATCAGTTGGACACGGCAGCGCAATGGACATCGCTGGCCGT
GGCGTAGCTGATGCCACTGCTCTTTTACGTACCATTGCTCTTCTTGGCGCTCAGCCAGTTTGA**GGTCCCT
CCCAA**ATGAACCATCAAATCCACATCCATGACTCAGATATTGCATTTCCATGTGCACCTGGTCAATCAGT
TTTGGATGCGGCCTTACAAGCAGGTATCGAATTGCCTTATAGCTGCCGTAAAGGTTCATGTGGGAATTGT

FIG. 19 (continued)

```
GCAAGTACTCTTTTAGATGGTAATATTGCATCTTTCAACGGTATGGCTGTTCGTAATGAATTATGTGCGT
CTGAACAAGTGTTATTGTGTGGTTGCACGGCGGCATCTGATATACGTATTCATCCTTCTTCTTTCCGTCG
TCTTGACCCAGAAGCTCGTAAACGTTTCACTGCTAAGGTATATTCAAATACTCTTGCTGCTCCAGATGTA
TCTCTTCTCCGTCTCCGTTTACCTGTTGGTAAACGTGCTAAATTTGAAGCTGGTCAATATTTACTAATCC
ACTTAGATGACGGTGAGAGCCGTAGCTACAGCATGGCAAATCCACCACATGAATCTGATGGTATCACCTT
ACATGTTCGTCATGTTCCAGGTGGGCGTTTTAGTACTATTGTACAACAATTGAAATCAGGAGATACTTTG
GACATTGAATTACCTTTTGGTTCTATTGCGCTTAAACCTGATGACGCTCGTCCTCTGATCTGTGTAGCTG
GTGGTACCGGCTTTGCTCCAATCAAATCCGTTTTAGACGATCTCGCGAAACGTAAAGTACAGCGCGATAT
CACACTTATCTGGGGCGCACGCAATCCATCTGGCTTATATCTTCCATCAGCTATCGATAAGTGGCGTAAG
GTATGGCCACAATTCCGTTACATCGCCGCTATCACTGATCTTGGGGATATGCCAGCTGATGCACACGCTG
GTCGTGTGGACGACGCATTACGTACTCATTTTGGTAATCTGCATGATCATGTTGTTCATTGTTGTGGTTC
GCCTGCTCTAGTTCAAAGTGTCCGTACAGCCGCCTCGGACATGGGTCTACTAGCGCAAGATTTCCATGCA
GATGTATTTGCAACTGGTCCTACAGGTCACCACTAGGGT TAAAACAAAAGAGAGCGATTAGTCGCTCTC
TTTTTTATCTCGGCTGTGTTTATTTACAAGTGAAATTCTCGGCTTTTTCACTGTCACCTGTACCGTTATA
ACGTGCGATTTTTGGATATGGACATAGTGGTCGAGTTCGATTGGCCGACCAGCTCGATGGTAACTCGCTA
TTGATTTCGCCACTTGCATTACCGACACCGCGTGCAGAAGCGAGAATTTGATCTGGTGCTTGACCATATT
CTACCCAGTTCACCAAAGCAGTAAGTGCATCAAACTGGTCGGTCGCAAGCCCACCCCGCGAATGATTCAT
TCCCGGAACGCGATAAAAACGAGCAAAACTTTGTGCGTCACCCAAACTGCTGCTCTTGTATTTTGCCATC
AGTTTATCGTACCAGTTTTGTGTGTCATCTACCGAAAATACGCCATCTGCTGTGCCTTGCACCACAATCA
TTTTACCGCCATGCAAGCGTAATTTATCCAGATTGAGCTCATCTGGCGGGATCATAAATGACATCGCGCT
TTCTGAATAGGTCGAATTGGTTGCAGAAAGTTTTGGGTAATCTGTATCAAAATTATAGTTAAAGGCAAAT
TTTCGTGAATTTTGCACAATTGTTGGATCTGGTGGTACCTGAAATATAATGCCTACCGCTACCGGGTCGC
GTGCCGTACCCACAGAAGAAACAAATTTCCAGCTTGCCCAATTGCTGCCAAGTAATCCCGGATCGTAAGG
CTGGGTCGCATACAATGCTTCGCCAGATGAATTGACAGGGCCGCGGTAAATATTAGCCACGACATCGATC
TGGTCTTTACTCAAACAGCTTCCATCACGTGAACCCGAGCAGACAGGCACATCTTTATGAATATCAAAGG
CGGTTCGACAGGCTTCAACGTCTTGTACCATACCATCTGCTACACCATCGAGTGCATCACAGCGTGTTAA
AATCGCATTGGCAAGTACGTTACGTTCTGCATAGGTGAGTGCAGTGCTTAAATCATTTTCATCGGTGGCA
ACACGACGTAATTGCTGCGCCGTGTATAGCTGTGCCGCTGCTGCACGTGGTAGATGAAATCCGGGTGTGC
TTGCCAAGATGCCATCGTACTGATCGCCTAGGCGTGTTGCAGCCATCATGGCATGTCGACCGCCGTTAGA
CGTACCTCCTGCATAAGATCGATCTGGCAATTTACCGTAAGCTGTTTAATCAGATCTTTGGCCATAGGC
GTTAACTTTGTAATAGCACCATAACCATAGTTGATGCGAGCTTGCGGATCTAAACCAAAAGAGGATTTT
GTGCAGATGAATGTCCGGCATCGGATGAAATTACCGCGAATCCGTCTTTTAAAGCATTGCTTAACATCCC
GCCGCTGCCCACTTGTCCGGTCGCTGTGGCGATGTTGCCGTCGGTACCGCCATTTCCTTGATATAGAAAA
CGTCCGTTCCAGCTCACCGGAAGTCGCATTTCAAAGCCAATCTGATAGGTTTGACCATCGATTGGGCTAA
TACGTTGCTCCATATAACCTTTGACCAAACAATGCGCCGGAATATTTTCCCCACGACGGTCAGAGCGCC
TGCATTTTGTAAAGTTGCACTTTCAACTACGGTGGTATCAAATTTGAAACCGCTTAAATCTGTACAACTG
CCTTTGAGCTGAGCACCTACTGCTGGGCTTAATTGTGGAATACTTTGGCTCGACTGTGCCGTATCATGAT
CGTTATTGTCATTACATGCAGCTACACTGATGCAGACGCCGAGCAATGCAGCATGTTTAAAAAAATGTTG
AGGTTTTTTCATTGCAATATCCTTATGCCT
```

FIG. 19 (continued)

*GTTTAAACCAAATTACGCAGCTCATTCGCAGTATTGCGTAATAAAGGTAAAACTTGATCGATAAGATACT*
*GTGGCTGCACCCGATTGGTTTGTGACATACAATTAAGTGCTGCAATGGTAAGCCCCTGTGCGTTTAAAAC*
*GGGTACCGCAATCGCAATCAGACCCAGTTCATGTTCCTCAGTAGACAAACAGTAGTCCGATTGCCGAACA*
*GCATCTAATGTTTCTAAAAAAGTATGTTCATCGGTAATGGTATAAGGCGTGAGGCGCTTCAGACCATATT*
*TTTCAATCCATTCAATTTGTACTTCACGATCCAGAACAGAAAGTAATACTTTACCGGTAGAGGTGGCGTG*
*GGCAGGCAAACGATTACCCAAATGCATCCCATAGGGGCTCACGCGAAGATTATCTTGCTGGGGTAAATAA*
*CTACGCGCAACAGGTACAACTTCATGCTCATCGAGCACCACAATTGAAAAGGTGAGGCTGGTTTGAGCAC*
*ACAGTAGATTTAAAAATGACTGTGCCACTTTGGGTAAATGTGCCGAGCTTAAATAAGAACTAGAAAAACG*
*TAAAACACGATGTGTAAGCCAAAAATAGTGCTCATCGGTATCTAAATAACCCAAAAATTTAAGTGTCTTT*
*AAATAACGCCGTGCAGCTGTTCTGCTTATACCAGTACGCTCTGCAACCTGTGTCACGTTCAGTCGTTGTC*
*TGTCAATTCCAAATGCTTCTAAAAGCGCTAAGCCTTTGGCCAAGCCTGCAATGTAATCTTCCGTACGTAT*
*TTCTTCACTTGAATGGGGATGTGCAAGGTATTGGTGATGTTGTTCCATAACATTCAAATCCAAAATGGTT*
*TTGTCCGATCATCGGACAGTTGTAATGCTAATCGGATAATTTTGAGCCTTGATTATAGATGTCTTTTTAA*
*TGAGGCGGTACTTTAAAAATAGAAAATAGCAAGGATGATGTTATGCAAACTATGAAAACCAAAGTTGCAA*
*TTATTGGTTCTGGCCCAGCGGGATTACTACTCGGTCAACTGCTTTACAAAGCTGGAATTGAACACGTTAT*
*TGTGGAACAGCGAAGTGCCGATTACGTTGCATCACGCATTCGTGCAGGAATTTTAGAGCAAGTATCGGTC*
*GATTTACTCGAGCAAGCTGGAGTTGATCAGAACCTCAAAGAAAAGGATTGCCACATTCGGGCATTGAAA*
*TTCTGACCAATGGCCAAAAATTCCGTGTCGATTTATCGGCATTGACTCAAGGTAAACAAGTCACGGTATA*
*TGGGCAGACCGAAGTTACTAAAGATTTAATGCAAGCACGTGAGCAGGCTGGTCTTTGCTCATTTTATGAA*
*TCGAATGATGTTCAAATTCATGATTTTATAATGCGCCAAAAGTGACTTTTGAATCCAACGGAACTCACT*
*ATCAAATCGAATGTGATTTCATTGCAGGATGTGATGGTTATCATGGCGTGTGCCGTGCTAGTGTGCCTCA*
*AGATAAAATTAAAACCTTTGAAAAGGTCTATCCATTTGGTTGGTTAGGTGTACTTGCCGATGTGCCGCCT*
*GTGGCAGACGAGTTAATTTATGTTCAATCAGAGCGTGGTTTTGCACTGTGTAGCATGCGCTCAGAAACGC*
*GAAGCCGATATTACATTCAAGTTCCTTTAACCGATCACGTAGAAAACTGGTCGGATGATCAATTTTGGGA*
*AGAGCTTAAGAATCGCCTCGACCCTGAAAGCTGCGAAAAACTCGTTACAGGCCCTTCAATTGAGAAAAGT*
*ATTGCACCTTTGCGGAGCTTTGTCACAGAACCGATGCGATTTGGAAAATTATTCTTAGCTGGTGATGCCG*
*CACATATTGTTCCACCAACGGGTGCCAAAGGATTGAATCTTGCAGCTTCAGATATTGCATATTTGTCGAG*
*TGCGCTCATTGAATTTTACACGCAAGGATCTGAGCAAGGTATAGATCAATACTCAGAAAAATGCTTGCAA*
*CGTGTATGGAAAGCAGAGCGTTTTTCATGGTGGATGACCCATTTGTTACATCGCTTTGAAACCGAAAGCG*
*AGTTTGATCATAAAATTAAACAAGCAGAATTGAGCTATATCTTAGGTTCTACGGCAGGTCAGACCACACT*
*CGCTGAAAACTATGTGGGTTTACCCTATGAAATCAAATCCCTTGACTATTTAAAACATGCCAGCTAACCA*
GACATCAAATAAAACGAAAGGCTCAGTCGAAAGACTGGGCCTTTCGTTTTATCTGTTGTTTGTCGGTGAA
CGCTCTCATTAATTAATCCAGAGGCATGAGCTGTTGACAATTAATCATCGGCTCGTATAATGTGTGGAAT
TGTGAGCGGATAACAATTTCACACAGGAGAGTCTATAT<u>ATGCGTAACGAATCTATCCGTCGTCGTGAAGC</u>
<u>GTTAATTGGTATCGCTGCAGCAGTTGCAGCAACTGGTTCACTCGCTCAAAGTAACCAACCACTGAAAATC</u>
<u>GTTGTGCCTTTTCTGCAGGTGGTACAGCGGACGTATTACCACGTCTTGTCGCTGAAAAATCCGTGCCG</u>
<u>ATTATGCTGGTGGTGTTATCATCGAAAACAAACCAGGTGCAGGTGGTAATATTGGTGCAGATCTAGTTTT</u>
<u>CCGTGCTCCACCAGACGGTATGACGGTTTTAGCTTCACCACCTGGTCCTATCGCTATTAATCACAATCTT</u>
<u>TATCAAAAATTATCTTTCGATCCTACTCGTTGGGTACCAGTAACCATTCTGGCAACAGTTCCTAACGTAC</u>
<u>TTGTAATTAACCCAAAACTACCTGTTAAAAGCCTTGGCGAATTTATCGCATACGCAAAAGCAAATCCAAA</u>
<u>GAAAGTAACCGTAGCGACTCAAGGTGACGGTTCTACTTCACACCTTACAGCAGCAATGTTTATGCAATTA</u>
<u>ACTGGTACAGAACTAACTGTTATCCCATACAAAGGTACAGCACCAGCTTTAATCGATCTTATTGGTGGTA</u>
<u>ATGTAGACGTGTTTTTCGATAATATCAGCTCTTCTGCAACTTATCACCAAGCAGGAAAAGTTCGTATTCT</u>
<u>TGCAGTTGCTGATGAACAACGTTCACAAATTCTTCCACAAGTTCCAACGTTCGCAGAACAACAGTGGCCA</u>
<u>GCAATGCAAGCTGTGACATTTTCTCAGTAGTGGCACCTCCTGGTACATCAGCAGAAATCGCACAAAAAC</u>

FIG. 20

TTCAAAAACAGATGGCTCTTGCCCTTTCTTCGAACGATATTCGTAAGCACTTCCAGGAACAAGGTGCTGT
GCCATGTGGTTGGGATCCAAGTAAAACTGCTCAATTTATTCGTCAGGAAACCGAAAAATGGAAGAAAGTA
CTCAAAGCAGCAAACGTAAAACTTTAAGAGAGGAAAGCAATGCAGGAAAGCATTATTCAATGGCATGGTG
CGACCAACACACGCGTTCCATTTGGTATCTATACAGATACCGCAAATGCTGACCAAGAACAACAGCGTAT
TTACCGTGGCGAAGTATGGAATTACCTTTGTTTGGAATCAGAAATCCCAGGAGCGGGTGATTTTCGTACC
ACATTTGCGGGTGAAACACCTATTGTCGTAGTTCGTGATGCTGATCAAGAAATTTATGCTTTCGAAAATC
GTTGTGCTCACCGTGGTGCTTTAATTGCATTAGAAAAGAGCGGTCGTACTGATTCTTTTCAATGTGTTTA
TCATGCATGGTCATATAACCGTCAGGGTGACCTTACGGGTGTGGCTTTCGAAAAAGGCGTAAAAGGTCAG
GGTGGTATGCCAGCTAGTTTCTGTAAAGAAGAACATGGTCCACGTAAACTTCGCGTAGCAGTTTTCTGCG
GCTTGGTTTTCGGTTCTTTTTCTGAAGACGTTCCAAGTATTGAAGATTATTTGGGTCCGGAAATTTGTGA
ACGTATCGAACGTGTTCTCCATAAGCCTGTAGAAGTTATCGGTCGTTTTACTCAGAAATTACCTAATAAC
TGGAAACTTTATTTTGAAAATGTAAAAGATAGCTACCATGCATCTCTTTTACACATGTTTTTCACAACTT
TCGAACTGAACCGTTTATCTCAGAAAGGCGGTGTTATTGTGGATGAGTCTGGCGGCCATCATGTATCCTA
TAGTATGATTGATCGTGGGGCCAAGGATGATTCATATAAAGATCAAGCTATTCGTTCTGACAATGAACGT
TATCGTTTGAAAGATCCTAGCTTACTAGAAGGTTTTGAAGAATTCGAAGATGGTGTAACGCTTCAAATTC
TTAGCGTATTCCCAGGGTTTGTTTTGCAACAAATCCAAAACAGTATTGCAGTGCGTCAGTTATTGCCAAA
AAGTATTTCTAGTTCTGAATTGAACTGGACTTATTTAGGTTATGCCGATGATAGCGCAGAACAACGTAAA
GTTCGTCTTAAACAAGCTAATCTGATTGGACCTGCTGGATTCATTTCAATGGAAGATGGTGCAGTCGGCG
GTTTCGTGCAGCGTGGTATTGCAGGCGCTGCTAACCTTGATGCAGTAATCGAAATGGGCGGTGATCATGA
AGGCAGCTCTGAAGGTCGCGCTACTGAAACTTCAGTACGTGGCTTTTGGAAAGCATATCGTAAACATATG
GGACAAGAAATGCAGGCATGAGGAGTCCCTAAACAATGATCAATGAAATACAGATCGCAGCATTTAATGC
AGCATATGCAAAAACTATTGACTCTGATGCTATGGAACAATGGCCTACCTTTTTTACTAAAGATTGCCAT
TATTGTGTAACGAATGTAGATAATCATGATGAGGGTTTAGCTGCTGGTATAGTTTGGGCAGATTCACAGG
ACATGTTGACTGATCGTATCTCAGCTTTGCGTGAAGCGAACATTTACGAACGTCACCGCTATCGTCACAT
CTTAGGTCTGCCATCAATTCAATCAGGTGATGCAACGCAGGCATCAGCTAGCACACCTTTCATGGTTCTT
CGTATCATGCATACTGGCGAAACGGAGGTTTTCGCATCGGGTGAATATCTCGATAAATTCACTACTATTG
ATGGTAAATTGCGCCTTCAGGAACGTATTGCTGTTTGTGACTCTACAGTAACCGATACCTTAATGGCATT
GCCATTATGAAAGGAGGTAACAATGAACGCAATTGTTCACCGCCGTCTTGCACTTGCAATTGGTGATCCA
CATGGTATTGGTCCTGAAATCGCATTGAAAGCTCTTCAACAGCTTTCGGTAACTGAACGTAGCTTAATTA
AAGTATACGGTCCGTGGTCTGCACTTGAACAAGCAGCACGCGTTTGCGAAATGGAACCACTCTTACAAGA
TATCGTACACGAAGAAGCAGGTACCTTGACCCAACCAGTACAGTGGGGTGAAATTACACCACAAGCTGGT
CTTAGTACAGTACAATCAGCTACTGCTGCGATCCGTGCATGTGAAAATGGTGAGGTAGATGCAGTTATTG
CGTGTCCACACCATGAAACTGCAATCCACCGTGCTGGTATCGCCTTCTCTGGTTATCCAAGCCTTTTAGC
GAATGTGTTGGGTATGAACGAAGATCAAGTTTTTCTTATGTTGGTTGGTGCTGGTCTTCGTATCGTTCAT
GTGACTCTACACGAATCTGTACGTTCTGCACTTGAACGTCTTTCTCCACAACTTGTTGTAAATGCAGCAC
AAGCAGCAGTTCAAACCTGTACATTGCTTGGTGTTCCTAAACCGAAAGTGGCAGTGTTCGGCATTAACCC
ACATGCATCAGAAGGTCAACTTTTCGGCTTGGAAGATAGCCAAATTACCGTTCCAGCAGTTGAAACCCTT
CGTAAACGTGGTCTAGCTGTTGATGGTCCAATGGGTGCGGATATGGTACTGGCACAACGTAAACATGATT
TATATGTTGCGATGCTTCATGATCAGGGTCATATACCAATTAAACTTCTTGCACCAAATGGTGCGAGTGC
TCTCTCAATCGGTGGTCGTGTTGTATTGTCATCAGTTGGACACGGCAGCGCAATGGACATCGCTGGCCGT
GGCGTAGCTGATGCCACTGCTCTTTTACGTACCATTGCTCTTCTTGGCGCTCAGCCAGTTTGAGGTCCCT
CCCAAATGAACCATCAAATCCACATCCATGACTCAGATATTGCATTTCCATGTGCACCTGGTCAATCAGT
TTTGGATGCGGCCTTACAAGCAGGTATCGAATTGCCTTATAGCTGCCGTAAAGGTTCATGTGGGAATTGT
GCAAGTACTCTTTTAGATGGTAATATTGCATCTTTCAACGGTATGGCTGTTCGTAATGAATTATGTGCGT
CTGAACAAGTGTTATTGTGTGGTTGCACGGCGGCATCTGATATACGTATTCATCCTTCTTCTTTCCGTCG

FIG. 20 (continued)

```
TCTTGACCCAGAAGCTCGTAAACGTTTCACTGCTAAGGTATATTCAAATACTCTTGCTGCTCCAGATGTA
TCTCTTCTCCGTCTCCGTTTACCTGTTGGTAAACGTGCTAAATTTGAAGCTGGTCAATATTTACTAATCC
ACTTAGATGACGGTGAGAGCCGTAGCTACAGCATGGCAAATCCACCACATGAATCTGATGGTATCACCTT
ACATGTTCGTCATGTTCCAGGTGGGCGTTTAGTACTATTGTACAACAATTGAAATCAGGAGATACTTTG
GACATTGAATTACCTTTTGGTTCTATTGCGCTTAAACCTGATGACGCTCGTCCTCTGATCTGTGTAGCTG
GTGGTACCGGCTTTGCTCCAATCAAATCCGTTTTAGACGATCTCGCGAAACGTAAAGTACAGCGCGATAT
CACACTTATCTGGGGCGCACGCAATCCATCTGGCTTATATCTTCCATCAGCTATCGATAAGTGGCGTAAG
GTATGGCCACAATTCCGTTACATCGCCGCTATCACTGATCTTGGGGATATGCCAGCTGATGCACACGCTG
GTCGTGTGGACGACGCATTACGTACTCATTTTGGTAATCTGCATGATCATGTTGTTCATTGTTGTGGTTC
GCCTGCTCTAGTTCAAAGTGTCCGTACAGCCGCCTCGGACATGGGTCTACTAGCGCAAGATTTCCATGCA
GATGTATTTGCAACTGGTCCTACAGGTCACCACTAGCGGAACGGCGATGTGAAAATTAAAAGTCAAAAG
ATTTTTTTTCTGGTTTGATGTTCCTTGCAGTTGGTTTAGCATTTGCAATTGGTGCTTCAAATTATACTAT
TGGTACTGGTGCTCGTATGGGTCCAGGTTATTTCCCTCTTATACTTGGTGTACTGATGGCGATTCTAGGT
GCAGCTATCTGTGTTGGTGGTCTTACTAAAGGTCCAGAGGGTGGTGATAAAATTGGTAAATGGGCATGGC
GTCAAGTTTTTTTTATCTTGGCAGCAAATTTTGCATTCGGCATTTTGTTAGTGGGTGTACCAGCAGTTGG
TATTCCACAATTTGGTCTTATTATCGCAATTTATGCGTTAGTCTTCATCGCGTCTTTGGGTGGCCACTCT
TTCAACTTCAAAGAAACCGCGATCCTTGCAACGGTGCTTGCAGTTGGTTCTTACTTCGCTTTTGTTTGGG
CATTAAACTTACAATTCCCAGTATGGCCATCATTTATCGCGGGTTAACCGGTAAGCGGCATGGATCTTAT
TCAAAACTTAAGTACCGGCTTCGGTGTGGCTTTCACTTTCCAAAATTTGATTTATTGTTTCGTTGGTTGT
CTTTTAGGTACTTTAATTGGCGTACTTCCAGGCATTGGTCCAGTTGCTACAATTGCAATGTTATTGCCTG
CAACCTATGCTTTACCACCAGTGGCTGCATTGATTATGTTGGCTGGTATCTACTATGGTGCGCAGTATGG
TGGTAGTACTACTGCTATTTTGGTAAATCTTCCGGGTGAATCTTCTTCTGTAGTCACCGTTATCGATGGT
TACCAAATGGCTCGTAAAGGTCGTGCAGGTCCAGCGCTTGCTGCTGCTGGTATTGGTTCTTTTTTCGCAG
GTTGTGTTGGTACAGTGATCTTAGCGGCTTTCGCTCCACCTCTCACGGAAGTTGCATTCAAGTTTGGACC
TGCAGAGTATTTTTCTTTAATGACATTGGGTCTAATTGGTGCAGTTGTCCTTGCTTCAGGCTCTTTGCTC
AAAGCAATTGCAATGATCGTACTCGGTCTTTTGCTTGGCATGGTTGGTACGGACGTAAATTCAGGTGTAG
CGCGTTACTCATTTGACATTCCAGAGCTAACAGATGGTATTGATTTGTTGTGATCGCAATGGGTGTTTT
TGGTTACGGTGAATTATTGCAAATCTTTCAAAGCCTGATGATGAACGTGAGGTTTTTGCAGCGAAAGTG
ACTGGTCTTCTTCCAACAAGTGAAGACTTCAAACGTATGTTGCCAGCAATGTTGCGTGGTACAGCATTAG
GTTCAGCTTTAGGAATTTTGCCAGGTGGTGGTGCTATGTTGAGTGCATTTGCAGCTTATACAATTGAAAA
AAAAACCAAATTAAAACCTGGTGAAGTACCATTTGGTCAGGGCAATATTCGTGGCGTTTGCGCTCCGGAA
TCAGCAAACAACGCTGGTAGTCAAACATCTTTCATTCCACTGTTAACATTGGGCATTCCTCCAAACGCCG
TAATGGCTCTCATGGTAGGCGCAATGACTATTCACAACATTCAACCAGGACCACAAGTGATGACATCTAA
CCCTGAACTATTTGGGGTCTTATTGCAAGCATGTGGATTGGTAATTTGATGTTAATTATTTTGAACCTA
CCACTTATCGGTGTGTGGATCAAGTTGCTTACAGTACCATATCGTTGGTTGTTTCCATCTATCGTATTAT
TTTGTGCAATTGGTGTGTATGGTACTAATAACAACGTTTGGGATGTTTGGATGGTAGGTATTTTTGGTTT
CATTGGTTATGTATTCCACAAGTTAGGGACTGAACCTGCTCCTTTGTTGTTGGGTTTCATTTTAGGTCCA
ATGATGGAAGAAAACCTTCGCCGTGCTCTATTGCTATCGCGTGGCGACTGGTCTGTATTTGTTACGCGTC
CAATTAGTGCATGCTTACTGGCAGCGGCTGTTGTGCTTCTTGTAATCGTTCTTATGCCTGCAGTTAAGAA
TAAACGTGAAGAGGCCTTTGTAGAAGATTGAACTAGTTCTAGAGCGGCCGCCACCGCGGTGGAGCTCGGT
ACGATCCGGTGATTGATTGAGCAAGCTTTATGCTTGTAAACCGTTTTGTGAAAAAATTTTTAAAATAAAA
AAGGGGACCTCTAGGGTCCCCAATTAATTAGTAATATAATCTATTAAAGGTCATTCAAAAGGTCATCCAC
CGGATCAATTCCCCTGCTCGCGCAGGCTGGGTGCCAAGCTCTCGGGTAACATCAAGGCCCGATCCTTGGA
GCCCTTGCCCTCCCGCACGATGATCGTGCCGTGATCGAAATCCAGATCCTTGACCCGCAGTTGCAAACCC
```

FIG. 20 (continued)

```
TCACTGATCCGTCGACCAAAGCGGCCATCGTGCCTCCCCACTCCTGCAGTTCGGGGGCATGGATGCGCGG
ATAGCCGCTGCTGGTTTCCTGGATGCCGACGGATTTGCACTGCCGGTAGAACTCCGCGAGGTCGTCCAGC
CTCAGGCAGCAGCTGAACCAACTCGCGAGGGGATCGAGCCCGGGGTGGGCGAAGAACTCCAGCATGAGAT
CCCCGCGCTGGAGGATCATCCAGCCGGCGTCCCGGAAAACGATTCCGAAGCCCAACCTTTCATAGAAGGC
GGCGGTGGAATCGAAATCTCGTGATGGCAGGTTGGGCGTCGCTTGGTCGGTCATTTCGAACCCCAGAGTC
CCGCTCAGAAGAACTCGTCAAGAAGGCGATAGAAGGCGATGCGCTGCGAATCGGGAGCGGCGATACCGTA
AAGCACGAGGAAGCGGTCAGCCCATTCGCCGCCAAGCTCTTCAGCAATATCACGGGTAGCCAACGCTATG
TCCTGATAGCGGTCCGCCACACCCAGCCGGCCACAGTCGATGAATCCAGAAAGCGGCCATTTTCCACCA
TGATATTCGGCAAGCAGGCATCGCCATGGGTCACGACGAGATCCTCGCCGTCGGGCATGCGCGCCTTGAG
CCTGGCGAACAGTTCGGCTGGCGCGAGCCCCTGATGCTCTTCGTCCAGATCATCCTGATCGACAAGACCG
GCTTCCATCCGAGTACGTGCTCGCTCGATGCGATGTTTCGCTTGGTGGTCGAATGGGCAGGTAGCCGGAT
CAAGCGTATGCAGCCGCCGCATTGCATCAGCCATGATGGATACTTTCTCGGCAGGAGCAAGGTGAGATGA
CAGGAGATCCTGCCCCGGCACTTCGCCCAATAGCAGCCAGTCCCTTCCCGCTTCAGTGACAACGTCGAGC
ACAGCTGCGCAAGGAACGCCCGTCGTGGCCAGCCACGATAGCCGCGCTGCCTCGTCCTGCAGTTCATTCA
GGGCACCGGACAGGTCGGTCTTGACAAAAAGAACCGGGCGCCCTGCGCTGACAGCCGGAACACGGCGGC
ATCAGAGCAGCCGATTGTCTGTTGTGCCCAGTCATAGCCGAATAGCCTCTCCACCCAAGCGGCCGGAGAA
CCTGCGTGCAATCCATCTTGTTCAATCATGCGAAACGATCCTCATCCTGTCTCTTGATCAGATCTTGATC
CCCTGCGCCATCAGATCCTTGGCGGCAAGAAAGCCATCCAGTTTACTTTGCAGGGCTTCCCAACCTTACC
AGAGGGCGCCCCAGCTGGCAATTCCGGTTCGCTTGCTGTCCATAAAACCGCCCAGTCTAGCTATCGCCAT
GTAAGCCCACTGCAAGCTACCTGCTTTCTCTTTGCGCTTGCGTTTTCCCTTGTCCAGATAGCCCAGTAGC
TGACATTCATCCGGGGTCAGCACCGTTTCTGCGGACTGGCTTTCTACGTGTTCCGCTTCCTTTAGCAGCC
CTTGCGCCCTGAGTGCTTGCGGCAGCGTGAAGCTCGCGCAGATCAGTTGGAAGAATTTGTCCACTACGTG
AAAGGCGAGATCACCAAGGTAGTCGGCAAATAATGTCTAACAATTCGTTCAAGCCGACGCCGCTTCGCGG
CGCGGCTTAACTCAAGCGTTAGATGCACTAAGCACATAATTGCTCACAGCCAAACTATCAGGTCAAGTCT
GCTTTTATTATTTTTAAGCGTGCATAATAAGCCCTACACAAATTGGGAGATATATCATGAAAGGCTGGCT
TTTTCTTGTTATCGCAATAGTTGGCGAAGTAATCGCAACATCCGCATTAAAATCTAGCGAGGGCTTTACT
AAGCTGATCCGGTGGATGACCTTTTGAATGACCTTTAATAGATTATATTACTAATTAATTGGGGACCCTA
GAGGTCCCCTTTTTTATTTTAAAAATTTTTTCACAAAACGGTTTACAAGCATAAAGCTTGCTCAATCAAT
CACCGGATCTACCGGGCCCCCCCTCGAGGTCGACGGTATCGATAAGCTTGATATCGAATTCCTGCAGCCC
GGGGGATCCACTAGT TAAAACAAAAGAGAGCGATTAGTCGCTCTCTTTTTATCTCGGCTGTGTTTATT
TACAAGTGAAATTCTCGGCTTTTTCACTGTCACCTGTACCGTTATAACGTGCGATTTTTGGATATGGACA
TAGTGGTCGAGTTCGATTGGCCGACCAGCTCGATGGTAACTCGCTATTGATTTCGCCACTTGCATTACCG
ACACCGCGTGCAGAAGCGAGAATTTGATCTGGTGCTTGACCATATTCTACCCAGTTCACCAAAGCAGTAA
GTGCATCAAACTGGTCGGTCGCAAGCCCACCCCGCGAATGATTCATTCCCGGAACGCGATAAAAACGAGC
AAAACTTTGTGCGTCACCCAAACTGCTGCTCTTGTATTTTGCCATCAGTTTATCGTACCAGTTTTGTGTG
TCATCTACCGAAAATACGCCATCTGCTGTGCCTTGCACCACAATCATTTTACCGCCATGCAAGCGTAATT
TATCCAGATTGAGCTCATCTGGCGGATCATAAATGACATCGCGCTTTCTGAATAGGTCGAATTGGTTGC
AGAAAGTTTTGGGTAATCTGTATCAAAATTATAGTTAAAGGCAAATTTTCGTGAATTTTGCACAATTGTT
GGATCTGGTGGTACCTGAAATATAATGCCTACCGCTACCGGGTCGCGTGCCGTACCCACAGAAGAAACAA
ATTTCCAGCTTGCCCAATTGCTGCCAAGTAATCCCGGATCGTAAGGCTGGGTCGCATACAATGCTTCGCC
AGATGAATTGACAGGGCCGCGGTAAATATTAGCCACGACATCGATCTGGTCTTTACTCAAACAGCTTCCA
TCACGTGAACCCGAGCAGACAGGCACATCTTTATGAATATCAAAGGCGGTTCGACAGGCTTCAACGTCTT
GTACCATACCATCTGCTACACCATCGAGTGCATCACAGCGTGTTAAAATCGCATTGGCAAGTACGTTACG
TTCTGCATAGGTGAGTGCAGTGCTTAAATCATTTTCATCGGTGGCAACACGACGTAATTGCTGCGCCGTG
```

FIG. 20 (continued)

```
TATAGCTGTGCCGCTGCTGCACGTGGTAGATGAAATCCGGGTGTGCTTGCCAAGATGCCATCGTACTGAT
CGCCTAGGCGTGTTGCAGCCATCATGGCATGTCGACCGCCGTTAGACGTACCTCCTGCATAAGATCGATC
TGGCAATTTACCGTAAGCTGTTTTAATCAGATCTTTGGCCATAGGCGTTAACTTTGTAATAGCACCATAA
CCATAGTTGATGCGAGCTTGCGGATCTAAACCAAAAGAGGATTTTGTGCAGATGAATGTCCGGCATCGG
ATGAAATTACCGCGAATCCGTCTTTTAAAGCATTGCTTAACATCCCGCCGCTGCCCACTTGTCCGGTCGC
TGTGGCGATGTTGCCGTCGGTACCGCCATTTCCTTGATATAGAAAACGTCCGTTCCAGCTCACCGGAAGT
CGCATTTCAAAGCCAATCTGATAGGTTTGACCATCGATTGGGCTAATACGTTGCTCCATATAACCTTTGA
CCAAACAATGCGCCGGAATATTTTTCCCCACGACGGTCAGAGCGCCTGCATTTTGTAAAGTTGCACTTTC
AACTACGGTGGTATCAAATTTGAAACCGCTTAAATCTGTACAACTGCCTTTGAGCTGAGCACCTACTGCT
GGGCTTAATTGTGGAATACTTTGGCTCGACTGTGCCGTATCATGATCGTTATTGTCATTACATGCAGCTA
CACTGATGCAGACGCCGAGCAATGCAGCATGTTTAAAAAAATGTTGAGGTTTTTTCATTGCAATATCCTT
ATGCCT
```

FIG. 20 (continued)

ENGINEERED MICROORGANISMS FOR THE DECONSTRUCTION OF POLYMERS

CROSS-REFERENCE TO RELATED APPLICATIONS

This application claims priority under 35 U.S.C. § 119 to PCT/US19/32480 filed on 15 May 2019, which claims priority under 35 U.S.C. § 119 to U.S. Provisional Patent Application No. 62/671,477 filed on 15 May 2018, the contents of which are hereby incorporated in their entirety.

CONTRACTUAL ORIGIN

The United States Government has rights in this disclosure under Contract No. DE-AC36-08GO28308 between the United States Department of Energy and Alliance for Sustainable Energy, LLC, the Manager and Operator of the National Renewable Energy Laboratory.

SEQUENCE LISTING

The instant application contains a Sequence Listing which has been submitted via EFS-web and is hereby incorporated by reference in its entirety. The ASCII copy as filed herewith was originally created on 3 Sep. 2024. The ASCII copy as filed herewith is named NREL 18-76_ST25.txt, is 70 kilobytes in size and is submitted with the instant application.

BACKGROUND

Poly (ethylene terephthalate) (PET) is one of the most abundant manmade synthetic polyesters. Crystalline PET is being widely used for production of single-use beverage bottles, clothing, packaging, and carpeting materials. PET resistance to biodegradation due to limited accessibility to ester linkage, and disposal of PET products into the environment pose a serious threat to biosphere, particularly to marine environment. PET can be chemically recycled; however, the extra costs in chemical recycling are not justified when converting PET back to PET. Thus, there remains a need for alternative strategies for recycling/recovering/reusing PET.

SUMMARY

In an aspect disclosed herein is a genetically modified organism comprising:
an exogenous gene addition, wherein:
the exogenous gene addition encodes functional enzymes comprising a PETase and a MHETase, and
the genetically modified organism is capable of metabolizing poly (ethylene terephthalate) (PET) to produce PET deconstruction products. In an embodiment, the genetically modified organism has an exogenous gene is from *Ideonella sakaiensis*. In another embodiment, the genetically modified organism has an exogenous gene is codon optimized. In another embodiment, the genetically modified organism has an exogenous gene is incorporated into the genome of the genetically modified organism. In another embodiment, the genetically modified organism has an exogenous gene addition further comprises genes encoding a secretion signal peptide. In another embodiment, the genetically modified organism has a genetically modified organism is a species of *Pseudomonas*. In another embodiment, the genetically modified organism is the species is *Pseudomonas putida*. In another embodiment, the genetically modified organism has PET deconstruction products comprise at least one of bis(2-Hydroxyethyl) terephthalate, mono-(2-hydroxyethyl) terephthalate, terephthalate, ethylene glycol, β-ketoadipate, or muconate. In another embodiment, the method comprising contacting poly (ethylene terephthalate) (PET) with the genetically modified organisms of claims 1 to produce PET deconstruction products. In another embodiment, the method of claim 9, wherein the contacting is performed in minimal salt medium. In another embodiment, a genetically modified organism comprising:
an exogenous gene addition, wherein:
the exogenous gene addition encodes functional enzymes comprising a PETase and a MHETase, and
the genetically modified organism is capable of metabolizing poly (ethylene terephthalate) (PET) to produce PET deconstruction products; and
wherein said genetically modified organism further comprises heterologous TPA transporters. In another embodiment, the genetically modified organism further comprising catabolic gene clusters I or II. In another embodiment, the genetically modified organism wherein the catabolic gene clusters I or II are from *Comamonas* sp. E6. In another embodiment, the genetically modified organism is capable of using TPA as a sole carbon source. In another embodiment, the genetically modified organism is capable of metabolizing TPA at about 0.05 g $L^{-1}$ $h^{-1}$. In another embodiment, the genetically modified organism is lacking a pcaJ gene. In another embodiment, the genetically modified organism is capable of metabolizing TPA to β-ketoadipate. In another embodiment, the genetically modified organism is a species of *Pseudomonas*. In another embodiment, the genetically modified organism the exogenous gene is from *Ideonella sakaiensis*. In another embodiment, the genetically modified organism has a PET deconstruction products that comprise at least one of bis(2-Hydroxyethyl) terephthalate, mono-(2-hydroxyethyl) terephthalate, terephthalate, ethylene glycol, β-ketoadipate, or muconate.

LJ041 forms holes on PET film (Panel 2J) HPLC chromatographs of PET-degraded products after 24 h and 72 h. Experiments were conducted in 5 mL M9 medium containing 20 mM glucose and about 60 mg of amorphous PET particle.

Figure 3:
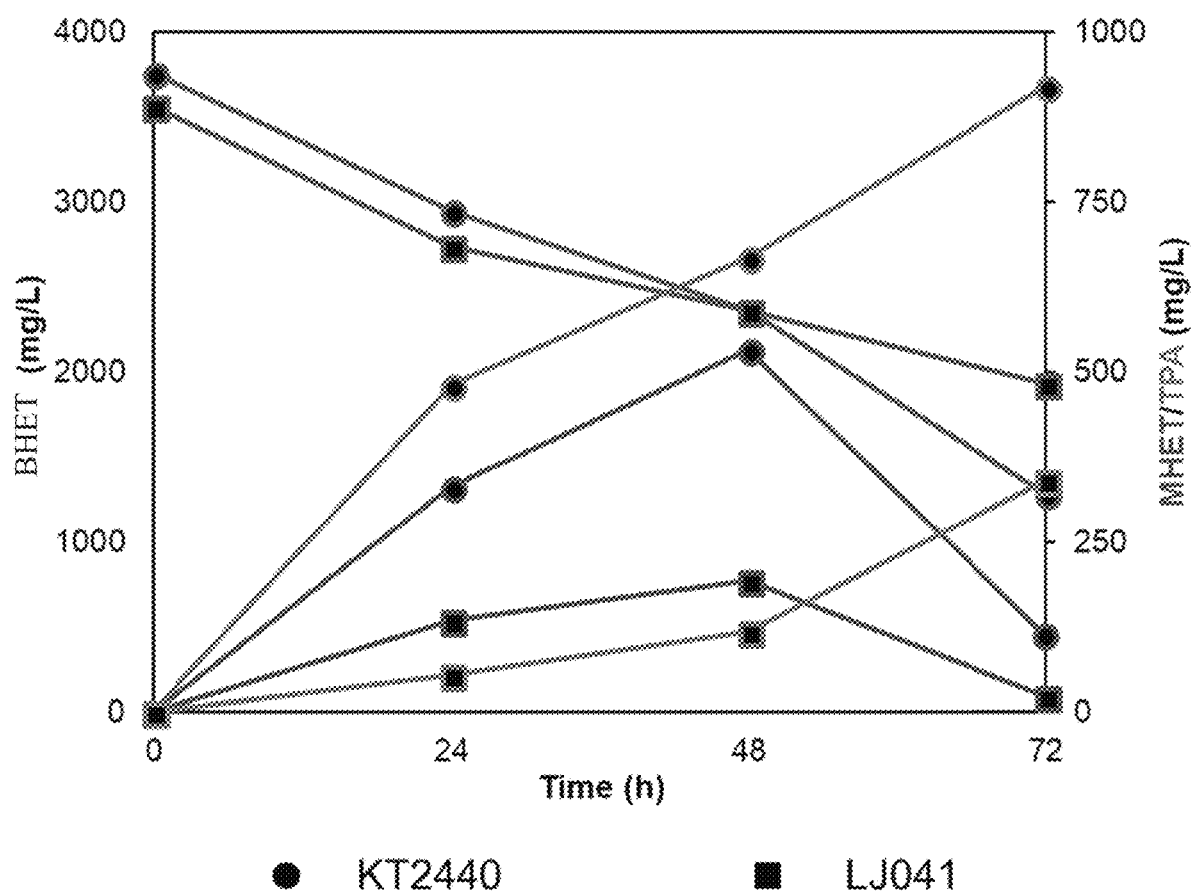

FIG. 3 depicts strain LJ041 that was tested for selective degradation of BHET to TPA. The LJ041 strain converted BHET to TPA at 3-fold higher rate relative to wild-type *P. putida* KT2440 (LJ041: 12.8 mg/L/h vs KT2440: 4.7 mg/L/h).

Figure 4:
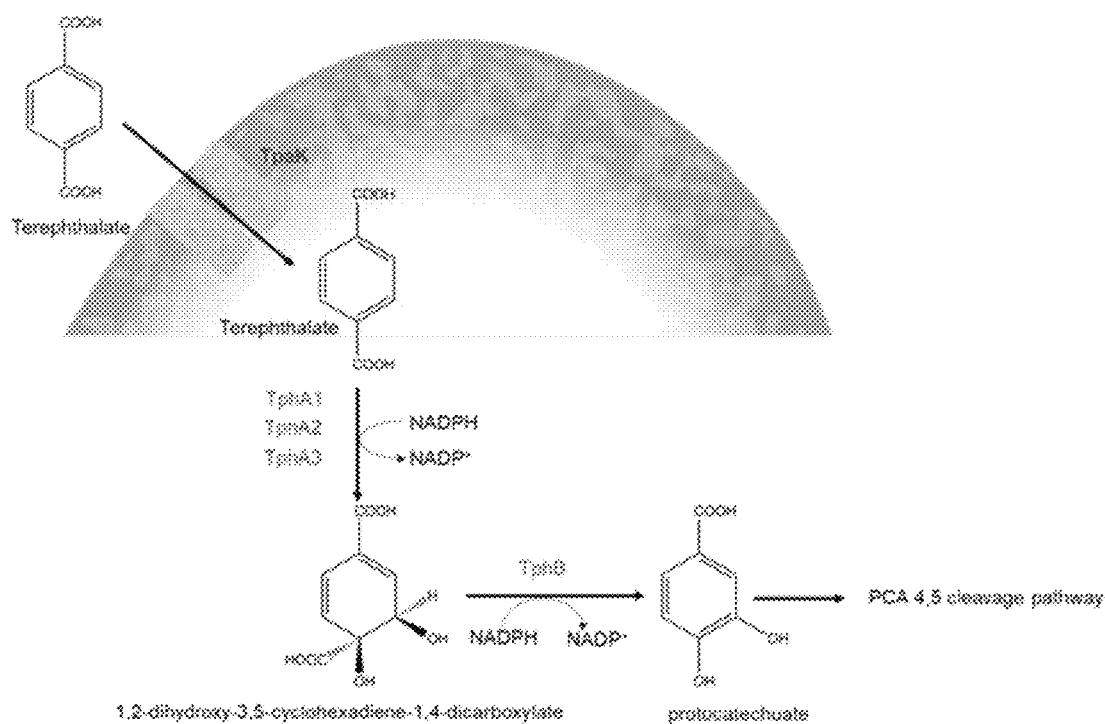

FIG. 4 depicts Engineered TPA catabolic pathway in *P. putida* KT2440, transporter TpaK and catabolic genes (TphA1, TphA2, TphA3, and TphB) are originally from *R. jostii* RHA1 and *Comamonas* sp. strain E6, respectively.

FIG. 5 depicts Engineered *P. putida* KT2440 strain enables TPA utilization. (A) Growth curves of the strain (B) growth rate of the strains (C) TPA utilization of the strains. Growth of the strains was assessed in minimal medium containing either 10 mM TPA or 10 mM PCA as the sole substrate for growth, and TPA utilization was measured during growth in minimal medium with 10 mM TPA as the sole growth substrate. Concentrations of TPA were measured using high performance liquid chromatography (HPLC) by injecting culture supernatant onto a Rezex RFQ-Fast Acid H+ (8%) HPLC column. Mobile phase consisted of 5 mM $H_2SO_4$, and samples were run at 0.6 ml/min at 60° C. TPA eluted at ~21 minutes and was detected at a wavelength of 230 nm via a UV-Vis detector. Area under the elution peak was integrated and TPA concentration was calculated against a standard.

FIG. 6A depicts codon optimized sequences of PETase (SEQ ID NO: 1) and MHETase (SEQ ID NO: 2) genes from *Ideonella sakaiensis* 201-F6 to *P. putida* KT2440.

Figure 7:
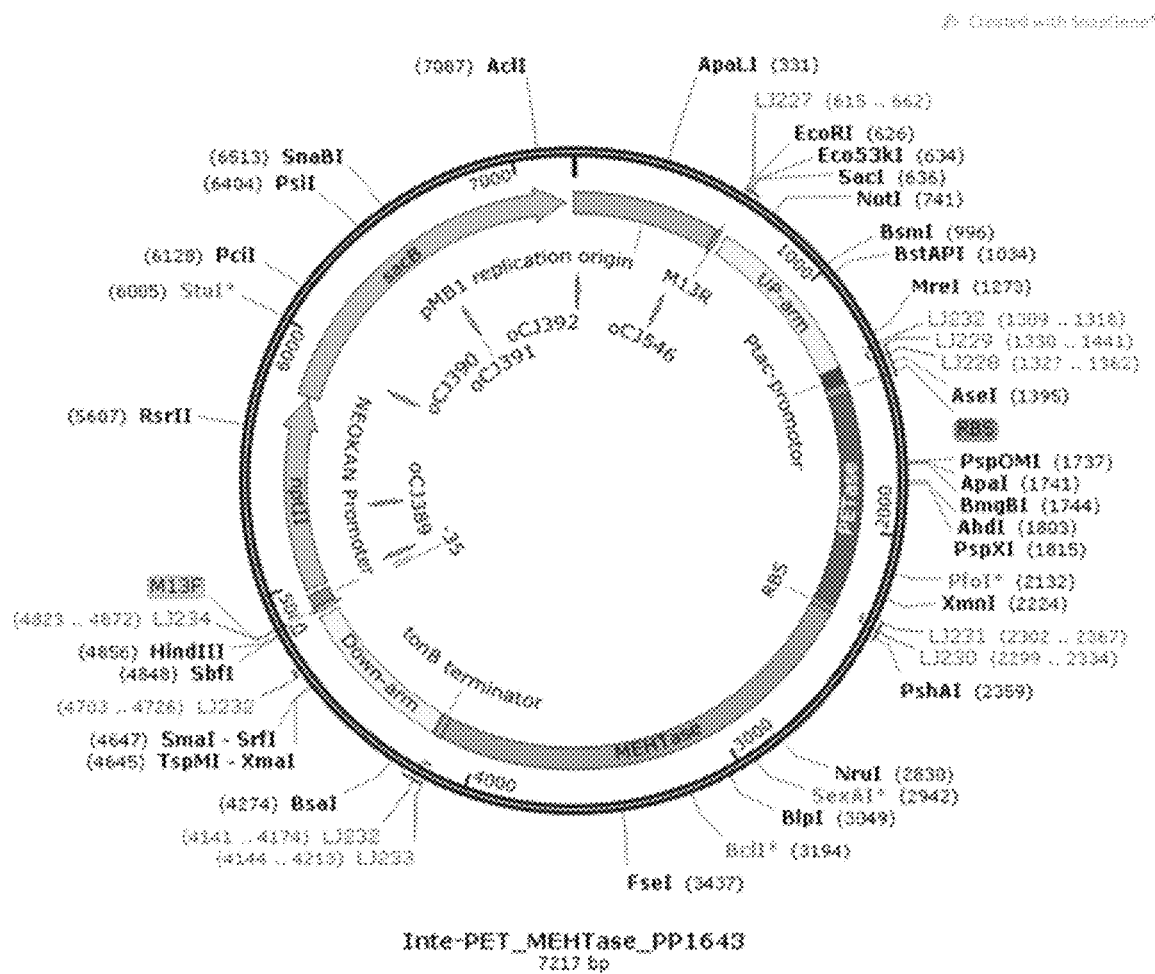

FIG. 7 depicts a plasmid map of pLJ080.

FIG. 8 depicts the nucleotide sequence of plasmid pLJ080 (SEQ ID NO: 3).

FIG. 9 depicts the amino acid sequences of PETase (SEQ ID NO: 4) and MHETase (SEQ ID NO: 5).

Figure 10:
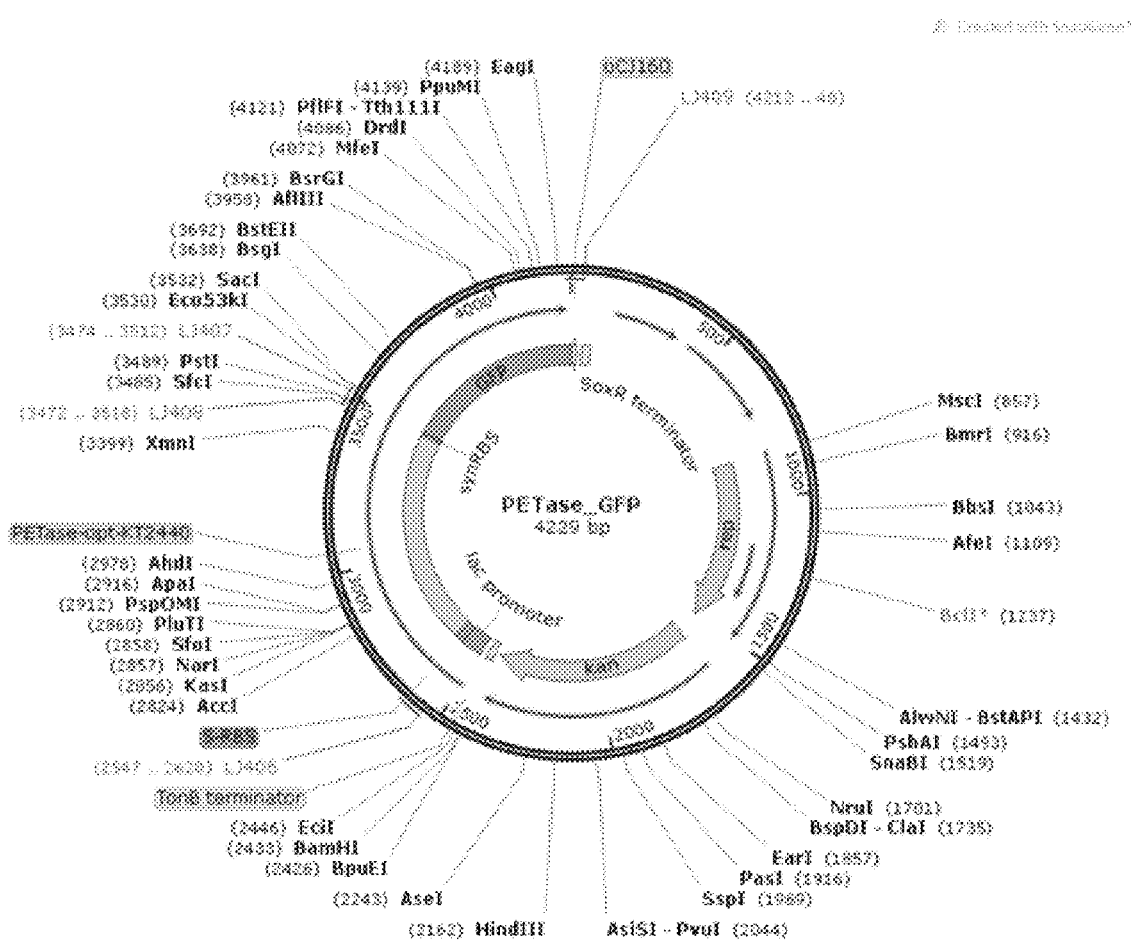

FIG. 10 depicts a plasmid map of pLJ081.

FIG. 11 depicts the plasmid sequence (SEQ ID NO: 6) of PETase with GFP tag (pLJ081).

FIG. 12 depicts (SEQ ID NO: 7) the nucleotide sequence of synthetic tphCi gene.

FIG. 13 depicts (SEQ ID NO: 8) the nucleotide sequence of synthetic tphA2u gene.

FIG. 14 depicts (SEQ ID NO: 9) the nucleotide sequence of synthetic tphA3u gene.

FIG. 15 depicts (SEQ ID NO: 10) the nucleotide sequence of synthetic tphBu gene.

FIG. 16 depicts (SEQ ID NO: 11) the nucleotide sequence of synthetic tphA1u gene.

FIG. 17 depicts (SEQ ID NO: 12) the nucleotide sequence of synthetic tpiB gene.

FIG. 18 depicts (SEQ ID NO: 13) the nucleotide sequence of synthetic tpiA gene.

FIG. 19 depicts (SEQ ID NO: 14) the nucleotide sequence of the local chromosomal sequence in strain IP103. Homology arms sequences are shown in italic. Synthetic ribosome binding sites are shown in bold. Coding sequences for tph genes are underlined.

FIG. 20 depicts (SEQ ID NO: 15) the nucleotide sequence of the local chromosomal sequence in strain IP131. Homology arms sequences are shown in italic. Synthetic ribosome binding sites are shown in bold. Coding sequences for tph, tpi and kanamycin selection marker genes are underlined.

Figure 21:
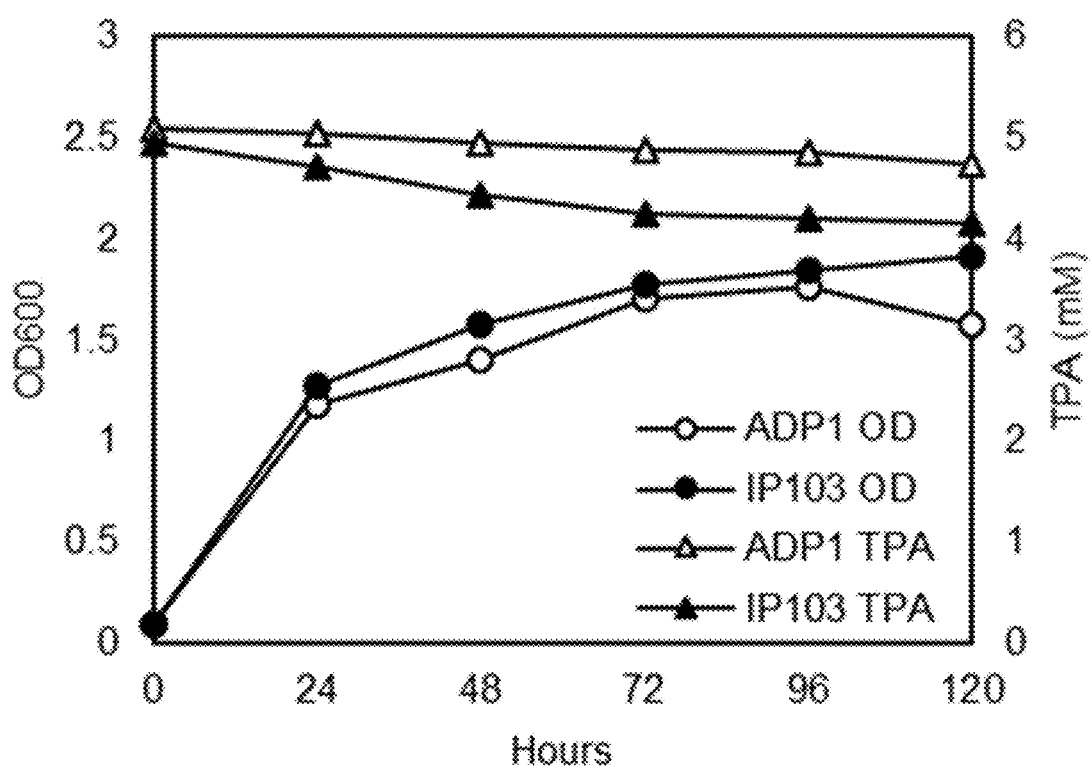

FIG. 21 depicts growth and TPA concentration in a medium containing an engineered *Acinetobacter baylyi* ADP1 strain, IP103, expressing the $tphC_{II}A2_{II}A3_{II}B_{II}A_{II}$ synthetic genes was grown in *Acinetobacter* minimal media in the presence of 5 mM terephthalic acid and 20 mM pyruvate.

Figure 22:
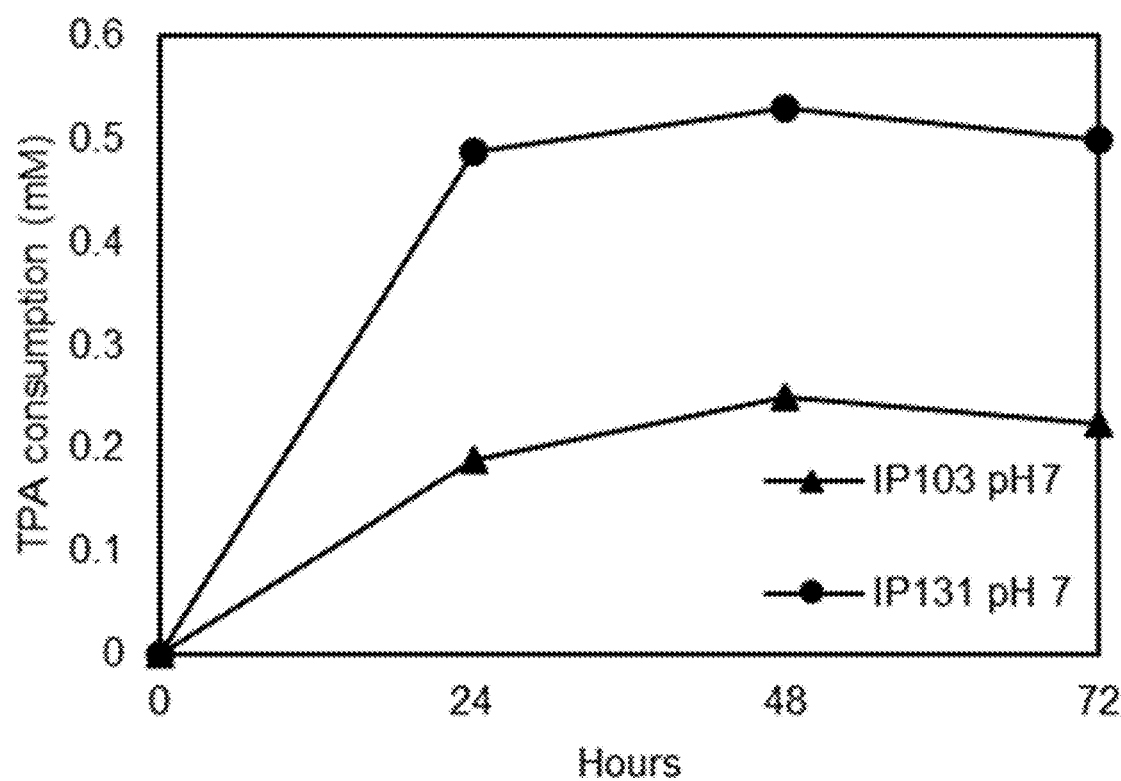

FIG. 22 depicts TPA consumption over time of an engineered *Acinetobacter baylyi* ADP1 strain, IP 131, expressing the synthetic terephthalate transporter genes, tpiAB, as well as the $tphC_{II}A2_{II}A3_{II}B_{II}A_{II}$ genes, and the parent strain, IP103, expressing only the $tphC_{II}A2_{II}A3_{II}B_{II}A_{II}$ genes, were grown in *Acinetobacter* minimal media supplemented with 5 mM terephthalic acid and 20 mM pyruvate. The strains were fed only at the beginning of the experiment.

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

In an embodiment, disclosed herein is an engineered *P. putida* KT2440 co-expressing PETase and MHETase enzymes that selectively degrades PET into monomers, ethylene glycol and terephthalate (TPA). In another embodiment, disclosed herein are methods for making and using a highly efficient EG metabolizing *P. putida* KT2440 strain. Given that native *P. putida* does not have a TPA metabolic pathway, nor the proteins to transport TPA into the cell, the next metabolic engineering challenge for developing synthetic *P. putida* strain to plastic upcycling was enabling TPA catabolism in *P. putida* KT2440. TPA transporters and catabolic pathway have been characterized in several microorganisms including *Comamonas* sp. strain E6 and *Rhodococcus jostii* RHA1.

In an embodiment, disclosed herein are engineered *P. putida* KT2440 strains that use TPA through heterologous expression of a TPA transporter from *Rhodococcus jostii* RHA1 and catabolic genes from *Comamonas* sp. E6 (FIG. 4). In an embodiment, the pcalJ gene was knocked out in the engineered strains, enabling the biological conversion of TPA to β-ketoadipate. Ultimately, the engineered strains disclosed herein enable the upcycling of PET-derived TPA into atom-efficient β-ketoadipic acid, a high-value chemical that can be used to produce a biodegradable plastic material with superior properties.

Disclosed herein, in an embodiment, TPA catabolism is enabled in *P. putida* KT2440 by heterologous expression of TPA transporters (tpaK) and catabolic genes cluster I or II from *R. jostii* RHAI and *Comamonas* sp. E6, respectively. The engineered, non-naturally occurring strains can use TPA as a sole carbon source and use TPA at about 0.05 g L-1 h-l. In an embodiment, the pcalJ gene was knocked out in an engineered TPA utilizing strain. The strain could convert TPA to β-ketoadipate. In another embodiment, TPA utilization strain can be engineered for consolidated bioprocessing of PET by enabling selective degradation of PET and ethylene glycol utilization. In an embodiment, strains could be evolved to enhance TPA catabolic rates.

The present disclosure also relates to a biological strategy for degrading PET, which can subsequently enable atom-efficient biological transformations to novel intermediates (e.g., β-ketoadipate and/or muconate), which may be converted to high strength composites. PETase hydrolyses PET to produce bis(2-hydroxyethyl) terephthalate (BHET), mono-(2-hydroxyethyl) terephthalate (MHET), terephthalate (TPA), and ethylene glycol (EG), and MHETase catalyzes MHET to TPA and EG. Hence, as shown herein, co-expression of PETase and MHETase in an engineered strain can enable PET degradation to TPA and EG. Thus, in some embodiments of the present disclosure, a biological method is provided for the selective degradation of PET into PET monomers via co-expression and secretion of PETase and MHETase in *Pseudomonas putida*, which can grow well in simple minimal salt medium.

Therefore, the present disclosure relates to biological methods for the selective degradation of PET into PET monomers via co-expression PETase and MHETase in *Pseudomonas putida*, which can grow well in simple minimal salt medium. Among other things, *I. sakaiensis* PETase, ISF6_4831 and MHETase, ISF6_0224 genes were codon optimized for expression in KT2440 including their secretion signal peptides, which are compatible to the *P. putida* chaperone SecB-dependent secretion system. In addition, the genes were integrated into the *P. putida* genome with the tac promoter to enable constitutive expression. In certain embodiment, the term "tac", "Ptac" and "P-Tac" may be used interchangeable to mean a tac promoter. The developed LJ041 strain formed a biofilm on PET. LJ041 enables highly-selectively degradation of PET into monomer TPA via BHET and MHET and confirmed secretion of PETase and MHETase enzymes via the chaperone-dependent native *P. putida* secreting system. These innovations could lead to a *P. putida* strain for selective biological degradation and conversion of PET into bio-derived chemical building blocks.

I. sakaiensis PETase, ISF6_4831 and MHETase, ISF6_0224 genes were codon optimized to KT2440 including their secretion signal peptides, which are compatible to the *P. putida* chaperone Sec-dependent secretion system. To confirm secretion of codon optimized PETase in *P. putida* via the *I. sakaienesis* secretion signal peptide, green fluorescent protein (GFP) was genetically linked to the C-terminus of PETase and expressed in *P. putida*. Efficient secretion of GFP-tagged PETase was confirmed via microscopy and immunoprecipitation, see FIG. 1: Panel A illustrates bright field microscopic observation of the strain expressing PETase with GFP tag; Panel B illustrates microscopic observation of GFP signal of the strain expressing PETase with GFP tag; Panel C illustrates GFP signal of the supernatant of wild-type strain and the strain expressing GFP tagged PETase; Panel D illustrates immunoprecipitation of GFP tagged PETase with GFP specific GFP-Trap® (ChromoTek GmbH, Planegg-Martinsried, Germany); and Panel E illustrates a microscopic image of PET particle incubated with the strain expressing GFP tagged PETase.

Figures 2A, 2B, 2C, 2D, 2E, 2F, 2G, 2H, 2I, 2J:
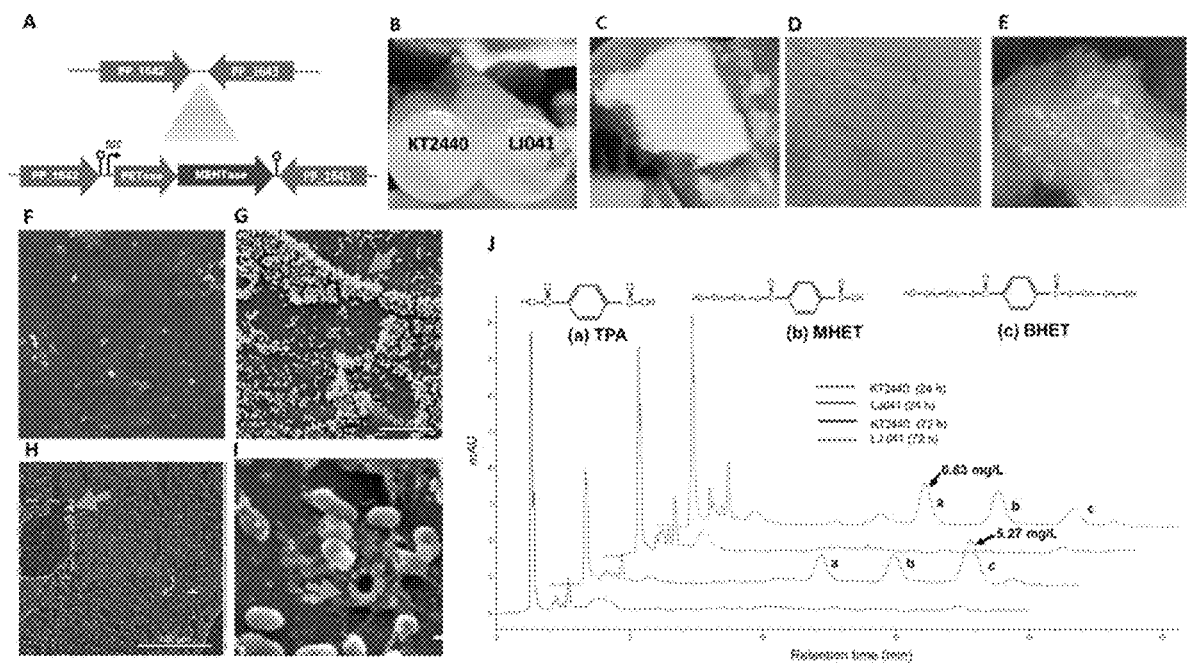
FIG. 2 depicts degradation results of PET by LJ041 (Panel 2A) integrated gene cassette (Panel 2B) visual observation of biofilm of LJ41 on PET film (arrow) (Panel 2C) fragmenting PET by LJ041 (Panel 2D) SEM observation of PET particles cultured with KT2440, after 5 days of incubation (Panel 2E) SEM observation of PET cultured with LJ041, and arrow indicates the biofilm on PET (Panel 2F) SEM image revealed that KT2440 does not form biofilm on PET (Panel 2G) SEM observation of LJ041 biofilm forming cells on PET (Panel 2H) SEM observation of fragmenting PET film (highlighted area with arrow) by LJ041 (Panel 2I)

Next, referring to FIG. 2, the codon optimized PETase and MHETase genes were successfully integrated into the *P. putida* genome with the tac promoter to enable constitutive expression, and obtained the LJ041 strain (see Panel A). LJ041 formed a biofilm (see FIG. 2, Panels B, E, and G) on amorphous PET coupon and visually observed the fragmenting PET (see FIG. 2, Panels C and H). HPLC analysis revealed that LJ041 enabled highly-selectively degradation of PET into monomer TPA via BHET and MHET (see FIG. 2, Panel J). These results indicate that the codon-optimized signal sequences (which are codon optimized to KT2440), "ATGAACTTCCCTCGCGCGTCGCGCCT-GATGCAGGCGGCGGTCCTCGGTGGTCTGAT GGCAGTCAGCGCCGCGGCCACC" (SEQ ID NO: 16), which encode "MNFPRASRLMQAAVLGGL-MAVSAAATA" (SEQ ID NO: 17), and "ATGCAGAC-CACCGTCACCACTATGCTGCTGG-CATCGGTCGCCCTGGCCGCC" (SEQ ID NO: 18), which is enclosed signal peptide "MQTTVTTMLLASVALAA" (SEQ ID NO: 19), for MHETase, respectively, are sufficient for enzyme secretion. These secretion signal peptides may be used for trafficking other proteins in *P. putida* via the Sec-dependent native *P. putida* secreting system. Of note, *Ideonella sakaiensis* 201-F6 grows only in rich-medium but not in the minimal salt medium (data not shown). Thus, the LJ014 has an advantage over the *Ideonella sakaiensis* 201-F6 as an industrial biocatalyst to degrade PET and to subsequently upgrade the degradation products into high-value chemicals. In addition, we introduced PETase and MHETase encoding genes into the genome of *P. putida* EM42 strain via deploying pLJ080 plasmid, the genome reduced version of *P. putida* KT2440, and developed LJ042 strain.

FIG. 2 illustrates degradation results of PET by LJ041 (Panel A) integrated gene cassette (Panel B) visual observation of biofilm of LJ41 on PET film (arrow) (Panel C) fragmenting PET by LJ041 (Panel D) SEM observation of PET particles cultured with KT2440, after 5 days of incubation (Panel E) SEM observation of PET cultured with LJ041, and arrow indicates the biofilm on PET (Panel F) SEM image revealed that KT2440 does not form biofilm on PET (Panel G) SEM observation of LJ041 biofilm forming cells on PET (Panel H) SEM observation of fragmenting PET film (highlighted area with arrow) by LJ041 (Panel I) LJ041 forms holes on PET film (Panel J) HPLC chromatographs of PET-degraded products after 24 h and 72 h. Experiments were conducted in 5 mL M9 medium containing 20 mM glucose and about 60 mg of amorphous PET particle.

Next, the LJ041 strain was tested for selective degradation of BHET to TPA (see FIG. 3). The LJ041 strain converted BHET to TPA at 3-fold higher rate relative to wild-type *P. putida* KT2440 (LJ041: 12.8 mg/L/h vs KT2440: 4.7 mg/L/h). Taken together, this innovation could lead to a *P. putida* strain for selective biological degradation and conversion of PET into bio-derived chemical building blocks.

Materials and Methods

Plasmid construction: Q5 Hot Start High-Fidelity 2X Master Mix (New England Biolabs) and primers synthesized by Integrated DNA Technologies (IDT) were used in all PCR amplification. Plasmids were constructed using Gibson Assembly® Master Mix (New England Biolabs) according to the manufacturer's instructions. Primers used for PCR amplification and Gibson assembly are listed in Table 1. The vector, pBLT-2 (Addgene plasmid #22806) was used for plasmid-based overexpression of PETase with a green fluorescence protein (GFP) tag. Plasmids for gene integration were constructed in pK18sB, which is unable to replicate in *P. putida* KT2440, and contains the kanamycin-resistant marker to select for integration of the plasmid into the genome by homologous recombination and sacB to counter select for a second recombination event to subsequently remove the plasmid backbone from the genome. Detail of plasmids construction is provided in Table 2.

TABLE 1

List of Primers

| Primer ID | 5'-3' |
|---|---|
| oLJ227 | GACATGATTACGAATTCGAGCTCGGTACCCGTGCGATTA CTGTGGGAG (SEQ ID NO: 20) |
| oLJ232 | CCGGAGGCTTTTGACTCGGAGGCGCGGCGCAGGC (SEQ ID NO: 21) |
| oLJ228 | CGGATAACAATTTCACACTGAGTATTGCCTGAACCG (SEQ ID NO: 22) |
| oLJ229 | TTCAGGCAATACTCAGTGTGAAATTGTTATCCGCTCACA ATTCCACACATTATACGAGCCGATGATTAATTGTCAACA GCTCTTCATCAAGTCAAAACACTATATAGGAACG (SEQ ID NO: 23) |
| oLJ230 | ATGTAATCCTTGTTATAGGCTGCAGTTCGCAGTGCG (SEQ ID NO: 24) |
| oLJ231 | ACTGCGAACTGCAGCCTATAACAAGGATTACATATAAGG GTATATCAAATGCAGACCACCGTCACC (SEQ ID NO: 25) |
| oLJ233 | TGCGCCGCGCCTCCGAGTCAAAAGCCTCCGGTCGGAGGC TTTTGACTTCAAAACCACCCTGCTGTCGATG (SEQ ID NO: 26) |
| oLJ234 | CGGCCAGTGCCAAGCTTGCATGCCTGCAGGAAATCTAAC TGCCTTCGCCC (SEQ ID NO: 27) |
| oLJ406 | TATGTTGTGTGGAATTGTGAGCGGATAACAATTTCACAC TTTCATCAAGTCAAAACACTATATAGGAACGAAAC (SEQ ID NO: 28) |
| oLJ407 | TCCGCACTGCGAACTGCAGCGGTGGTTCTGAGGAATCTT ACATGAGC (SEQ ID NO: 29) |
| oLJ408 | GTAAGATTCCTCAGAACCACCGCTGCAGTTCGCAGTGCG (SEQ ID NO: 30) |
| oLJ409 | AGTCCAGTTACGCTGGAGTCTGAGGCTCGTCCTGAATGA TCTACTTGTAGAGTTCGTC (SEQ ID NO: 31) |

TABLE 2

Plasmid construction details

| Plasmid | Purpose | Construction detail |
|---|---|---|
| pLJ080 | Genome integration of over-expressing cassette of PETase and MHETase | The PETase genes cassette was amplified with primers oLJ229 (Fwd) and oLJ230 (Rev), and MHETase oLJ231 (Fwd) and oLJ232 (Rev) using synthesizes gBlock as a temple. The 5' homology region was amplified from *P. putida* KT2440 genomic DNA with primers oLJ227(Fwd), and oLJ228 (Rev), and 3' homology region was amplified with oLJ233 (Fwd) and oLJ234 (Rev). These products were assembled into pK18sB digested with SmaI and SalI. |
| pLJ081 | Over-expressing PETase-GFP | A DNA fragment containing the PETase genewas amplified from pLJ080 with primers oLJ406 (Fwd) and oLJ407 (Rev), and GFP gene fragment was obtained with primers oLJ408 (Fwd) and oLJ409 (Rev), amplified from GFP containing plasmid. This product was assembled into pBLT-2 digested with XbaI and EcoRV. |

The PETase and MHETase genes from *Ideonella sakaiensis* 201-F6 were codon optimized to *P. putida* KT2440 using online program Optimizer with a random approach (http://genomes.urv.es/OPTIMIZER/), gene fragments were synthesized at Integrated DNA Technologies, Inc, and obtained the double-stranded and linear gBlock, see FIG. 6. The plasmid used for of integration of codon optimize PETase and MHETase to *P. putida* KT2440 contain the approximately 0.7 kb homology region on either side of the intergenic region immediately after PP_1642 and PP_1643 of *P. putida* KT2440. Features include the tac promoter to drive gene expression and a tonB terminator situated behind the fragments cloned into the plasmid backbone, which are depicted in FIG. 7. Synthetic ribosomal binding site (sRBS) were designed using an online program from the Salis laboratory at Penn State University, in front of genes, the designed SRBS (TCATCAAGTCAAAACACTATATAG-GAACGAAACC (SEQ ID NO: 32)) of PETase was predicted to have a translation initiation rate (TIR) of 27306.09, and MHETase has a sRBS (TAACAAGGATTA-CATATAAGGGTATATCAA (SEQ ID NO: 33)) with TIR of 32480.74. Plasmid sequence of pLJ80 is provided in Table S5 in the Appendix. The protein sequences of PETase and MHETase are provided in FIG. 8. Plasmid was transformed into competent NEB 5-alpha F'I$^q$ *E. coli* (New England Biolabs) according to the manufacturer's instructions. Transformants were selected on LB plates containing 10 g/L tryptone, 5 g/L yeast extract, 5 g/L NaCl, and 15 g/L agar, supplemented with 50 µg/mL kanamycin grown at 37° C. The sequences of all plasmid inserts were confirmed using Sanger sequencing (GENEWIZ, Inc.).

Strain construction: *P. putida* KT2440 (ATCC 47054) was used as the basis of strain engineering and gene replacements were made using the antibiotic/sacB system of selection and counter-selection. In an embodiment, the properties and description of some strains disclosed herein is depicted in Table 3. To prepare electrocompetent cells of *P. putida* KT2440 strains, a modified sucrose-based protocol was used. The plasmid was introduced to competent cells via electroporated at 1.6 kV, 25 µF, 200 Ohms. The transformation was plated on an LB agar plate containing 50 µg/ml kanamycin antibiotics and incubated at 30° C. overnight. Initial colonies from the transformation plates were re-streaked on selective LB agar plates and grown at 30° C. overnight to obtain clonal transformants. For sucrose counter-selection, clonal transformants were streaked on YT plates containing 25% (YT+25%; w/v) sucrose (10 g/L yeast extract, 20 g/L tryptone, 250 g/L sucrose, 18 g/L agar), and incubated at 30° C. overnight. The single colony of *P. putida* KT2440 containing the PETase and MHETase genes were successfully isolated. The strain was analyzed for the correct gene replacement by performing a colony PCR at the site of integration. The LJ102 was constructed by transforming pLJ081 plasmid into *P. putida* KT2440, the plasmid map and sequence are provided in FIG. 10 and FIG. 11.

TABLE 3

Strains

| Strain ID | Genotype | Description of strain |
|---|---|---|
| KT2440 | *P. putida* KT2440 | Wild-type *P. putida* KT2440 (ATCC 47054) |
| EM42 | *P. putida* KT2440 Δprophage1-4 Δflagellum ΔendA-1 ΔendA-2 ΔTn7 ΔhsdRMS ΔTn4652 | Genome reduced strain derived from *P. putida* KT2440 obtained from Victor de Lorenzo's laboratory (Centro Nacional de Biotecnología (CNB-CSIC), Madrid, Spain) |
| LJ102 | KT2440 + pBTL-2-PETase_GFP | KT2440 containing the pBTL-2 plasmid with PETase and GFP |

TABLE 3-continued

Strains

| Strain ID | Genotype | Description of strain |
|---|---|---|
| LJ041 | KT2440 1642::Ptac::PETase-MHET | KT2440 with the PETase and MHETase cassette integrated within the intergenic region between PP_1642 and PP_1643 |
| LJ042 | EM42 PP 1642::Ptac::PETase-MHET | EM42 with the PETase and MHETase cassette integrated within the intergenic region between PP_1642 and PP_1643 |

PET and BHET degradation experiment: To assess the selective degradation of PET/BHET by the PETase and MHETase expressing strain, shake flask experiments were performed using 125 mL baffled flasks containing 25 mL modified M9 media (6.78 g/L $Na_2HPO_4$, 3.00 g/L $K_2HPO_4$, 0.50 g/L NaCl, 1.66 g/L $NH_4Cl$, 0.24 g/L $MgSO_4$, 0.01 g/L $CaCl_2$), and 0.002 g/L $FeSO_4$) supplemented with 20 mM of glucose and amorphous PET coupons (amorphous PET films with a crystallinity of 14.8+0.2%, synthesized at NREL) or BHET (Obtained from IBM Almaden Research Center, BHET was derived from waste PET bottles via chemical depolymerization process), and inoculated to $OD_{600}$ 0.1 with pre-culture. Pre-cultures of the strains were prepared by inoculating 25 mL M9 medium supplemented with 20 mM glucose in a 125 mL baffled flask to an $OD_{600}$ of 0.05-0.1 and incubating shaking at 225 rpm, 30° C. At mid log phase ($OD_{600}$ 0.5-1.0) cells were harvested by centrifugation at 13,000 rpm, and the cell pellets were washed twice and resuspended in M9 medium without a carbon source. Cultures were incubated shaking at 225 rpm, 30° C. 1 mL samples were collected periodically and subjected to HPLC analysis to detect the degraded products. After the fermentation, PET coupons were subjected to microscopic observation.

Scanning Electron Microscopy (SEM): Imaging by scanning electron microscopy (SEM) was performed using a FEI Quanta 400 FEG instrument under low vacuum (0.45 Torr) operating with the gaseous solid-state detector (GAD). Samples were prepared for imaging by fixation in 2.5% gluteraldehyde buffered in 1×PBS (EMS, Hatfield, PS), dehydration in an ethanol series, then freezing in liquid nitrogen followed by lyophilization. Dry samples were mounted on aluminum stubs using carbon tape, and sputter coated with 9 nm of Ir metal. Images were captured at a beam accelerating voltage of 24 keV.

High performance liquid chromatography (HPLC) analysis: Concentrations of TPA, MHET, and BHET were measured using HPLC by injecting 6 µL of 0.2-µm filter-sterilized culture supernatant onto an Agilent1100 series system (Agilent USA, Santa Clara, CA) equipped with a Phenomenex Rezex RFQ-Fast Fruit H+column (Phenomenex, Torrance, CA) and cation H+guard cartridge (Bio-Rad Laboratories, Hercules, CA) at 85° C. A mobile phase of 0.1N sulfuric acid was used at a flow rate of 1.0 mL/min. Diode array detectors were used for compound detection. Compounds were identified by relating the retention times and spectral profiles with standard HPLC grade pure compounds (Sigma Aldrich, St. Louis, MO, USA) and the concentration of each compound was calculated based on a calibration curves generated using pure compounds.

To enable TPA catabolismin *P. putida* KT2440, genes for TPA transport and for conversion of TPA into protocatechuic acid (PCA), an intermediate metabolite of β-ketoadipate pathway were introduced into the chromosome of *P. putida* strain KT2440. Three different operons containing genes required for TPA catabolism [two operons from *Comamonas* sp. E6 (operon I: tphA2I, tphA3I, tphBI, and tphAII) and (operon II: tphA2II, tphA3II, tphBII, and tphAIII), and one from *R. jostii* RHA1 (tpaA1, tpaA2, tpaC, and tpaB)], and two different operons containing transport genes [one from *Comamonas* sp. E6 (tphC, tpiA, and tpiB) and one from *R. jostii* RHA1 (tpaK) were tested in various combinations (Table 4). Additionally, each operon was placed under control of 3 different promoters of varying strengths (from strongest to weakest: P-Tac, P-549, P-Lac, P-3079). Those gene clusters were successfully integrated into a modified version of *P. putida* KT2440 that has 3 poly-attB genetic islands for DNA insertion via highly efficient phage integrase system.

TABLE 4

Generated strains of *P. putida* containing genes for terephthalic acid transport and catabolism under control of promoters with varying strengths.

| | Catabolic Genes | | | Transport Gene(s) | | | |
|---|---|---|---|---|---|---|---|
| TDM# | Source Organism | Operon | Promoter | Source Organism | Operon | Promoter | TPA growth |
| 56 | *Comamonas* | tphA2$_I$A3$_I$B$_I$A1$_I$ | P-Tac | *Comamonas* | tphC- | P-549 | No |
| 57 | sp. E6 | | P-Tac | sp. E6 | tpiBA | | No |
| 58 | | | P-Lac | | | | No |
| 59 | *Comamonas* | tphA2$_{II}$A3$_{II}$B$_{II}$A1$_{II}$ | P-Tac | *Comamonas* | tphC- | P-549 | No |
| 60 | sp. E6 | | P-Tac | sp. E6 | tpiBA | | No |
| 61 | | | P-Lac | | | | No |
| 62 | *Rhodococcus* | tpaA1A2CB | P-Tac | *Comamonas* | tphC- | P-549 | No |
| 63 | *jostii* RHA1 | | P-Tac | sp. E6 | tpiBA | | No |
| 64 | | | P-Lac | | | | No |
| 65 | *Comamonas* | tphA2$_I$A3$_I$B$_I$A1$_I$ | P-Tac | *Comamonas* | tphC- | P-Lac | No |
| 66 | sp. E6 | | P-Tac | sp. E6 | tpiBA | | No |
| 67 | | | P-Lac | | | | No |
| 68 | *Comamonas* | tphA2$_{II}$A3$_{II}$B$_{II}$A1$_{II}$ | P-Tac | *Comamonas* | tphC- | P-Lac | No |
| 69 | sp. E6 | | P-Tac | sp. E6 | tpiBA | | No |
| 70 | | | P-Lac | | | | No |
| 71 | *Rhodococcus* | tpaA1A2CB | P-Tac | *Comamonas* | tphC- | P-Lac | No |
| 72 | *jostii* RHA1 | | P-Tac | sp. E6 | tpiBA | | No |
| 73 | | | P-Lac | | | | No |
| 74 | *Comamonas* | tphA2$_I$A3$_I$B$_I$A1$_I$ | P-Tac | *Comamonas* | tphC- | P-3079 | No |

TABLE 4-continued

Generated strains of *P. putida* containing genes for terephthalic acid transport and catabolism under control of promoters with varying strengths.

| | Catabolic Genes | | | Transport Gene(s) | | | |
|---|---|---|---|---|---|---|---|
| TDM# | Source Organism | Operon | Promoter | Source Organism | Operon | Promoter | TPA growth |
| 75 | sp. E6 | | P-Tac | sp. E6 | tpiBA | | No |
| 76 | | | P-Lac | | | | No |
| 77 | *Comamonas* | tphA2$_{II}$A3$_{II}$B$_{II}$A1$_{II}$ | P-Tac | *Comamonas* | tphC- | P-3079 | No |
| 78 | sp. E6 | | P-Tac | sp. E6 | tpiBA | | No |
| 79 | | | P-Lac | | | | No |
| 80 | *Rhodococcus* | tpaA1A2CB | P-Tac | *Comamonas* | tphC- | P-3079 | No |
| 81 | *jostii* RHA1 | | P-Tac | sp. E6 | tpiBA | | No |
| 82 | | | P-Lac | | | | No |
| 83 | *Comamonas* | tphA2$_I$A3$_I$B$_I$A1$_I$ | P-Tac | *Rhodococcus* | tpaK | P-549 | Yes |
| 84 | sp. E6 | | P-Tac | *jostii* RHA1 | | | Yes |
| 85 | | | P-Lac | | | | No |
| 86 | *Comamonas* | tphA2$_{II}$A3$_{II}$B$_{II}$A1$_{II}$ | P-Tac | *Rhodococcus* | tpaK | P-549 | Yes |
| 87 | sp. E6 | | P-Tac | *jostii* RHA1 | | | Yes |
| 88 | | | P-Lac | | | | No |
| 89 | *Rhodococcus* | tpaA1A2CB | P-Tac | *Rhodococcus* | tpaK | P-549 | No |
| 90 | *jostii* RHA1 | | P-Tac | *jostii* RHA1 | | | No |

Figures 5A, 5B, 5C:
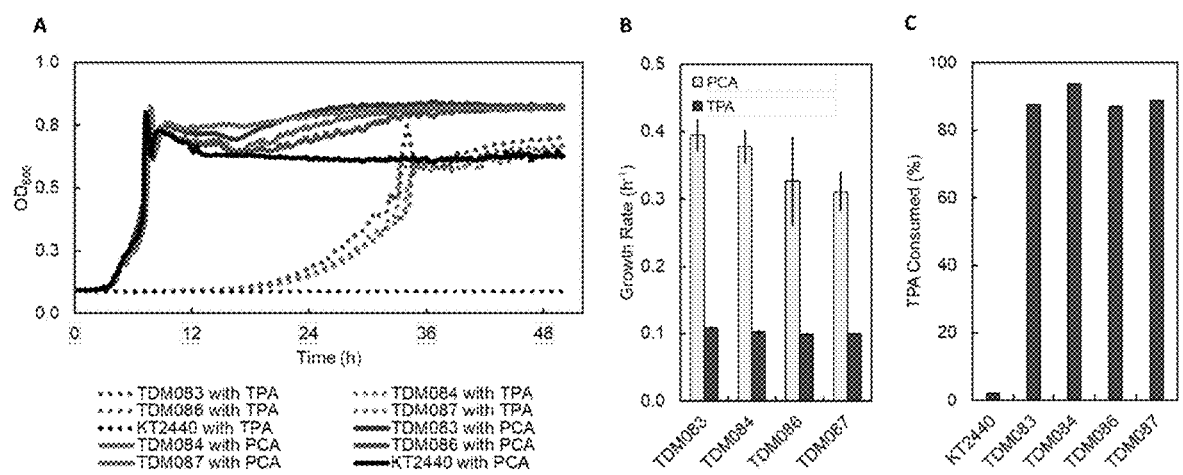

In an embodiment, thirty-five strains were generated, of which four had substantial growth with TPA as the sole carbon source. Each of the four strains that were able to metabolize TPA contained one of the two *Comamonas* sp. E6 catabolic operons (I or II) in combination with the *R. jostii* transporter. Robust expression was a requirement for TPA utilization, as growth was only detected when catabolic and transport genes were expressed from the strongest tested promoters (P-Tac or P-549). Of note, the growth data revealed that neither *Comamonas* sp. E6 TPA transporter nor *R. jostii* RHAI catabolic genes enable TPA catabolism in *P. putida* KT2440. Growth in minimal media containing either 10 mM TPA or 10 mM PCA was compared for each of the TPA catabolizing strains. An extended lag phase and about a 3-fold slower growth rate for all strains indicated that TPA is not used as efficiently as PCA as a substrate (FIGS. 5A and 5B, Table 5). However, quantification of TPA from late exponential phase cultures grown in minimal media with 10 mM TPA indicated that about 90% of TPA was consumed (FIG. 5C). Ongoing experiments are aimed at optimizing import and processing of TPA. Additionally, the ultimate objective of this project is to use *P. putida* for the valorization of TPA into other high value products, such as β-ketoadipate. To that end, the genes that facilitate β-ketoadipate consumption, pcaIJ, have been deleted from the TPA utilizing strains to allow β-ketoadipate accumulation, and the strains have been confirmed by PCR.

TABLE 5

Growth characteristics of TPA utilizing strains of *P. putida* in minimal medium containing either 10 mM TPA or 10 mM PCA as the sole growth substrate.

| Strain | Substrate | Lag Phase (h) | Growth Rate (h$^{-1}$) | Doubling Time (h) |
|---|---|---|---|---|
| TDM083 | TPA | 16.4 ± 0.1 | 0.108 ± 0.002 | 6.41 ± 0.13 |
| TDM084 | TPA | 16.4 ± 0.8 | 0.102 ± 0.003 | 6.81 ± 0.20 |
| TDM086 | TPA | 17.4 ± 0.9 | 0.099 ± 0.003 | 7.01 ± 0.19 |
| TDM087 | TPA | 17.6 ± 0.5 | 0.099 ± 0.001 | 6.98 ± 0.07 |
| KT2440 | TPA | No Growth | No Growth | No Growth |
| TDM083 | PCA | 2.8 ± 0.0 | 0.395 ± 0.024 | 1.76 ± 0.10 |
| TDM084 | PCA | 2.8 ± 0.0 | 0.378 ± 0.026 | 1.84 ± 0.13 |
| TDM086 | PCA | 2.9 ± 0.1 | 0.327 ± 0.066 | 2.17 ± 0.40 |
| TDM087 | PCA | 2.8 ± 0.3 | 0.311 ± 0.029 | 2.24 ± 0.22 |
| KT2440 | PCA | 2.6 ± 0.3 | 0.300 ± 0.010 | 2.31 ± 0.08 |

Different versions of a synthetic operon coding for a terephthalic acid degradation pathway were constructed for chromosomal integration and expression in *Acinetobacter baylyi* ADP1. This operon includes codon-optimized versions of the genes tphC$_{II}$A2$_{II}$A3$_{II}$B$_{II}$A$_{II}$ and tpiBA from *Comamonas* sp. E6 under control of a constitutive promoter, with each gene being preceded by a synthetic ribosome binding site sequence. The description and accession numbers for the wild-type *Comamonas* sp. E6 tphC$_{II}$A2$_{II}$A3$_{II}$B$_{II}$A$_{II}$ and tpiBA genes are listed in Table 6. For the homologous recombination and insertion of the operon in the chromosome of *Acinetobacter baylyi* ADP1, upstream and downstream homology arms of ~2000 bp were amplified from genomic DNA and assembled by overlap extension PCR to flank the synthetic genes. Linear DNA fragments were transformed into naturally competent *Acinetobacter baylyi* ADP1 cells as described in the literature.

TABLE 6

| Gene | Protein accession number | Description |
|---|---|---|
| tphC$_{II}$ | BAE47084.1 | Periplasmic terephthalate binding receptor |
| tphA2$_{II}$ | BAE47085.1 | Oxygenase large subunit of terephthalate 1,2-dioxygenase |
| tphA3$_{II}$ | BAE47086.1 | Oxygenase small subunit of terephthalate 1,2-dioxygenase |
| tphB$_{II}$ | BAE47087.1 | 1,2-dihydroxy-3,5-cyclohexadiene-1,4-dicarboxylate dehydrogenase |
| tphA1$_{II}$ | BAE47088.1 | Reductase component of terephthalate 1,2-dioxygenase |

TABLE 6-continued

| Gene | Protein accession number | Description |
|---|---|---|
| tpiB | BAN66715.1 | Small transmembrane protein of the aromatic acids transporter |
| tpiA | BAN66716.1 | Large transmembrane protein of the aromatic acids transporter |

Figures 1A, 1B, 1C, 1D, 1E:
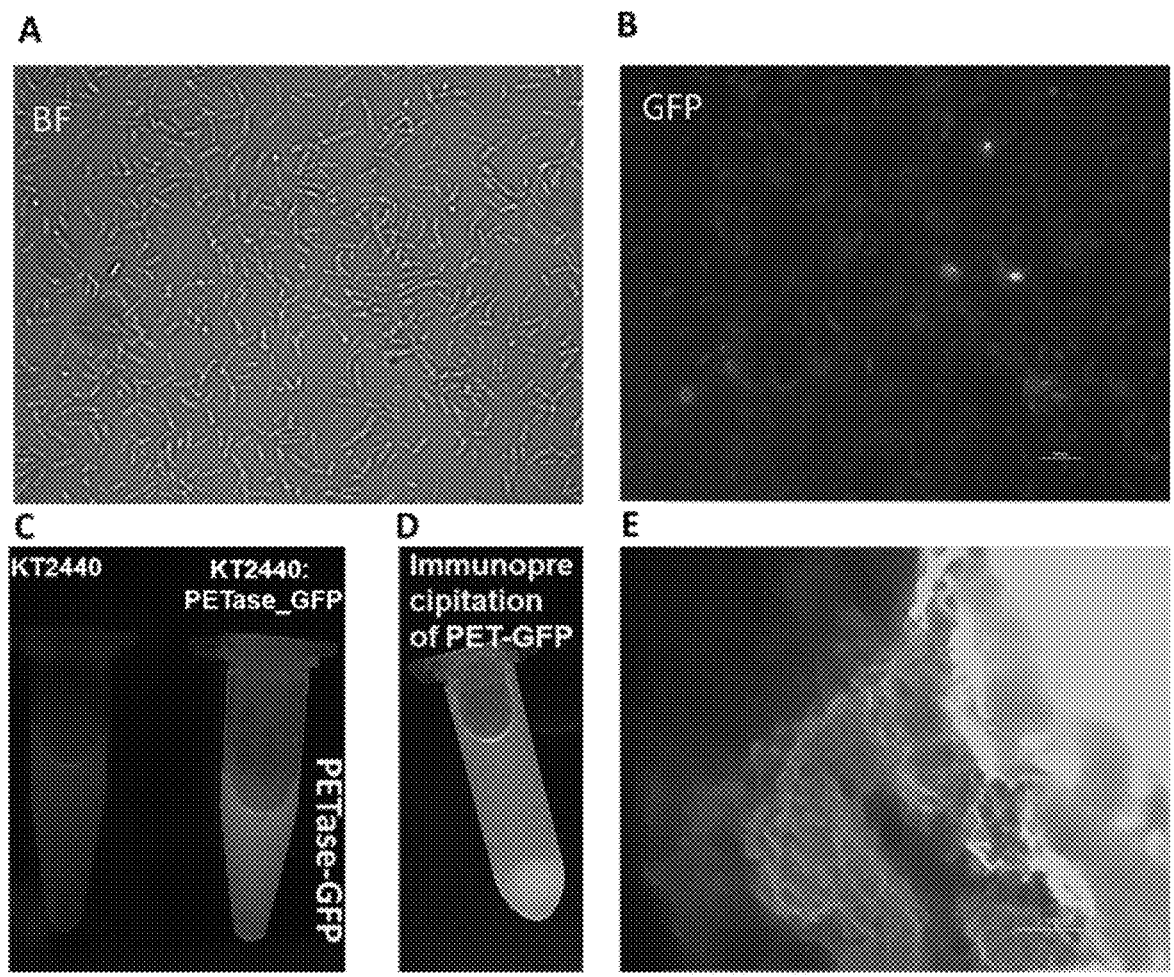
FIG. 1 depicts: Panel 1A illustrates bright field microscopic observation of the strain expressing PETase with GFP tag; Panel 1B illustrates microscopic observation of GFP signal of the strain expressing PETase with GFP tag; Panel 1C illustrates GFP signal of the supernatant of wild-type strain and the strain expressing GFP tagged PETase; Panel 1D illustrates immunoprecipitation of GFP tagged PETase with GFP specific GFP-Trap® (ChromoTek GmbH, Planegg-Martinsried, Germany); and Panel 1E illustrates a microscopic image of PET particle incubated with the strain expressing GFP tagged PETase.

In a first shake-flask experiment, an engineered *Acinetobacter baylyi* ADP1 strain, IP103, expressing the tphC$_{II}$A2$_{II}$A3$_{II}$B$_{II}$A$_{II}$ synthetic genes was grown in *Acinetobacter* minimal media in the presence of 5 mM terephthalic acid and 20 mM pyruvate, the latter being fed every 24 hours to support cell growth. As seen in FIG. 1, more terephthalic acid was consumed by IP103 than by the wild-type strain. The slight decrease in TPA concentration for the wild-type strain is an effect of the dilution caused by feeding daily with 20 mM pyruvate to support cell growth.

Genes expressing the terephthalate transporter from *Comamonas* sp. E6, tpiBA, were then similarly codon optimized and incorporated into the genome of IP103 downstream of the tphC$_{II}$A2$_{II}$A3$_{II}$B$_{II}$A$_{II}$ genes, such that expression of all of these genes was driven as an operon by the same promoter. In a shake-flask experiment, this new strain expressing the synthetic terephthalate transporter genes, tpiAB, as well as the tphC$_{II}$A2$_{II}$A3$_{II}$B$_{II}$A$_{II}$ genes, IP131, and the parent strain expressing only the tphC$_{II}$A2$_{II}$A3$_{II}$B$_{II}$A$_{II}$ genes, IP103, were grown in *Acinetobacter* minimal media supplemented with 5 mM terephthalic acid and 20 mM pyruvate, fed only at the beginning of the experiment. As seen in FIG. 2, IP131 was able to degrade terephthalic acid more quickly, than IP103, indicating that expression of the terephthalate transporter improved the ability of this strain to metabolize this substrate.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A genetically modified *Pseudomonas* organism comprising at least two exogenous gene additions, wherein:
a first exogenous gene addition comprises a gene with a sequence that is at least 90% identical to SEQ ID NO: 1 and a second exogenous gene addition comprises a gene with a sequence that is at least 90% identical to SEQ ID NO: 2 and wherein the first exogenous gene encodes for a functional PETase comprising a secretion signal peptide and wherein the second exogenous gene encodes for a functional MHETase comprising a secretion signal peptide and wherein the exogenous genes are incorporated into the genome of the genetically modified *Pseudomonas*; and wherein the genetically modified *Pseudomonas* organism metabolizes poly (ethylene terephthalate) (PET) to produce PET deconstruction products selected from the group consisting of bis(2-Hydroxyethyl) terephthalate, mono-(2-hydroxyethyl) terephthalate, terephthalate, ethylene glycol, β-ketoadipate, and muconate; and wherein the genetically modified *Pseudomonas* converts bis(2-hydroxyethyl) terephthalate to terephthalate at a rate that is at least three times the rate of a naturally occurring *Pseudomonas*.

2. The genetically modified organism of claim 1, wherein the exogenous genes are derived from *Ideonella sakaiensis* and codon optimized for expression in *Pseudomonas*.

3. The genetically modified organism of claim 1, wherein the genetically modified *Pseudomonas* organism is *Pseudomonas putida*.

4. A method for the deconstruction of poly (ethylene terephthalate) (PET) comprising contacting poly (ethylene terephthalate) (PET) with the genetically modified organism of claim 1 to produce PET deconstruction products.

5. The method of claim 4, wherein the contacting is performed in minimal salt medium.

6. A genetically modified *Pseudomonas* organism comprising at least two exogenous gene additions, wherein:
a first exogenous gene addition comprises a gene with a sequence that is at least 90% identical to SEQ ID NO: 1 and a second exogenous gene addition comprises a gene with a sequence that is at least 90% identical to SEQ ID NO: 2 and wherein the first exogenous gene encodes for a functional PETase comprising a secretion signal peptide and wherein the second exogenous gene encodes for a functional MHETase comprising a secretion signal peptide and wherein the exogenous genes are incorporated into the genome of the genetically modified *Pseudomonas*; and wherein the genetically modified *Pseudomonas* organism metabolizes poly (ethylene terephthalate) (PET) to produce PET deconstruction products selected from the group consisting of bis(2-Hydroxyethyl) terephthalate, mono-(2-hydroxyethyl) terephthalate, terephthalate, ethylene glycol, β-ketoadipate, and muconate; and wherein the genetically modified *Pseudomonas* converts bis(2-hydroxyethyl) terephthalate to terephthalate at a rate that is at least three times the rate of a naturally occurring *Pseudomonas*; and wherein the genetically modified *Pseudomonas* organism further comprises heterologous TPA transporters.

7. The genetically modified organism of claim 6 further comprising catabolic gene clusters I or II.

8. The genetically modified organism of claim 7 wherein the catabolic gene clusters I or II are from *Comamonas* sp. E6.

9. The genetically modified organism of claim 7 capable of using TPA as a sole carbon source.

10. The genetically modified organism of claim 9 wherein said organism is capable of metabolizing TPA at about 0.05 g $L^{-1}$ $h^{-1}$.

11. The genetically modified organism of claim 7 lacking a pcaIJ gene.

12. The genetically modified organism of claim 11 that metabolizes TPA to β-ketoadipate.

13. The genetically modified organism of claim 6, wherein the exogenous genes are derived from *Ideonella sakaiensis* and codon optimized for expression in *Pseudomonas*.

* * * * *

SEQUENCE LISTING

```
<160> NUMBER OF SEQ ID NOS: 15

<210> SEQ ID NO 1
<211> LENGTH: 904
<212> TYPE: DNA
<213> ORGANISM: Ideonella sakaiensis

<400> SEQUENCE: 1
tcatcaagtc aaaacactat ataggaacga aaccatgaac ttccctcgcg cgtcgcgcct      60
gatgcaggcg gcggtcctcg gtggtctgat ggcagtcagc gccgcggcca ccgctcagac     120
caacccatac gcccgcggcc caaaccctac cgcggccagc ctggaagcct ctgccggccc     180
attcaccgtg cgcagcttca ccgtcagtcg cccgtcgggc tatggtgccg gcaccgtcta     240
ctacccaacc aacgctggcg gcaccgtcgg cgccatcgca atcgtgccgg gctataccgc     300
ccgccagtcc tcgatcaagt ggtggggccc acgtctggcc tcccacggct tcgttgttat     360
caccatcgac accaactcga ccctggacca gccgtcctcc cgctcgagcc agcagatggc     420
tgctctgcgc caggtagctt cgctgaacgg caccagctct agcccaatct acggcaaagt     480
ggacaccgct cgcatgggcg tgatgggttg gtccatgggc ggtggtggtt ccctgatctc     540
cgctgctaat aatccttccc tgaaggccgc cgccccgcag gccccatggg actcctcgac     600
caacttctcg agcgtgaccg tgccgaccct gatcttcgct tgcgaaaacg acagcatcgc     660
tccggtgaac tcctccgcgc tgcctatcta cgactccatg agccgcaacg ccaagcaatt     720
cctggaaatc aacggcggtt cccactcctg cgctaactcg ggcaactcga accaagccct     780
gatcggcaag aagggcgtag catggatgaa gcgtttcatg gataacgaca cccgttactc     840
gaccttcgcc tgcgaaaacc cgaactctac tcgcgtcagc gacttccgca ctgcgaactg     900
``` cagc                                                                                      904

<210> SEQ ID NO 2
<211> LENGTH: 1839
<212> TYPE: DNA
<213> ORGANISM: Ideonella sakaiensis

<400> SEQUENCE: 2
taacaaggat tacatataag ggtatatcaa atgcagacca ccgtcaccac tatgctgctg      60
gcatcggtcg ccctggccgc ctgcgcaggc ggcggcagca cccgctgcc gctgccgcag     120
caacagccgc cacagcagga gccgccgcct cctccagtcc cgctggcttc ccgtgctgcg     180
tgtgaggccc tgaaggacgg caacggggac atggtttggc cgaacgccgc caccgtagtt     240
gaagtggccg catggcgcga cgctgccccg gctaccgcgt ccgccgccgc tctgccggaa     300
cactgcgaag ttagcggcgc catcgccaag cgcactggta ttgacggtta ccgtacgaa     360
atcaagttcc gcctgcgcat gccggcgag tggaatggcc gtttcttcat ggagggtggt     420
tccggcacca acggctccct gagcgcggcc accggcagca tcggtggcgg ccagatcgcc     480
tcggccctgt cccgcaactt cgccaccatc gcgaccgacg gtggccacga caacgctgtc     540
aacgacaatc cagacgccct gggtacggta gcgttcggcc tggacccaca ggctcgcctg     600
gacatgggtt acaattcgta cgaccaggtg acccaagctg gcaaagccgc cgttgcccgt     660
ttctacggcc gtgccgccga caagtcgtac ttcatcggct gctcggaagg tggtcgggag     720
ggcatgatgc tcagccaacg cttcccatcc cactacgacg gtatcgtcgc cggtgccct     780
ggctaccagc tgcctaaagc cggtatctcg ggcgcttgga ccactcagtc gctggccccg     840
gcggcggtgg gcctggacgc tcagggcgtc ccgctgatca acaagagctt ctccgatgcc     900
gacctgcacc tgctgtcgca ggccatcctc ggtacttgcg atgcgctgga cggcctggct     960
gacggcatcg ttgacaacta ccgcgcgtgc caggccgctt cgacccggc taccgcggct    1020
aaccctgcca acggtcaagc tctgcaatgt gtgggtgcca aaaccgccga ttgcctgagc    1080
ccggtacagg ttaccgccat caaacgtgca atggccggcc cggtcaacag cgccggcacc    1140
ccgctgtaca accgttgggc ctgggacgct ggtatgagcg gcctgtccgg taccacctac    1200
aatcagggct ggcgttcctg gtggctgggt agcttcaact cctcggcgaa caacgcgcag    1260
cgtgttcgg gttctccgc ccgctcctgg ctggtcgact tcgccacccc accagagcct    1320
atgccgatga cccaggtggc tgcacgcatg atgaaattcg acttcgacat cgacccgctg    1380
aagatctggg ccaccagcgg ccagttcacc cagtcgagca tggactggca cggggccacc    1440
tccaccgacc tggccgcctt ccgcgatcgt ggcggcaaga tgatcctgta ccacggtatg    1500
agcgacgcag ccttctcggc cctggacacc gctgactact acgaacgcct gggcgccgct    1560
atgccgggcg ccgcgggctt cgctcgtctg ttcctcgtcc aggcatgaa ccactgttcg    1620
ggcggtccag gtaccgaccg tttcgacatg ctgacccctc tggtggcgtg ggttgagcgc    1680
ggcgaagccc cggaccagat ctcggcgtgg agcggcaccc caggctactt cggcgtcgct    1740
gcccgtaccc gcccgctgtg cccgtacccg caaatcgcac gctacaaggg ttccggcgat    1800
atcaacaccg aagcaaactt cgcctgcgcc gcgcctccg                          1839

<210> SEQ ID NO 3
<211> LENGTH: 10955
<212> TYPE: DNA
<213> ORGANISM: Artificial Sequence
<220> FEATURE:

<223> OTHER INFORMATION: plasmid pLJ080

<400> SEQUENCE: 3

```
ttgagatcct ttttttctgc gcgtaatctg ctgcttgcaa acaaaaaaac caccgctacc    60
agcggtggtt tgtttgccgg atcaagagct accaactctt tttccgaagg taactggctt   120
cagcagagcg cagataccaa atactgttct tctagtgtag ccgtagttag gccaccactt   180
caagaactct gtagcaccgc ctacatacct cgctctgcta atcctgttac cagtggctgc   240
tgccagtggc gataagtcgt gtcttaccgg gttggactca agacgatagt taccggataa   300
ggcgcagcgg tcgggctgaa cggggggttc gtgcacacag cccagcttgg agcgaacgac   360
ctacaccgaa ctgagatacc tacagcgtga gctatgagaa agcgccacgc ttcccgaagg   420
gagaaaggcg gacaggtatc cggtaagcgg cagggtcgga acaggagagc gcacgaggga   480
gcttccaggg ggaaacgcct ggtatcttta tagtcctgtc gggtttcgcc acctctgact   540
tgagcgtcga ttttgtgat gctcgtcagg ggggcggagc ctatggaaaa acgcctcaca   600
caggaaacag ctatgacatg attacgaatt cgagctcggt acccgtgcga ttactgtggg   660
agcgggcatg cccgcgaatg ggagcaacac aaggctcaat ggttgacggt gtgcgccagc   720
atcaccgaca actggcacag cggccgcccg ctctctgcat gccactggtt gaacgcctgc   780
tgcaccagag ccaggtcgcg ctggctggtt ggctgcttgt cgatcacctt ctgcgcaatc   840
aacgccgctg ccatgtcatc ggtcgggatg aacgtgtcct tgccgaccat cgcaagaac   900
cgtggcgccg acaacccgcc caactggttg ccgtgcttgg ccaggtactt ccacaagccg   960
acaatgtcgg tcactggcca atcggcgatg aatgcaccaa aactgccatg cgccttggcg  1020
atatccagca ccatttgcgc attgcgtggc acgctcttga gcttgcccag gtggcggata  1080
atgcgctcat cctgcatcaa ccgctccaga tgctcggcgc ccatcagcac cactttctcc  1140
gggtcgaagc caaagaacac ctgctcgaac gccggccact ggcatccac caggctgtgc  1200
ttgagccccg cgcggaacac gcgcagggcc aatgtcgaca ggtagcggtc gtcactgatg  1260
tcgcgcagtt gcgccggcgt gcgcggctgc ggcaggaaag cctccagcgc ctgggccgaa  1320
ccaaagcggt tcaggcaata tcagtgtga aattgttatc cgctcacaat tccacacatt  1380
atacgagccg atgattaatt gtcaacagct cttcatcaag tcaaaacact atataggaac  1440
gaaaccatga acttccctcg cgcgtcgcgc ctgatgcagg cggcggtcct cggtggtctg  1500
atggcagtca gcgccgcggc caccgctcag accaacccat acgcccgcgg cccaaaccct  1560
accgcggcca gctggaagc ctctgccggc ccattcaccg tgcgcagctt caccgtcagt  1620
cgcccgtcgg gctatggtgc cggcaccgtc tactacccaa ccaacgctgg cggcaccgtc  1680
ggcgccatcg caatcgtgcc gggctatacc gcccgccagt cctcgatcaa gtggtgggc   1740
ccacgtctgg cctcccacgg cttcgttgtt atcaccatcg acaccaactc gacctggac   1800
cagccgtcct cccgctcgag ccagcagatg gctgctctgc gccaggtagc ttcgctgaac  1860
ggcaccagct ctagcccaat ctacggcaaa gtggacaccg ctcgcatggg cgtgatgggt  1920
tggtccatgg gcggtggtgg ttccctgatc tccgctgcta ataatccttc cctgaaggcc  1980
gccgccccgc aggcccatg ggactcctcg accaacttct cgagcgtgac cgtgccgacc   2040
ctgatcttcg cttgcgaaaa cgacagcatc gctccggtga actcctccgc gctgcctatc  2100
tacgactcca tgagccgcaa cgccaagcaa ttcctggaaa tcaacggcgg ttcccactcc  2160
tgcgctaact cggcaactc gaaccaagcc ctgatcggca agaagggcgt agcatggatg  2220
aagcgtttca tggataacga caccgttac tcgaccttcg cctgcgaaaa cccgaactct  2280
```

```
actcgcgtca gcgacttccg cactgcgaac tgcagcctat aacaaggatt acatataagg    2340
gtatatcaaa tgcagaccac cgtcaccact atgctgctgg catcggtcgc cctggccgcc    2400
tgcgcaggcg gcggcagcac cccgctgccg ctgccgcagc aacagccgcc acagcaggag    2460
ccgccgcctc ctccagtccc gctggcttcc cgtgctgcgt gtgaggccct gaaggacggg    2520
aacggggaca tggtttggcc gaacgccgcc accgtagttg aagtggccgc atggcgcgac    2580
gctgccccgg ctaccgcgtc cgccgccgct ctgccggaac actgcgaagt tagcggcgcc    2640
atcgccaagc gcactggtat tgacggttat ccgtacgaaa tcaagttccg cctgcgcatg    2700
ccggcggagt ggaatggccg tttcttcatg gagggtggtt ccggcaccaa cggctccctg    2760
agcgcggcca ccggcagcat cggtggcggc cagatcgcct cggccctgtc ccgcaacttc    2820
gccaccatcg cgaccgacgg tggccacgac aacgctgtca acgacaatcc agacgccctg    2880
ggtacggtag cgttcggcct ggacccacag gctcgcctgg acatgggtta caattcgtac    2940
gaccaggtga cccaagctgg caaagccgcc gttgcccgtt tctacggccg tgccgccgac    3000
aagtcgtact tcatcggctg ctcggaaggt ggtcgggagg gcatgatgct cagccaacgc    3060
ttcccatccc actacgacgg tatcgtcgcc ggtgcccctg gctaccagct gcctaaagcc    3120
ggtatctcgg gcgcttggac cactcagtcg ctggccccgg cggcggtggg cctggacgct    3180
cagggcgtcc cgctgatcaa caagagcttc tccgatgccg acctgcacct gctgtcgcag    3240
gccatcctcg gtacttgcga tgcgctggac ggcctggctg acggcatcgt tgacaactac    3300
cgcgcgtgcc aggccgcttt cgacccggct accgcggcta accctgccaa cggtcaagct    3360
ctgcaatgtg tgggtgccaa aaccgccgat tgcctgagcc cggtacaggt taccgccatc    3420
aaacgtgcaa tggccggccc ggtcaacagc gccggcaccc cgctgtacaa ccgttgggcc    3480
tgggacgctg gtatgagcgg cctgtccggt accacctaca atcagggctg gcgttcctgg    3540
tggctgggta gcttcaactc ctcggcgaac aacgcgcagc gtgtttcggg tttctccgcc    3600
cgctcctggc tggtcgactt cgccaccccca ccagagccta tgccgatgac ccaggtggct    3660
gcacgcatga tgaaattcga cttcgacatc gacccgctga agatctgggc caccagcggc    3720
cagttcaccc agtcgagctt gagatccttt ttttctgcgc gtaatctgct gcttgcaaac    3780
aaaaaaacca ccgctaccag cggtggtttg tttgccggat caagagctac caactctttt    3840
tccgaaggta actggcttca gcagagcgca gataccaaat actgttcttc tagtgtagcc    3900
gtagttaggc caccacttca agaactctgt agcaccgcct acatacctcg ctctgctaat    3960
cctgttacca gtggctgctg ccagtggcga taagtcgtgt cttaccgggt tggactcaag    4020
acgatagtta ccggataagg cgcagcggtc gggctgaacg ggggggttcgt gcacacagcc    4080 cagcttggag cgaacgacct acaccgaact gagataccta cagcgtgagc tatgagaaag    4140
cgccacgctt cccgaaggga gaaaggcgga caggtatccg gtaagcggca gggtcggaac    4200
aggagagcgc acgagggagc ttccagggggg aaacgcctgg tatctttata gtcctgtcgg    4260
gtttcgccac ctctgacttg agcgtcgatt tttgtgatgc tcgtcagggg ggcggagcct    4320
atggaaaaac gcctcacaca ggaaacagct atgacatgat tacgaattcg agctcggtac    4380
ccgtgcgatt actgtgggag cgggcatgcc cgcgaatggg agcaacacaa ggctcaatgg    4440
ttgacggtgt gcgccagcat caccgacaac tggcacagcg ccgcccgct ctctgcatgc    4500 cactggttga acgcctgctg caccagagcc aggtcgcgct ggctggttgg ctgcttgtcg    4560
atcaccttct gcgcaatcaa cgccgctgcc atgtcatcgg tcgggatgaa cgtgtccttg    4620
```

```
ccgaccatgc gcaagaaccg tggcgccgac aacccgccca actggttgcc gtgcttggcc    4680
aggtacttcc acaagccgac aatgtcggtc actggccaat cggcgatgaa tgcaccaaaa    4740
ctgccatgcg ccttggcgat atccagcacc atttgcgcat tgcgtggcac gctcttgagc    4800
ttgcccaggt ggcggataat gcgctcatcc tgcatcaacc gctccagatg ctcggcgccc    4860
atcagcacca ctttctccgg gtcgaagcca agaacacct gctcgaacgc cggccacttg     4920
gcatccacca ggctgtgctt gagcccgcg cggaacacgc gcagggccaa tgtcgacagg     4980
tagcggtcgt cactgatgtc gcgcagttgc gccggcgtgc gcggctgcgg caggaaagcc    5040
tccagcgcct gggccgaacc aaagcggttc aggcaatact cagtgtgaaa ttgttatccg    5100
ctcacaattc cacacattat acgagccgat gattaattgt caacagctct tcatcaagtc    5160
aaaacactat ataggaacga aaccatgaac ttccctcgcg cgtcgcgcct gatgcaggcg    5220
gcggtcctcg gtggtctgat ggcagtcagc gccgcggcca ccgctcagac caacccatac    5280
gcccgcggcc caaaccctac gcgccagc ctggaagcct ctgccggccc attcaccgtg      5340
cgcagcttca ccgtcagtcg cccgtcgggc tatggtgccg gcaccgtcta ctacccaacc    5400
aacgctggcg gcaccgtcgg cgccatcgca atcgtgccgg gctataccgc ccgccagtcc    5460
tcgatcaagt ggtggggccc acgtctggcc tcccacggct tcgttgttat caccatcgac    5520
accaactcga ccctggacca gccgtcctcc cgctcgagcc agcagatggc tgctctgcgc    5580
caggtagctt cgctgaacgg caccagctct agcccaatct acggcaaagt ggacaccgct    5640
cgcatgggcg tgatgggttg gtccatgggc ggtggtggtt ccctgatctc cgctgctaat    5700
aatccttccc tgaaggccgc cgccccgcag gccccatggg actcctcgac caacttctcg    5760
agcgtgaccg tgccgaccct gatcttcgct tgcgaaaacg acagcatcgc tccggtgaac    5820
tcctccgcgc tgcctatcta cgactccatg agccgcaacg ccaagcaatt cctggaaatc    5880
aacggcggtt cccactcctg cgctaactcg ggcaactcga accaagccct gatcggcaag    5940
aagggcgtag catggatgaa gcgtttcatg gataacgaca cccgttactc gaccttcgcc    6000
tgcgaaaacc cgaactctac tcgcgtcagc gacttccgca ctgcgaactg cagcctataa    6060
caaggattac atataagggt atatcaaatg cagaccaccg tcaccactat gctgctggca    6120
tcggtcgccc tggccgcctg cgcaggcggc ggcagcaccc cgctgccgct gccgcagcaa    6180
cagccgccac agcaggagcc gccgcctcct ccagtcccgc tggcttcccg tgctgcgtgt    6240
gaggccctga aggacggcaa cggggacatg gtttggccga acgccgccac cgtagttgaa    6300
gtggccgcat ggcgcgacgc tgccccggct accgcgtccg ccgccgctct gccggaacac    6360
tgcgaagtta gcggcgccat cgccaagcgc actggtattg acggttatcc gtacgaaatc    6420
aagttccgcc tgcgcatgcc ggcggagtgg aatggccgtt tcttcatgga gggtggttcc    6480
ggcaccaacg gctccctgag cgcggccacc ggcagcatcg gtggcggcca gatcgcctcg    6540
gccctgtccc gcaacttcgc caccatcgcg accgacggtg ccacgacaa cgctgtcaac     6600
gacaatccag acgccctggg tacggtagcg ttcggcctgg acccacaggc tcgcctggac    6660
atgggttaca attcgtacga ccaggtgacc caagctggca agccgccgt tgcccgtttc     6720
tacgccgtg ccgccgacaa gtcgtacttc atcggctgct cggaaggtgg tcgggagggc     6780
atgatgctca gccaacgctt cccatcccac tacgacggta tcgtcgccgg tgcccctggc    6840
taccagctgc ctaaagccgg tatctcgggc gcttggacca tcagtcgct ggccccggcg     6900
gcggtgggcc tggacgctca gggcgtcccg ctgatcaaca agagcttctc cgatgccgac    6960
ctgcacctgc tgtcgcaggc catcctcggt acttgcgatg cgctggacgg cctggctgac    7020
```

```
ggcatcgttg acaactaccg cgcgtgccag gccgctttcg acccggctac cgcggctaac    7080
cctgccaacg gtcaagctct gcaatgtgtg ggtgccaaaa ccgccgattg cctgagcccg    7140
gtacaggtta ccgccatcaa acgtgcaatg gccggcccgg tcaacagcgc cggcaccccg    7200
ctgtacaacc gttgggcctg ggacgctggt atgagcggcc tgtccggtac cacctacaat    7260
cagggctggc gttcctggtg gctgggtagc ttcaactcct cggcgaacaa cgcgcagcgt    7320
gtttcgggtt tctccgcccg ctcctggctg gtcgacttcg ccaccccacc agagcctatg    7380
ccgatgaccc aggtggctgc acgcatgatg aaattcgact cgacatcga cccgctgaag    7440 atctgggcca ccagcggcca gttcacccag tcgagcatgg actggcacgg ggccacctcc    7500
accgacctgg ccgccttccg cgatcgtggc ggcaagatga tcctgtacca cggtatgagc    7560
gacgcagcct tctcggccct ggacaccgct gactactacg aacgcctggg cgccgctatg    7620
ccgggcgccg cgggcttcgc tcgtctgttc ctcgtcccag gcatgaacca ctgttcgggc    7680
ggtccaggta ccgaccgttt cgacatgctg acccctctgg tggcgtgggt tgagcgcggc    7740
gaagccccgg accagatctc ggcgtggagc ggcacccccag gctacttcgg cgtcgctgcc    7800
cgtacccgcc cgctgtgccc gtacccgcaa atcgcacgct acaagggttc cggcgatatc    7860
aacaccgaag caaacttcgc ctgcgccgcg cctccgagtc aaaagcctcc ggtcggaggc    7920
ttttgacttc aaaaccaccc tgctgtcgat gatgctgccg ctgatgcacc acggcatgct    7980
ggtgatgggc ctgccctaca gcgagtcggc actgctcgag accgtggtg gcggcacgcc    8040 ttatggcgcc agccaccacg caggcgccga tggcaagcgc gaactcgacc cacacgaaat    8100
cgccctgtgc cgcgccctgg gccaacgcct ggcgaccacg gccaaggccc tggaggcggc    8160
gcgtggctag aaagcccaag gcattgccgc cggtccaatg gctggtacca cgcctgcgcc    8220
tgacgcgggc attgagcctg gcatgcttct tcggcctgat cgccctgctg gtggtgaaca    8280
acctgtggtt cgccaacctg catggggcca gggtcgaggt gatcctggcg atcgagctgg    8340
tgccgttgct gttgctgttg ccaggcatgc tgaaaggcag cgccccgggcg catgcctgga    8400 cctgcttcgt ggtgaatatc tatttcatca agggcgtgct ggcggcgttc gaccggcgc    8460 gggcggtatt cggctggctt gaagtgctgg tgagcctggg gctgttcatt gccgggctac    8520
tgtacgtgcg ctggaagttc cagcatgagc ggcgcatggc gggcgaaggc agttagattt    8580
cctgcaggca tgcaagcttg gcactggccg tcgttttaca acgtcgtgac cggaattgcc    8640
agctggggcg ccctctggta aggttgggaa gccctgcaaa caggatgagg atcgtttcgc    8700
atgattgaac aagatggatt gcacgcaggt tctccggccg cttgggtgga gaggctattc    8760
ggctatgact gggcacaaca gacaatcggc tgctctgatg ccgccgtgtt ccggctgtca    8820
gcgcaggggc gcccggttct ttttgtcaag accgacctgt ccggtgccct gaatgaactc    8880
caagacgagg cagcgcggct atcgtggctg gccacgacgg gcgttccttg cgcagctgtg    8940
ctcgacgttg tcactgaagc gggaagggac tggctgctat tgggcgaagt gccggggcag    9000
gatctcctgt catctcacct tgctcctgcc gagaaagtat ccatcatggc tgatgcaatg    9060
cggcggctgc atacgcttga tccggctacc tgcccattcg accaccaagc gaaacatcgc    9120
atcgagcgag cacgtactcg gatggaagcc ggtcttgtcg atcaggatga tctggacgaa    9180
gagcatcagg ggctcgcgcc agccgaactg ttcgccaggc tcaaggcgcg gatgcccgac    9240
ggcgaggatc tcgtcgtgac ccatggcgat gcctgcttgc cgaatatcat ggtggaaaat    9300
ggccgctttt ctggattcat cgactgtggc cggctgggtg tggcggaccg ctatcaggac    9360
```

```
atagcgttgg ctacccgtga tattgctgaa gagcttggcg gcgaatgggc tgaccgcttc    9420
ctcgtgcttt acggtatcgc cgctcccgat tcgcagcgca tcgccttcta tcgccttctt    9480
gacgagttct tctgagcgac gatgaacatc aaaaagtttg caaacaagc aacagtatta    9540 acctttacta ccgcactgct ggcaggaggc gcaactcaag cgtttgcgaa agaaacgaac    9600
caaaagccat ataaggaaac atacggcatt tcccatatta cacgccatga tatgctgcaa    9660
atccctgaac agcaaaaaaa tgaaaaatat caagtttctg aatttgattc gtccacaatt    9720
aaaaatatct cttctgcaaa aggcctggac gtttgggaca gctggccatt acaaaacgct    9780
gacggcactg tcgcaaacta tcacggctac cacatcgtct ttgcattagc cggagatcct    9840
aaaaatgcgg atgacacatc gatttacatg ttctatcaaa aagtcggcga aacttctatt    9900
gacagctgga aaacgctgg ccgcgtcttt aaagacagcg acaaattcga tgcaaatgat    9960
tctatcctaa aagaccaaac acaagaatgg tcaggttcag ccacatttac atctgacgga   10020
aaaatccgtt tattctacac tgatttctcc ggtaaacatt acggcaaaca aacactgaca   10080
actgcacaag ttaacgtatc agcatcagac agctctttga acatcaacgg tgtagaggat   10140
tataaatcaa tctttgacgg tgacggaaaa acgtatcaaa atgtacagca gttcatcgat   10200
gaaggcaact acagctcagg cgacaaccat acgctgagag atcctcacta cgtagaagat   10260
aaaggccaca atacttagt atttgaagca aacactggaa ctgaagatgg ctaccaaggc   10320
gaagaatctt tatttaacaa agcatactat ggcaaaagca catcattctt ccgtcaagaa   10380
agtcaaaaac ttctgcaaag cgataaaaaa cgcacggctg agttagcaaa cggcgctctc   10440
ggtatgattg agctaaacga tgattacaca ctgaaaaaag tgatgaaacc gctgattgca   10500
tctaacacag taacagatga aattgaacgc gcgaacgtct ttaaaatgaa cggcaaatgg   10560
tacctgttca ctgactcccg cggatcaaaa atgacgattg acggcattac gtctaacgat   10620
atttacatgc ttggttatgt ttctaattct ttaactggcc catacaagcc gctgaacaaa   10680
actggccttg tgttaaaaat ggatcttgat cctaacgatg taacctttac ttactcacac   10740
ttcgctgtac ctcaagcgaa aggaaacaat gtcgtgatta caagctatat gacaaacaga   10800
ggattctacg cagacaaaca atcaacgttt gcgccgagct tcctgctgaa catcaaaggc   10860
aagaaaacat ctgttgtcaa agacagcatc cttgaacaag gacaattaac agttaacaaa   10920
taatcagacc ccgtagaaaa gatcaaagga tcttc                              10955

<210> SEQ ID NO 4
<211> LENGTH: 290
<212> TYPE: PRT
<213> ORGANISM: Ideonella sakaiensis

<400> SEQUENCE: 4

Met Asn Phe Pro Arg Ala Ser Arg Leu Met Gln Ala Ala Val Leu Gly
1               5                   10                  15

Gly Leu Met Ala Val Ser Ala Ala Thr Ala Gln Thr Asn Pro Tyr
            20                  25                  30

Ala Arg Gly Pro Asn Pro Thr Ala Ala Ser Leu Glu Ala Ser Ala Gly
        35                  40                  45

Pro Phe Thr Val Arg Ser Phe Thr Val Ser Arg Pro Ser Gly Tyr Gly
    50                  55                  60

Ala Gly Thr Val Tyr Tyr Pro Thr Asn Ala Gly Gly Thr Val Gly Ala
65                  70                  75                  80

Ile Ala Ile Val Pro Gly Tyr Thr Ala Arg Gln Ser Ser Ile Lys Trp
                85                  90                  95
```

```
Trp Gly Pro Arg Leu Ala Ser His Gly Phe Val Ile Thr Ile Asp
            100                 105                 110

Thr Asn Ser Thr Leu Asp Gln Pro Ser Ser Arg Ser Ser Gln Gln Met
    115                 120                 125

Ala Ala Leu Arg Gln Val Ala Ser Leu Asn Gly Thr Ser Ser Ser Pro
    130                 135                 140

Ile Tyr Gly Lys Val Asp Thr Ala Arg Met Gly Val Met Gly Trp Ser
145                 150                 155                 160

Met Gly Gly Gly Gly Ser Leu Ile Ser Ala Ala Asn Asn Pro Ser Leu
                165                 170                 175

Lys Ala Ala Ala Pro Gln Ala Pro Trp Asp Ser Ser Thr Asn Phe Ser
            180                 185                 190

Ser Val Thr Val Pro Thr Leu Ile Phe Ala Cys Glu Asn Asp Ser Ile
        195                 200                 205

Ala Pro Val Asn Ser Ser Ala Leu Pro Ile Tyr Asp Ser Met Ser Arg
    210                 215                 220

Asn Ala Lys Gln Phe Leu Glu Ile Asn Gly Gly Ser His Ser Cys Ala
225                 230                 235                 240

Asn Ser Gly Asn Ser Asn Gln Ala Leu Ile Gly Lys Lys Gly Val Ala
                245                 250                 255

Trp Met Lys Arg Phe Met Asp Asn Asp Thr Arg Tyr Ser Thr Phe Ala
            260                 265                 270

Cys Glu Asn Pro Asn Ser Thr Arg Val Ser Asp Phe Arg Thr Ala Asn
        275                 280                 285

Cys Ser
    290

<210> SEQ ID NO 5
<211> LENGTH: 603
<212> TYPE: PRT
<213> ORGANISM: Ideonella sakaiensis

<400> SEQUENCE: 5

Met Gln Thr Thr Val Thr Thr Met Leu Leu Ala Ser Val Ala Leu Ala
1               5                   10                  15

Ala Cys Ala Gly Gly Gly Ser Thr Pro Leu Pro Leu Pro Gln Gln Gln
            20                  25                  30

Pro Pro Gln Gln Glu Pro Pro Pro Pro Val Pro Leu Ala Ser Arg
        35                  40                  45

Ala Ala Cys Glu Ala Leu Lys Asp Gly Asn Gly Asp Met Val Trp Pro
    50                  55                  60

Asn Ala Ala Thr Val Val Glu Val Ala Ala Trp Arg Asp Ala Ala Pro
65                  70                  75                  80

Ala Thr Ala Ser Ala Ala Leu Pro Glu His Cys Glu Val Ser Gly
            85                  90                  95

Ala Ile Ala Lys Arg Thr Gly Ile Asp Gly Tyr Pro Tyr Glu Ile Lys
            100                 105                 110

Phe Arg Leu Arg Met Pro Ala Glu Trp Asn Gly Arg Phe Phe Met Glu
        115                 120                 125

Gly Gly Ser Gly Thr Asn Gly Ser Leu Ser Ala Ala Thr Gly Ser Ile
    130                 135                 140

Gly Gly Gly Gln Ile Ala Ser Ala Leu Ser Arg Asn Phe Ala Thr Ile
145                 150                 155                 160

Ala Thr Asp Gly Gly His Asp Asn Ala Val Asn Asp Asn Pro Asp Ala
```

```
                165                 170                 175
Leu Gly Thr Val Ala Phe Gly Leu Asp Pro Gln Ala Arg Leu Asp Met
                180                 185                 190
Gly Tyr Asn Ser Tyr Asp Gln Val Thr Gln Ala Gly Lys Ala Ala Val
                195                 200                 205
Ala Arg Phe Tyr Gly Arg Ala Asp Lys Ser Tyr Phe Ile Gly Cys
    210                 215                 220
Ser Glu Gly Gly Arg Glu Gly Met Met Leu Ser Gln Arg Phe Pro Ser
225                 230                 235                 240
His Tyr Asp Gly Ile Val Ala Gly Ala Pro Gly Tyr Gln Leu Pro Lys
                245                 250                 255
Ala Gly Ile Ser Gly Ala Trp Thr Thr Gln Ser Leu Ala Pro Ala Ala
                260                 265                 270
Val Gly Leu Asp Ala Gln Gly Val Pro Leu Ile Asn Lys Ser Phe Ser
                275                 280                 285
Asp Ala Asp Leu His Leu Leu Ser Gln Ala Ile Leu Gly Thr Cys Asp
                290                 295                 300
Ala Leu Asp Gly Leu Ala Asp Gly Ile Val Asp Asn Tyr Arg Ala Cys
305                 310                 315                 320
Gln Ala Ala Phe Asp Pro Ala Thr Ala Ala Asn Pro Ala Asn Gly Gln
                325                 330                 335
Ala Leu Gln Cys Val Gly Ala Lys Thr Ala Asp Cys Leu Ser Pro Val
                340                 345                 350
Gln Val Thr Ala Ile Lys Arg Ala Met Ala Gly Pro Val Asn Ser Ala
                355                 360                 365
Gly Thr Pro Leu Tyr Asn Arg Trp Ala Trp Asp Ala Gly Met Ser Gly
                370                 375                 380
Leu Ser Gly Thr Thr Tyr Asn Gln Gly Trp Arg Ser Trp Trp Leu Gly
385                 390                 395                 400
Ser Phe Asn Ser Ser Ala Asn Asn Ala Gln Arg Val Ser Gly Phe Ser
                405                 410                 415
Ala Arg Ser Trp Leu Val Asp Phe Ala Thr Pro Pro Glu Pro Met Pro
                420                 425                 430
Met Thr Gln Val Ala Ala Arg Met Met Lys Phe Asp Phe Asp Ile Asp
                435                 440                 445
Pro Leu Lys Ile Trp Ala Thr Ser Gly Gln Phe Thr Gln Ser Ser Met
                450                 455                 460
Asp Trp His Gly Ala Thr Ser Thr Asp Leu Ala Ala Phe Arg Asp Arg
465                 470                 475                 480
Gly Gly Lys Met Ile Leu Tyr His Gly Met Ser Asp Ala Ala Phe Ser
                485                 490                 495
Ala Leu Asp Thr Ala Asp Tyr Tyr Glu Arg Leu Gly Ala Ala Met Pro
                500                 505                 510
Gly Ala Ala Gly Phe Ala Arg Leu Phe Leu Val Pro Gly Met Asn His
                515                 520                 525
Cys Ser Gly Gly Pro Gly Thr Asp Arg Phe Asp Met Leu Thr Pro Leu
                530                 535                 540
Val Ala Trp Val Glu Arg Gly Glu Ala Pro Asp Gln Ile Ser Ala Trp
545                 550                 555                 560
Ser Gly Thr Pro Gly Tyr Phe Gly Val Ala Ala Arg Thr Arg Pro Leu
                565                 570                 575
Cys Pro Tyr Pro Gln Ile Ala Arg Tyr Lys Gly Ser Gly Asp Ile Asn
                580                 585                 590
```

Thr Glu Ala Asn Phe Ala Cys Ala Ala Pro Pro
        595                 600

<210> SEQ ID NO 6
<211> LENGTH: 4229
<212> TYPE: DNA
<213> ORGANISM: Artificial Sequence
<220> FEATURE:
<223> OTHER INFORMATION: plasmid pLJ081

<400> SEQUENCE: 6

| | | | | | |
|---|---|---|---|---|---|
| atcattcagg | acgagcctca | gactccagcg | taactggact | gaaaacaaac | taaagcgccc | 60 |
| ttgtggcgct | ttagttttgt | tccgcggcca | ccggctggct | cgcttcgctc | ggcccgtgga | 120 |
| caaccctgct | ggacaagctg | atggacaggc | tgcgcctgcc | cacgagcttg | accacaggga | 180 |
| ttgcccaccg | gctacccagc | cttcgaccac | atacccaccg | gctccaactg | cgcggcctgc | 240 |
| ggccttgccc | catcaatttt | tttaattttc | tctggggaaa | agcctccggc | ctgcggcctg | 300 |
| cgcgcttcgc | ttgccggttg | acaccaagt | ggaaggcggg | tcaaggctcg | cgcagcgacc | 360 |
| gcgcagcggc | ttggccttga | cgcgcctgga | acgacccaag | cctatgcgag | tggggggcagt | 420 |
| cgaaggcgaa | gcccgcccgc | ctgccccccg | agcctcacgg | cggcgagtgc | gggggttcca | 480 |
| aggggggcagc | gccaccttgg | gcaaggccga | aggccgcgca | gtcgatcaac | aagccccgga | 540 |
| ggggccactt | tttgccggag | ggggagccgc | gccgaaggcg | tggggggaacc | ccgcaggggt | 600 |
| gcccttcttt | gggcaccaaa | gaactagata | tagggcgaaa | tgcgaaagac | ttaaaaatca | 660 |
| acaacttaaa | aaaggggggt | acgcaacagc | tcattgcggc | accccccgca | atagctcatt | 720 |
| gcgtaggtta | aagaaaatct | gtaattgact | gccacttta | cgcaacgcat | aattgttgtc | 780 |
| gcgctgccga | aaagttgcag | ctgattgcgc | atggtgccgc | aaccgtgcgg | caccctaccg | 840 |
| catggagata | agcatggcca | cgcagtccag | agaaatcggc | attcaagcca | agaacaagcc | 900 |
| cggtcactgg | gtgcaaacgg | aacgcaaagc | gcatgaggcg | tgggccgggc | ttattgcgag | 960 |
| gaaacccacg | gcggcaatgc | tgctgcatca | cctcgtggcg | cagatgggcc | accagaacgc | 1020 |
| cgtggtggtc | agccagaaga | cacttttccaa | gctcatcgga | cgttctttgc | ggacggtcca | 1080 |
| atacgcagtc | aaggacttgg | tggccgagcg | ctggatctcc | gtcgtgaagc | tcaacggccc | 1140 |
| cggcaccgtg | tcggcctacg | tggtcaatga | ccgcgtggcg | tggggccagc | ccgcgaccca | 1200 |
| gttgcgcctg | tcggtgttca | gtgccgccgt | ggtggttgat | cacgacgacc | aggacgaatc | 1260 |
| gctgttgggg | catggcgacc | tgcgccgcat | cccgaccctg | tatccgggcg | agcagcaact | 1320 |
| accgaccggc | cccggcgagg | agccgcccag | ccagcccggc | attccgggca | tggaaccaga | 1380 |
| cctgccagcc | ttgaccgaaa | cggaggaatg | ggaacggcgc | gggcagcagc | gcctgccgat | 1440 |
| gcccgatgag | ccgtgttttc | tggacgatgg | cgagccgttg | gagccgccga | cacgggtcac | 1500 |
| gctgccgcgc | cggtagtacg | taagaggttc | caactttcac | cataatgaaa | taagatcact | 1560 |
| accgggcgta | tttttttgagt | tatcgagatt | ttcaggagct | aaggaagcta | aaatgagcca | 1620 |
| tattcaacgg | gaaacgtctt | gctcgaggcc | gcgattaaat | tccaacatgg | atgctgattt | 1680 |
| atatgggtat | aaatgggctc | gcgataatgt | cgggcaatca | ggtgcgacaa | tctatcgatt | 1740 |
| gtatgggaag | cccgatgcgc | cagagttgtt | tctgaaacat | ggcaaaggta | gcgttgccaa | 1800 |
| tgatgttaca | gatgagatgg | tcaggctaaa | ctggctgacg | gaatttatgc | ctcttccgac | 1860 |
| catcaagcat | tttatccgta | ctcctgatga | tgcatggtta | ctcaccactg | cgatccccag | 1920 |
| gaaaacagca | ttccaggtat | tagaagaata | tcctgattca | ggtgaaaata | ttgttgatgc | 1980 |

```
gctggcagtg ttcctgcgcc ggttgcattc gattcctgtt tgtaattgtc cttttaacgg      2040
cgatcgcgta tttcgtctcg ctcaggcgca atcacgaatg aataacggtt tggttggtgc      2100
gagtgatttt gatgacgagc gtaatggctg gcctgttgaa caagtctgga agaaatgca       2160 taagcttttg ccattctcac cggattcagt cgtcactcat ggtgatttct cacttgataa      2220
ccttattttt gacgagggga aattaatagg ttgtattgat gttggacgag tcggaatcgc      2280
agaccgatac caggatcttg ccatcctatg gaactgcctc ggtgagtttt ctccttcatt      2340
acagaaacgg cttttttcaaa aatatggtat tgataatcct gatatgaata aattgcagtt     2400
tcacttgatc tcgatgagt ttttctgagg gcggatcccc ctcaagtcaa aagcctccgg       2460
tcggaggctt ttgactttct gctatggagg tcaggtatga ttttgcatta ggcacccag       2520 gctttacact ttatgcttcc ggctcgtatg ttgtgtggaa ttgtgagcgg ataacaattt      2580
cacactttca tcaagtcaaa acactatata ggaacgaaac catgaacttc cctcgcgcgt      2640
cgcgcctgat gcaggcggcg gtcctcggtg gtctgatggc agtcagcgcc gcggccaccg      2700
ctcagaccaa cccatacgcc cgcggcccaa accctaccgc ggccagcctg aagcctctg       2760 ccggcccatt caccgtgcgc agcttcaccg tcagtcgccc gtcgggctat ggtgccggca      2820
ccgtctacta cccaaccaac gctggcggca ccgtcggcgc catcgcaatc gtgccgggct      2880
ataccgcccg ccagtcctcg atcaagtggt ggggcccacg tctggcctcc cacggcttcg     2940
ttgttatcac catcgacacc aactcgaccc tggaccagcc gtcctcccgc tcgagccagc      3000
agatggctgc tctgcgccag gtagcttcgc tgaacggcac cagctctagc ccaatctacg      3060
gcaaagtgga caccgctcgc atgggcgtga tgggttggtc catgggcggt ggtggttccc      3120
tgatctccgc tgctaataat ccttcccctga aggccgccgc cccgcaggcc ccatgggact     3180
cctcgaccaa cttctcgagc gtgaccgtgc cgaccctgat cttcgcttgc gaaaacgaca      3240
gcatcgctcc ggtgaactcc tccgcgctgc ctatctacga ctccatgagc cgcaacgcca      3300
agcaattcct ggaaatcaac ggcggttccc actcctgcgc taactcgggc aactcgaacc      3360
aagccctgat cggcaagaag ggcgtagcat ggatgaagcg tttcatggat aacgacaccc      3420
gttactcgac cttcgcctgc gaaaacccga actctactcg cgtcagcgac ttccgcactg      3480
cgaactgcag cggtggttct gaggaatctt acatgagcaa gggcgaggag ctctttaccg      3540
gcgtcgtccc cattctcgtt gagctggacg gcgacgtgaa cggacataag ttcagtgtct      3600
cgggcgaggg cgaaggagat gccacctatg gaagctaac cctgaagttc atctgcacaa      3660
ccgggaagct gccggtcccc tggccgacgc tggttaccac cctgacctac ggcgtgcaat      3720
gcttctcgcg ctaccctgac cacatgaagc gccacgactt cttcaaatcc gctatgccgg      3780
agggctacgt ccaggaacgc accatattct tcaaggacga cggtaactac aagacgcgcg      3840
ccgaagtcaa gttcgagggg gatacccctcg tgaaccgaat cgagttgaag gggatcgact     3900
tcaaagaaga tggcaacatc ctcggccaca aactggagta caactacaat tcgcataacg      3960
tgtacatcat ggccgacaag cagaagaatg gcatcaaggt gaacttcaag attcgccaca      4020
acatcgagga cggtgtccgtt cagctggccg accactatca gcagaacaca ccaattggag     4080
acggccccgt cctgctcccc gataaccatt acctttcgac acagtcggcg ctgtcgaagg      4140
acccgaacga aaagcgggac cacatggtgc tcctggagtt cgtcacggcg gccgggatca      4200
cgcacggaat ggacgaactc tacaagtag                                        4229
```

<210> SEQ ID NO 7

```
<211> LENGTH: 969
<212> TYPE: DNA
<213> ORGANISM: Artificial Sequence
<220> FEATURE:
<223> OTHER INFORMATION: osynthetic tphCII gene

<400> SEQUENCE: 7
atgcgtaacg aatctatccg tcgtcgtgaa gcgttaattg gtatcgctgc agcagttgca      60
gcaactggtt cactcgctca agtaaccaa ccactgaaaa tcgttgtgcc tttttctgca     120
ggtggtacag cggacgtatt accacgtctt gtcgctgaaa aaatccgtgc cgattatgct     180
ggtggtgtta tcatcgaaaa caaaccaggt gcaggtggta atattggtgc agatctagtt     240
ttccgtgctc caccagacgg tatgacggtt ttagcttcac cacctggtcc tatcgctatt     300
aatcacaatc tttatcaaaa attatctttc gatcctactc gttgggtacc agtaaccatt     360
ctggcaacag ttcctaacgt acttgtaatt aacccaaaac tacctgttaa aagccttggc     420
gaatttatcg catacgcaaa agcaaatcca agaaagtaa ccgtagcgac tcaaggtgac     480
ggttctactt cacaccttac agcagcaatg tttatgcaat taactggtac agaactaact     540
gttatcccat acaaaggtac agcaccagct ttaatcgatc ttattggtgg taatgtagac     600
gtgttttcg ataatatcag ctcttctgca acttatcacc aagcaggaaa agttcgtatt     660
cttgcagttg ctgatgaaca acgttcacaa attcttccac aagttccaac gttcgcagaa     720
caacagtggc agcaatgca gctgtgaca ttttctcag tagtggcacc tcctggtaca     780
tcagcagaaa tcgcacaaaa acttcaaaaa cagatggctc ttgcccttc ttcgaacgat     840
attcgtaagc acttccagga acaaggtgct gtgccatgtg ttgggatcc aagtaaaact     900
gctcaattta ttcgtcagga aaccgaaaaa tggaagaaag tactcaaagc agcaaacgta     960
aaactttaa                                                           969

<210> SEQ ID NO 8
<211> LENGTH: 1242
<212> TYPE: DNA
<213> ORGANISM: Artificial Sequence
<220> FEATURE:
<223> OTHER INFORMATION: synthetic tphA2II gene

<400> SEQUENCE: 8
atgcaggaaa gcattattca atggcatggt gcgaccaaca cacgcgttcc atttggtatc      60
tatacagata ccgcaaatgc tgaccaagaa caacagcgta tttaccgtgg cgaagtatgg     120
aattacctttt gtttggaatc agaaatccca ggagcgggtg attttcgtac acatttgcg     180
ggtgaaacac ctattgtcgt agttcgtgat gctgatcaag aaatttatgc tttcgaaaat     240
cgttgtgctc accgtggtgc tttaattgca ttagaaaaga gcggtcgtac tgattctttt     300
caatgtgttt atcatgcatg gtcatataac cgtcagggtg accttacggg tgtggctttc     360
gaaaaaggcg taaaggtca gggtggtatg ccagctagtt tctgtaaaga gaacatggt     420
ccacgtaaac ttcgcgtagc agttttctgc ggcttggttt tcggttcttt ttctgaagac     480
gttccaagta ttgaagatta tttgggtccg gaaatttgtg aacgtatcga acgtgttctc     540
cataagcctg tagaagttat cggtcgtttt actcagaaat tacctaataa ctggaaactt     600
tattttgaaa atgtaaaaga tagctaccat gcatctcttt tacacatgtt tttcacaact     660
ttcgaactga accgttttatc tcagaaaggc ggtgttattg tggatgagtc tggcggccat     720
catgtatcct atagtatgat tgatcgtggg gccaaggat attcatataa agatcaagct     780
attcgttctg acaatgaacg ttatcgtttg aaagatccta gcttactaga aggttttgaa     840
```

```
gaattcgaag atggtgtaac gcttcaaatt cttagcgtat tcccagggtt tgttttgcaa      900
caaatccaaa acagtattgc agtgcgtcag ttattgccaa aaagtatttc tagttctgaa      960
ttgaactgga cttatttagg ttatgccgat gatagcgcag aacaacgtaa agttcgtctt     1020
aaacaagcta atctgattgg acctgctgga ttcatttcaa tggaagatgg tgcagtcggc     1080
ggtttcgtgc agcgtggtat tgcaggcgct gctaaccttg atgcagtaat cgaaatgggc     1140
ggtgatcatg aaggcagctc tgaaggtcgc gctactgaaa cttcagtacg tggcttttgg     1200
aaagcatatc gtaaacatat gggacaagaa atgcaggcat ga                       1242
```

<210> SEQ ID NO 9
<211> LENGTH: 465
<212> TYPE: DNA
<213> ORGANISM: Artificial Sequence
<220> FEATURE:
<223> OTHER INFORMATION: synthetic tphA3II gene

<400> SEQUENCE: 9

```
atgatcaatg aaatacagat cgcagcattt aatgcagcat atgcaaaaac tattgactct       60
gatgctatgg aacaatggcc taccttttttt actaaagatt gccattattg tgtaacgaat      120
gtagataatc atgatgaggg tttagctgct ggtatagttt gggcagattc acaggacatg      180
ttgactgatc gtatctcagc tttgcgtgaa gcgaacattt acgaacgtca ccgctatcgt      240
cacatcttag gtctgccatc aattcaatca ggtgatgcaa cgcaggcatc agctagcaca      300
cctttcatgg ttcttcgtat catgcatact ggcgaaacgg aggttttcgc atcgggtgaa      360
tatctcgata aattcactac tattgatggt aaattgcgcc ttcaggaacg tattgctgtt      420
tgtgactcta cagtaaccga taccttaatg gcattgccat atga                       465
```

<210> SEQ ID NO 10
<211> LENGTH: 951
<212> TYPE: DNA
<213> ORGANISM: Artificial Sequence
<220> FEATURE:
<223> OTHER INFORMATION: synthetic tphBII gene

<400> SEQUENCE: 10

```
atgaacgcaa ttgttcaccg ccgtcttgca cttgcaattg gtgatccaca tggtattggt       60
cctgaaatcg cattgaaagc tcttcaacag cttttcggtaa ctgaacgtag cttaattaaa     120
gtatacggtc cgtggtctgc acttgaacaa gcagcacgcg tttgcgaaat ggaaccactc      180
ttacaagata tcgtacacga agaagcaggt accttgaccc aaccagtaca gtggggtgaa      240
attacaccac aagctggtct tagtacagta caatcagcta ctgctgcgat ccgtgcatgt      300
gaaaatggtg aggtagatgc agttattgcg tgtccacacc atgaaactgc aatccaccgt      360
gctggtatcg ccttctctgg ttatccaagc ctttttagcga atgtgttggg tatgaacgaa      420
gatcaagttt ttcttatgtt ggttggtgct ggtcttcgta tcgttcatgt gactctacac      480
gaatctgtac gttctgcact tgaacgtctt tctccacaac ttgttgtaaa tgcagcacaa      540
gcagcagttc aaacctgtac attgcttggt gttcctaaac cgaaagtggc agtgttcggc      600
attaacccac atgcatcaga aggtcaactt ttcggcttgg aagatagcca aattaccgtt      660
ccagcagttg aaacccttcg taaacgtggt ctagctgttg atggtccaat gggtgcggat      720
atggtactgg cacaacgtaa acatgattta tatgttgcga tgcttcatga tcagggtcat      780
ataccaatta aacttcttgc accaaatggt gcgagtgctc tctcaatcgg tggtcgtgtt      840
```

```
gtattgtcat cagttggaca cggcagcgca atggacatcg ctggccgtgg cgtagctgat    900
gccactgctc ttttacgtac cattgctctt cttggcgctc agccagtttg a             951
```

<210> SEQ ID NO 11
<211> LENGTH: 1011
<212> TYPE: DNA
<213> ORGANISM: Artificial Sequence
<220> FEATURE:
<223> OTHER INFORMATION: synthetic tphA1II gene

<400> SEQUENCE: 11

```
atgaaccatc aaatccacat ccatgactca gatattgcat ttccatgtgc acctggtcaa     60
tcagttttgg atgcggcctt acaagcaggt atcgaattgc cttatagctg ccgtaaaggt    120
tcatgtggga attgtgcaag tactcttta gatggtaata ttgcatcttt caacggtatg    180
gctgttcgta atgaattatg tgcgtctgaa caagtgttat tgtgtggttg cacggcggca    240
tctgatatac gtattcatcc ttcttctttc cgtcgtcttg acccagaagc tcgtaaacgt    300
ttcactgcta aggtatattc aaatactctt gctgctccag atgtatctct tctccgtctc    360
cgtttacctg ttggtaaacg tgctaaattt gaagctggtc aatatttact aatccactta    420
gatgacggtg agagccgtag ctacagcatg gcaaatccac cacatgaatc tgatggtatc    480
accttacatg ttcgtcatgt tccaggtggg cgttttagta ctattgtaca acaattgaaa    540
tcaggagata ctttggacat tgaattacct tttggttcta ttgcgcttaa acctgatgac    600
gctcgtcctc tgatctgtgt agctggtggt accggctttg ctccaatcaa atccgtttta    660
gacgatctcg cgaaacgtaa agtacagcgc gatatcacac ttatctgggg cgcacgcaat    720
ccatctggct tatatcttcc atcagctatc gataagtggc gtaaggtatg gccacaattc    780
cgttacatcg ccgctatcac tgatcttggg gatatgccag ctgatgcaca cgctggtcgt    840
gtggacgacg cattacgtac tcattttggt aatctgcatg atcatgttgt tcattgttgt    900
ggttcgcctg ctctagttca aagtgtccgt acagccgcct cggacatggg tctactagcg    960
caagatttcc atgcagatgt atttgcaact ggtcctacag gtcaccacta g            1011
```

<210> SEQ ID NO 12
<211> LENGTH: 489
<212> TYPE: DNA
<213> ORGANISM: Artificial Sequence
<220> FEATURE:
<223> OTHER INFORMATION: synthetic tpiB gene

<400> SEQUENCE: 12

```
atgaaaatta aagtcaaaa agatttttt tctggtttga tgttccttgc agttggttta      60
gcatttgcaa ttggtgcttc aaattatact attggtactg gtgctcgtat gggtccaggt    120
tatttccctc ttatacttgg tgtactgatg gcgattctag gtgcagctat ctgtgttggt    180
ggtcttacta aaggtccaga gggtggtgat aaaattggta atgggcatg gcgtcaagtt    240 tttttatct tggcagcaaa ttttgcattc ggcattttgt tagtgggtgt accagcagtt    300
ggtattccac aatttggtct tattatcgca atttatgcgt tagtcttcat cgcgtctttg    360
ggtggccact ctttcaactt caaagaaacc gcgatccttg caacggtgct tgcagttggt    420
tcttacttcg cttttgtttg ggcattaaac ttacaattcc cagtatggcc atcatttatc    480
gcgggttaa                                                            489
```

<210> SEQ ID NO 13
<211> LENGTH: 1512

```
<212> TYPE: DNA
<213> ORGANISM: Artificial Sequence
<220> FEATURE:
<223> OTHER INFORMATION: synthetic tpiA gene

<400> SEQUENCE: 13
atggatctta ttcaaaactt aagtaccggc ttcggtgtgg ctttcacttt ccaaaatttg      60
atttattgtt tcgttggttg tcttttaggt actttaattg gcgtacttcc aggcattggt     120
ccagttgcta caattgcaat gttattgcct gcaacctatg ctttaccacc agtggctgca     180
ttgattatgt tggctggtat ctactatggt gcgcagtatg gtggtagtac tactgctatt     240
ttggtaaatc ttccgggtga tcttcttct gtagtcaccg ttatcgatgg ttaccaaatg      300
gctcgtaaag gtcgtgcagg tccagcgctt gctgctgctg gtattggttc tttttcgca     360
ggttgtgttg gtacagtgat cttagcggct ttcgctccac tctcacgga agttgcattc     420
aagtttggac ctgcagagta ttttctctta atgacattgg gtctaattgg tgcagttgtc     480
cttgcttcag gctctttgct caaagcaatt gcaatgatcg tactcggtct tttgcttggc     540
atggttggta cggacgtaaa ttcaggtgta gcgcgttact catttgacat tccagagcta     600
acagatggta ttgattttgt tgtgatcgca atgggtgttt ttggttacgg tgaaattatt     660
gcaaatcttt caaagcctga tgatgaacgt gaggttttg cagcgaaagt gactggtctt     720
cttccaacaa gtgaagactt caaacgtatg ttgccagcaa tgttgcgtgg tacagcatta     780
ggttcagctt aggaattttt gccaggtggt ggtgctatgt tgagtgcatt tgcagcttat     840
acaattgaaa aaaaaccaa attaaaaacct ggtgaagtac catttggtca gggcaatatt     900
cgtggcgttt gcgctccgga atcagcaaac aacgctggta gtcaaacatc tttcattcca     960
ctgttaacat tgggcattcc tccaaacgcc gtaatggctc tcatggtagg cgcaatgact    1020
attcacaaca ttcaaccagg accacaagtg atgacatcta accctgaact attttgggt    1080
cttattgcaa gcatgtggat tggtaatttg atgttaatta ttttgaacct accacttatc    1140
ggtgtgtgga tcaagttgct tacagtacca tatcgttggt tgtttccatc tatcgtatta    1200
ttttgtgcaa ttggtgtgta tggtactaat aacaacgttt gggatgtttg atggtaggt    1260
atttttggtt tcattggtta tgtattccac aagttaggga ctgaacctgc tcctttgttg    1320
ttgggtttca ttttaggtcc aatgatggaa gaaaaccttc gccgtgctct attgctatcg    1380
cgtggcgact ggtctgtatt tgttacgcgt ccaattagtg catgcttact ggcagcggct    1440
gttgtgcttc ttgtaatcgt tcttatgcct gcagttaaga ataaacgtga agaggccttt    1500
gtagaagatt ga                                                         1512

<210> SEQ ID NO 14
<211> LENGTH: 8850
<212> TYPE: DNA
<213> ORGANISM: Artificial Sequence
<220> FEATURE:
<223> OTHER INFORMATION: local chromosomal sequence in strain IP103

<400> SEQUENCE: 14
gtttaaacca aattacgcag ctcattcgca gtattgcgta ataaaggtaa aacttgatcg      60
ataagatact gtggctgcac ccgattggtt tgtgacatac aattaagtgc tgcaatggta     120
agcccctgtg cgtttaaaac gggtaccgca atcgcaatca gacccagttc atgttcctca     180
gtagacaaac agtagtccga ttgccgaaca gcatctaatg tttctaaaaa agtatgttca     240
tcggtaatgg tataaggcgt gaggcgcttc agaccatatt tttcaatcca ttcaatttgt     300
```

-continued

```
acttcacgat ccagaacaga aagtaatact ttaccggtag aggtggcgtg ggcaggcaaa      360
cgattaccca aatgcatccc ataggggctc acgcgaagat tatcttgctg gggtaaataa      420
ctacgcgcaa caggtacaac ttcatgctca tcgagcacca caattgaaaa ggtgaggctg      480
gtttgagcac acagtagatt taaaaatgac tgtgccactt tgggtaaatg tgccgagctt      540
aaataagaac tagaaaaacg taaaacacga tgtgtaagcc aaaaatagtg ctcatcggta      600
tctaaataac ccaaaaattt aagtgtcttt aaataacgcc gtgcagctgt tctgcttata      660
ccagtacgct ctgcaacctg tgtcacgttc agtcgttgtc tgtcaattcc aaatgcttct      720
aaaagcgcta agcctttggc caagcctgca atgtaatctt ccgtacgtat ttcttcactt      780
gaatggggat gtgcaaggta ttggtgatgt tgttccataa cattcaaatc caaaatggtt      840
ttgtccgatc atcggacagt tgtaatgcta atcggataat tttgagcctt gattatagat      900
gtctttttaa tgaggcggta cttttaaaaat agaaaatagc aaggatgatg ttatgcaaac      960
tatgaaaacc aaagttgcaa ttattggttc tgggccagcg ggattactac tcggtcaact     1020
gctttacaaa gctggaattg aacacgttat tgtggaacag cgaagtgccg attacgttgc     1080
atcacgcatt cgtgcaggaa ttttagagca agtatcggtc gatttactcg agcaagctgg     1140
agttgatcag aacctcaaag aaaaaggatt gccacattcg ggcattgaaa ttctgaccaa     1200
tggccaaaaa ttccgtgtcg atttatcggc attgactcaa ggtaaacaag tcacggtata     1260
tgggcagacc gaagttacta aagatttaat gcaagcacgt gagcaggctg gtctttgctc     1320
attttatgaa tcgaatgatg ttcaaattca tgatttttat aatgcgccaa aagtgacttt     1380
tgaatccaac ggaactcact atcaaatcga atgtgatttc attgcaggat gtgatggtta     1440
tcatggcgtg tgccgtgcta gtgtgcctca agataaaatt aaaacctttg aaaaggtcta     1500
tccatttggt tggttaggtg tacttgccga tgtgccgcct gtggcagacg agttaattta     1560
tgttcaatca gagcgtggtt ttgcactgtg tagcatgcgc tcagaaacgc gaagccgata     1620
ttacattcaa gttcctttaa ccgatcacgt agaaaactgg tcggatgatc aattttggga     1680
agagcttaag aatcgcctcg accctgaaag ctgcgaaaaa ctcgttacag gcccttcaat     1740
tgagaaaagt attgcacctt tgcggagctt tgtcacagaa ccgatgcgat ttggaaaatt     1800
attcttagct ggtgatgccg cacatattgt tccaccaacg ggtgccaaag gattgaatct     1860
tgcagcttca gatattgcat atttgtcgag tgcgctcatt gaattttaca cgcaaggatc     1920
tgagcaaggt atagatcaat actcagaaaa atgcttgcaa cgtgtatgga aagcagagcg     1980 ttttttcatgg tggatgaccc atttgttaca tcgctttgaa accgaaagcg agtttgatca     2040
taaaattaaa caagcagaat tgagctatat cttaggttct acggcaggtc agaccacact     2100
cgctgaaaac tatgtgggtt taccctatga aatcaaatcc cttgactatt taaaacatgc     2160
cagctaacca gacatcaaat aaaacgaaag gctcagtcga aagactgggc ctttcgtttt     2220
atctgttgtt tgtcggtgaa cgctctcatt aattaatcca gaggcatgag ctgttgacaa     2280
ttaatcatcg gctcgtataa tgtgtggaat tgtgagcgga taacaatttc acacaggaga     2340
gtctatatat gcgtaacgaa tctatccgtc gtcgtgaagc gttaattggt atcgctgcag     2400
cagttgcagc aactgttca ctcgctcaaa gtaaccaacc actgaaaatc gttgtgcctt     2460
tttctgcagg tggtacagcg gacgtattac cacgtcttgt cgctgaaaaa atccgtgccg     2520
attatgctgg tggtgttatc atcgaaaaca aaccaggtgc aggtggtaat attggtgcag     2580
atctagtttt ccgtgctcca ccagacggta tgacggtttt agcttcacca cctggtccta     2640
tcgctattaa tcacaatctt tatcaaaaat tatctttcga tcctactcgt tgggtaccag     2700
```

```
taaccattct ggcaacagtt cctaacgtac ttgtaattaa cccaaaacta cctgttaaaa    2760
gccttggcga atttatcgca tacgcaaaag caaatccaaa gaaagtaacc gtagcgactc    2820
aaggtgacgg ttctacttca caccttacag cagcaatgtt tatgcaatta actggtacag    2880
aactaactgt tatcccatac aaaggtacag caccagcttt aatcgatctt attggtggta    2940
atgtagacgt gttttcgat aatatcagct cttctgcaac ttatcaccaa gcaggaaaag    3000
ttcgtattct tgcagttgct gatgaacaac gttcacaaat tcttccacaa gttccaacgt    3060
tcgcagaaca acagtggcca gcaatgcaag ctgtgacatt tttctcagta gtggcacctc    3120
ctggtacatc agcagaaatc gcacaaaaac ttcaaaaaca gatggctctt gccctttctt    3180
cgaacgatat tcgtaagcac ttccaggaac aaggtgctgt gccatgtggt tgggatccaa    3240
gtaaaactgc tcaatttatt cgtcaggaaa ccgaaaaatg gaagaaagta ctcaaagcag    3300
caaacgtaaa actttaagag aggaaagcaa tgcaggaaag cattattcaa tggcatggtg    3360
cgaccaacac acgcgttcca tttggtatct atacagatac cgcaaatgct gaccaagaac    3420
aacagcgtat ttaccgtggc gaagtatgga attaccttg tttggaatca gaaatcccag    3480
gagcgggtga ttttcgtacc acatttgcgg gtgaaacacc tattgtcgta gttcgtgatg    3540
ctgatcaaga aatttatgct ttcgaaaatc gttgtgctca ccgtggtgct ttaattgcat    3600
tagaaaagag cggtcgtact gattcttttc aatgtgttta tcatgcatgg tcatataacc    3660
gtcagggtga ccttacgggt gtggctttcg aaaaaggcgt aaaaggtcag ggtggtatgc    3720
cagctagttt ctgtaaagaa gaacatggtc cacgtaaact tcgcgtagca gttttctgcg    3780
gcttggtttt cggttctttt tctgaagacg ttccaagtat tgaagattat ttgggtccgg    3840
aaatttgtga acgtatcgaa cgtgttctcc ataagcctgt agaagttatc ggtcgtttta    3900
ctcagaaatt acctaataac tggaaacttt attttgaaaa tgtaaaagat agctaccatg    3960
catctctttt acacatgttt ttcacaactt tcgaactgaa ccgtttatct cagaaaggcg    4020
gtgttattgt ggatgagtct ggcggccatc atgtatccta tagtatgatt gatcgtgggg    4080
ccaaggatga ttcatataaa gatcaagcta ttcgttctga caatgaacgt tatcgtttga    4140
aagatcctag cttactagaa ggttttgaag aattcgaaga tggtgtaacg cttcaaattc    4200
ttagcgtatt cccagggttt gttttgcaac aaatccaaaa cagtattgca gtgcgtcagt    4260
tattgccaaa aagtatttct agttctgaat tgaactggac ttatttaggt tatgccgatg    4320
atagcgcaga acaacgtaaa gttcgtctta acaagctaa tctgattgga cctgctggat    4380
tcatttcaat ggaagatggt gcagtcggcg gtttcgtgca gcgtggtatt gcaggcgctg    4440
ctaaccttga tgcagtaatc gaaatgggcg tgatcatga aggcagctct gaaggtcgcg    4500
ctactgaaac ttcagtacgt ggcttttgga agcatatcg taaacatatg ggacaagaaa    4560
tgcaggcatg aggagtccct aaacaatgat caatgaaata cagatcgcag catttaatgc    4620
agcatatgca aaaactattg actctgatgc tatggaacaa tggcctacct ttttactaa    4680 agattgccat tattgtgtaa cgaatgtaga taatcatgat gagggtttag ctgctggtat    4740
agtttgggca gattcacagg acatgttgac tgatcgtatc tcagctttgc gtgaagcgaa    4800
catttacgaa cgtcaccgct atcgtcacat cttaggtctg ccatcaattc aatcaggtga    4860
tgcaacgcag gcatcagcta gcacaccttt catggttctt cgtatcatgc atactggcga    4920
aacggaggtt ttcgcatcgg gtgaatatct cgataaattc actactattg atggtaaatt    4980
gcgccttcag gaacgtattg ctgtttgtga ctctacagta accgataccct taatggcatt    5040
```

```
gccattatga aaggaggtaa caatgaacgc aattgttcac cgccgtcttg cacttgcaat    5100
tggtgatcca catggtattg gtcctgaaat cgcattgaaa gctcttcaac agctttcggt    5160
aactgaacgt agcttaatta agtatacgg tccgtggtct gcacttgaac aagcagcacg    5220
cgtttgcgaa atggaaccac tcttacaaga tatcgtacac gaagaagcag gtaccttgac    5280
ccaaccagta cagtggggtg aaattacacc acaagctggt cttagtacag tacaatcagc    5340
tactgctgcg atccgtgcat gtgaaaatgg tgaggtagat gcagttattg cgtgtccaca    5400
ccatgaaact gcaatccacc gtgctggtat cgccttctct ggttatccaa gccttttagc    5460
gaatgtgttg ggtatgaacg aagatcaagt ttttcttatg ttggttggtg ctggtcttcg    5520
tatcgttcat gtgactctac acgaatctgt acgttctgca cttgaacgtc tttctccaca    5580
acttgttgta aatgcagcac aagcagcagt tcaaacctgt acattgcttg gtgttcctaa    5640
accgaaagtg gcagtgttcg gcattaaccc acatgcatca gaaggtcaac ttttcggctt    5700
ggaagatagc caaattaccg ttccagcagt tgaaaccctt cgtaaacgtg gtctagctgt    5760
tgatggtcca atgggtgcgg atatggtact ggcacaacgt aaacatgatt tatatgttgc    5820
gatgcttcat gatcagggtc atataccaat taaacttctt gcaccaaatg gtgcgagtgc    5880
tctctcaatc ggtggtcgtg ttgtattgtc atcagttgga cacggcagcg caatggacat    5940
cgctggccgt ggcgtagctg atgccactgc tcttttacgt accattgctc ttcttggcgc    6000
tcagccagtt tgaggtccct cccaaatgaa ccatcaaatc cacatccatg actcagatat    6060
tgcatttcca tgtgcacctg gtcaatcagt tttggatgcg gccttacaag caggtatcga    6120
attgccttat agctgccgta aaggttcatg tgggaattgt gcaagtactc ttttagatgg    6180
taatattgca tctttcaacg gtatggctgt tcgtaatgaa ttatgtgcgt ctgaacaagt    6240
gttattgtgt ggttgcacgg cggcatctga tatacgtatt catccttctt ctttccgtcg    6300
tcttgaccca gaagctcgta acgtttcac tgctaaggta tattcaaata ctcttgctgc    6360
tccagatgta tctcttctcc gtctccgttt acctgttggt aaacgtgcta atttgaagc    6420 tggtcaatat ttactaatcc acttagatga cggtgagagc cgtagctaca gcatggcaaa    6480
tccaccacat gaatctgatg gtatcacctt acatgttcgt catgttccag gtgggcgttt    6540
tagtactatt gtacaacaat tgaaatcagg agatactttg gacattgaat tacctttttgg   6600 ttctattgcg cttaaacctg atgacgctcg tcctctgatc tgtgtagctg gtggtaccgg    6660
ctttgctcca atcaaatccg ttttagacga tctcgcgaaa cgtaaagtac agcgcgatat    6720
cacacttatc tggggcgcac gcaatccatc tggcttatat cttccatcag ctatcgataa    6780
gtggcgtaag gtatggccac aattccgtta catcgccgct atcactgatc ttgggatat    6840 gccagctgat gcacacgctg gtcgtgtgga cgacgcatta cgtactcatt ttggtaatct    6900
gcatgatcat gttgttcatt gttgtggttc gcctgctcta gttcaaagtg tccgtacagc    6960
cgcctcggac atgggtctac tagcgcaaga tttccatgca gatgtatttg caactggtcc    7020
tacaggtcac cactagggtt aaaacaaaaa gagagcgatt agtcgctctc ttttttatct    7080
cggctgtgtt tatttacaag tgaaattctc ggctttttca ctgtcacctg taccgttata    7140
acgtgcgatt tttggatatg gacatagtgg tcgagttcga ttggccgacc agctcgatgg    7200
taactcgcta ttgatttcgc cacttgcatt accgacaccg cgtgcagaag cgagaatttg    7260
atctggtgct tgaccatatt ctacccagtt caccaaagca gtaagtgcat caaactggtc    7320
ggtcgcaagc ccaccccgcg aatgattcat tcccggaacg cgataaaaac gagcaaaact    7380
ttgtgcgtca cccaaactgc tgctcttgta ttttgccatc agtttatcgt accagttttg    7440
```

```
tgtgtcatct accgaaaata cgccatctgc tgtgccttgc accacaatca ttttaccgcc   7500
atgcaagcgt aatttatcca gattgagctc atctggcggg atcataaatg acatcgcgct   7560
ttctgaatag gtcgaattgg ttgcagaaag ttttgggtaa tctgtatcaa aattatagtt   7620
aaaggcaaat tttcgtgaat tttgcacaat tgttggatct ggtggtacct gaaatataat   7680
gcctaccgct accgggtcgc gtgccgtacc cacagaagaa acaaatttcc agcttgccca   7740
attgctgcca gtaatcccg gatcgtaagg ctgggtcgca tacaatgctt cgccagatga    7800
attgacaggg ccgcggtaaa tattagccac gacatcgatc tggtctttac tcaaacagct   7860
tccatcacgt gaacccgagc agacaggcac atctttatga atatcaaagg cggttcgaca   7920
ggcttcaacg tcttgtacca taccatctgc tacaccatcg agtgcatcac agcgtgttaa   7980
aatcgcattg gcaagtacgt tacgttctgc ataggtgagt gcagtgctta aatcattttc   8040
atcggtggca acacgacgta attgctgcgc cgtgtatagc tgtgccgctg ctgcacgtgg   8100
tagatgaaat ccgggtgtgc ttgccaagat gccatcgtac tgatcgccta ggcgtgttgc   8160
agccatcatg gcatgtcgac cgccgttaga cgtacctcct gcataagatc gatctggcaa   8220
tttaccgtaa gctgttttaa tcagatcttt ggccataggc gttaactttg taatagcacc   8280
ataaccatag ttgatgcgag cttgcggatc taaaccaaaa agaggatttt gtgcagatga   8340
atgtccggca tcggatgaaa ttaccgcgaa tccgtctttt aaagcattgc ttaacatccc   8400
gccgctgccc acttgtccgg tcgctgtggc gatgttgccg tcggtaccgc catttccttg   8460
atatagaaaa cgtccgttcc agctcaccgg aagtcgcatt tcaaagccaa tctgataggt   8520
ttgaccatcg attgggctaa tacgttgctc catataacct ttgaccaaac aatgcgccgg   8580 aatattttc cccacgacgg tcagagcgcc tgcattttgt aaagttgcac tttcaactac    8640
ggtggtatca aatttgaaac cgcttaaatc tgtacaactg cctttgagct gagcacctac   8700
tgctgggctt aattgtggaa tactttggct cgactgtgcc gtatcatgat cgttattgtc   8760
attacatgca gctacactga tgcagacgcc gagcaatgca gcatgtttaa aaaaatgttg   8820
aggttttttc attgcaatat ccttatgcct                                    8850
```

<210> SEQ ID NO 15
<211> LENGTH: 13236
<212> TYPE: DNA
<213> ORGANISM: Artificial Sequence
<220> FEATURE:
<223> OTHER INFORMATION: nucleotide sequence of the local chromosomal
      sequence in strain IP131

<400> SEQUENCE: 15

```
gtttaaacca aattacgcag ctcattcgca gtattgcgta ataaaggtaa aacttgatcg     60
ataagatact gtggctgcac ccgattggtt tgtgacatac aattaagtgc tgcaatggta    120
agcccctgtg cgtttaaaac gggtaccgca atcgcaatca gacccagttc atgttcctca    180
gtagacaaac agtagtccga ttgccgaaca gcatctaatg tttctaaaaa agtatgttca    240
tcggtaatgg tataaggcgt gaggcgcttc agaccatatt tttcaatcca ttcaatttgt    300
acttcacgat ccagaacaga aagtaatact ttaccggtag aggtggcgtg ggcaggcaaa    360
cgattaccca aatgcatccc atagggctc acgcgaagat tatcttgctg gggtaaataa     420
ctacgcgcaa caggtacaac ttcatgctca tcgagcacca caattgaaaa ggtgaggctg    480
gtttgagcac acagtagatt taaaaatgac tgtgccactt tgggtaaatg tgccgagctt    540
aaataagaac tagaaaaacg taaaacacga tgtgtaagcc aaaaatagtg ctcatcggta    600
```

-continued

```
tctaaataac ccaaaaattt aagtgtcttt aaataacgcc gtgcagctgt tctgcttata      660
ccagtacgct ctgcaacctg tgtcacgttc agtcgttgtc tgtcaattcc aaatgcttct      720
aaaagcgcta agcctttggc caagcctgca atgtaatctt ccgtacgtat ttcttcactt      780
gaatggggat gtgcaaggta ttggtgatgt tgttccataa cattcaaatc caaaatggtt      840
ttgtccgatc atcggacagt tgtaatgcta atcggataat tttgagcctt gattatagat      900 gtcttttaa tgaggcggta ctttaaaaat agaaaatagc aaggatgatg ttatgcaaac       960
tatgaaaacc aaagttgcaa ttattggttc tggcccagcg ggattactac tcggtcaact     1020
gctttacaaa gctggaattg aacacgttat tgtggaacag cgaagtgccg attacgttgc     1080
atcacgcatt cgtgcaggaa ttttagagca agtatcggtc gatttactcg agcaagctgg     1140
agttgatcag aacctcaaag aaaaggatt gccacattcg ggcattgaaa ttctgaccaa      1200
tggccaaaaa ttccgtgtcg atttatcggc attgactcaa ggtaaacaag tcacggtata     1260
tgggcagacc gaagttacta agatttaat gcaagcacgt gagcaggctg gtctttgctc      1320
attttatgaa tcgaatgatg ttcaaattca tgattttat aatgcgccaa aagtgacttt      1380
tgaatccaac ggaactcact atcaaatcga atgtgatttc attgcaggat gtgatggtta     1440
tcatggcgtg tgccgtgcta gtgtgcctca agataaaatt aaaacctttg aaaaggtcta     1500
tccatttggt tggttaggtg tacttgccga tgtgccgcct gtggcagacg agttaattta     1560
tgttcaatca gagcgtggtt ttgcactgtg tagcatgcgc tcagaaacgc gaagccgata     1620
ttacattcaa gttcctttaa ccgatcacgt agaaaactgg tcggatgatc aattttggga     1680
agagcttaag aatcgcctcg accctgaaag ctgcgaaaaa ctcgttacag gcccttcaat     1740
tgagaaaagt attgcacctt tgcggagctt tgtcacagaa ccgatgcgat ttggaaaatt     1800
attcttagct ggtgatgccg cacatattgt tccaccaacg ggtgccaaag gattgaatct     1860
tgcagcttca gatattgcat atttgtcgag tgcgctcatt gaattttaca cgcaaggatc     1920
tgagcaaggt atagatcaat actcagaaaa atgcttgcaa cgtgtatgga aagcagagcg     1980
tttttcatgg tggatgaccc atttgttaca tcgctttgaa accgaaagcg agtttgatca     2040
taaaattaaa caagcagaat tgagctatat cttaggttct acggcaggtc agaccacact     2100
cgctgaaaac tatgtggggtt taccctatga aatcaaatcc cttgactatt taaaacatgc     2160
cagctaacca gacatcaaat aaaacgaaag gctcagtcga aagactgggc ctttcgtttt     2220
atctgttgtt tgtcggtgaa cgctctcatt aattaatcca gaggcatgag ctgttgacaa     2280
ttaatcatcg gctcgtataa tgtgtggaat tgtgagcgga taacaatttc acacaggaga     2340
gtctatatat gcgtaacgaa tctatccgtc gtcgtgaagc gttaattggt atcgctgcag     2400
cagttgcagc aactggttca ctcgctcaaa gtaaccaacc actgaaaatc gttgtgcctt     2460
tttctgcagg tggtacagcg gacgtattac cacgtcttgt cgctgaaaaa atccgtgccg     2520
attatgctgg tggtgttatc atcgaaaaca accaggtgc aggtggtaat attggtgcag      2580
atctagtttt ccgtgctcca ccagacggta tgacggtttt agcttcacca cctggtccta     2640
tcgctattaa tcacaatctt tatcaaaaat tatctttcga tcctactcgt tgggtaccag     2700
taaccattct ggcaacagtt cctaacgtac ttgtaattaa cccaaaacta cctgttaaaa     2760
gccttggcga atttatcgca tacgcaaaag caaatccaaa gaaagtaacc gtagcgactc     2820
aaggtgacgg ttcacttca cacttacag cagcaatgtt tatgcaatta actggtacag       2880
aactaactgt tatcccatac aaaggtacag caccagcttt aatcgatctt attggtggta     2940
```

-continued

| | |
|---|---|
| atgtagacgt gttttcgat aatatcagct cttctgcaac ttatcaccaa gcaggaaaag | 3000 |
| ttcgtattct tgcagttgct gatgaacaac gttcacaaat tcttccacaa gttccaacgt | 3060 |
| tcgcagaaca acagtggcca gcaatgcaag ctgtgacatt tttctcagta gtggcacctc | 3120 |
| ctggtacatc agcagaaatc gcacaaaaac ttcaaaaaca gatggctctt gcccttctt | 3180 |
| cgaacgatat tcgtaagcac ttccaggaac aaggtgctgt gccatgtggt tgggatccaa | 3240 |
| gtaaaactgc tcaatttatt cgtcaggaaa ccgaaaaatg gaagaaagta ctcaaagcag | 3300 |
| caaacgtaaa actttaagag aggaaagcaa tgcaggaaag cattattcaa tggcatggtg | 3360 |
| cgaccaacac acgcgttcca tttggtatct atacagatac cgcaaatgct gaccaagaac | 3420 |
| aacagcgtat ttaccgtggc gaagtatgga attaccttg tttggaatca gaaatcccag | 3480 |
| gagcgggtga tttcgtacc acatttgcgg gtgaaacacc tattgtcgta gttcgtgatg | 3540 |
| ctgatcaaga aatttatgct ttcgaaaatc gttgtgctca ccgtggtgct ttaattgcat | 3600 |
| tagaaaagag cggtcgtact gattcttttc aatgtgttta tcatgcatgg tcatataacc | 3660 |
| gtcagggtga ccttacgggt gtggctttcg aaaaaggcgt aaaaggtcag ggtggtatgc | 3720 |
| cagctagttt ctgtaaagaa gaacatggtc cacgtaaact tcgcgtagca gttttctgcg | 3780 |
| gcttggtttt cggttctttt tctgaagacg ttccaagtat tgaagattat ttgggtccgg | 3840 |
| aaatttgtga acgtatcgaa cgtgttctcc ataagcctgt agaagttatc ggtcgtttta | 3900 |
| ctcagaaatt acctaataac tggaaacttt attttgaaaa tgtaaaagat agctaccatg | 3960 |
| catctctttt acacatgttt ttcacaactt tcgaactgaa ccgtttatct cagaaaggcg | 4020 |
| gtgttattgt ggatgagtct ggcggccatc atgtatccta tagtatgatt gatcgtgggg | 4080 |
| ccaaggatga ttcatataaa gatcaagcta ttcgttctga caatgaacgt tatcgttttga | 4140 |
| aagatcctag cttactagaa ggttttgaag aattcgaaga tggtgtaacg cttcaaattc | 4200 |
| ttagcgtatt cccagggttt gttttgcaac aaatccaaaa cagtattgca gtgcgtcagt | 4260 |
| tattgccaaa aagtatttct agttctgaat tgaactggac ttatttaggt tatgccgatg | 4320 |
| atagcgcaga acaacgtaaa gttcgtctta acaagctaaa tctgattgga cctgctggat | 4380 |
| tcatttcaat ggaagatggt gcagtcggcg gtttcgtgca gcgtggtatt gcaggcgctg | 4440 |
| ctaaccttga tgcagtaatc gaaatgggcg gtgatcatga aggcagctct gaaggtcgcg | 4500 |
| ctactgaaac ttcagtacgt ggcttttgga aagcatatcg taaacatatg ggacaagaaa | 4560 |
| tgcaggcatg aggagtccct aaacaatgat caatgaaata cagatcgcag catttaatgc | 4620 |
| agcatatgca aaaactattg actctgatgc tatggaacaa tggcctacct tttttactaa | 4680 |
| agattgccat tattgtgtaa cgaatgtaga taatcatgat gagggtttag ctgctggtat | 4740 |
| agtttgggca gattcacagg acatgttgac tgatcgtatc tcagctttgc gtgaagcgaa | 4800 |
| catttacgaa cgtcaccgct atcgtcacat cttaggtctg ccatcaattc aatcaggtga | 4860 |
| tgcaacgcag gcatcagcta gcacacctt catggttctt cgtatcatgc atactggcga | 4920 |
| aacggaggtt ttcgcatcgg gtgaatatct cgataaattc actactattg atggtaaatt | 4980 |
| gcgccttcag gaacgtattg ctgtttgtga ctctacagta accgatacct taatggcatt | 5040 |
| gccattatga aaggaggtaa caatgaacgc aattgttcac cgccgtcttg cacttgcaat | 5100 |
| tggtgatcca catggtattg gtcctgaaat cgcattgaaa gctcttcaac agctttcggt | 5160 |
| aactgaacgt agcttaatta agtatacgg tccgtggtct gcacttgaac aagcagcacg | 5220 |
| cgtttgcgaa atggaaccac tcttacaaga tatcgtacac gaagaagcag gtaccttgac | 5280 |
| ccaaccagta cagtggggtg aaattacacc acaagctggt cttagtacag tacaatcagc | 5340 |

```
tactgctgcg atccgtgcat gtgaaaatgg tgaggtagat gcagttattg cgtgtccaca    5400
ccatgaaact gcaatccacc gtgctggtat cgccttctct ggttatccaa gccttttagc    5460
gaatgtgttg ggtatgaacg aagatcaagt ttttcttatg ttggttggtg ctggtcttcg    5520
tatcgttcat gtgactctac acgaatctgt acgttctgca cttgaacgtc tttctccaca    5580
acttgttgta aatgcagcac aagcagcagt tcaaacctgt acattgcttg gtgttcctaa    5640
accgaaagtg gcagtgttcg gcattaaccc acatgcatca aaggtcaac ttttcggctt    5700 ggaagatagc caaattaccg ttccagcagt tgaaaccctt cgtaaacgtg gtctagctgt    5760
tgatggtcca atgggtgcgg atatggtact ggcacaacgt aaacatgatt tatatgttgc    5820
gatgcttcat gatcagggtc ataccaat aaaacttctt gcaccaaatg gtgcgagtgc    5880
tctctcaatc ggtggtcgtg ttgtattgtc atcagttgga cacggcagcg caatggacat    5940
cgctggccgt ggcgtagctg atgccactgc tcttttacgt accattgctc ttcttggcgc    6000
tcagccagtt tgaggtccct cccaaatgaa ccatcaaatc cacatccatg actcagatat    6060
tgcatttcca tgtgcacctg gtcaatcagt tttggatgcg gccttacaag caggtatcga    6120
attgccttat agctgccgta aaggttcatg tgggaattgt gcaagtactc ttttagatgg    6180
taatattgca tctttcaacg gtatggctgt tcgtaatgaa ttatgtgcgt ctgaacaagt    6240
gttattgtgt ggttgcacgg cggcatctga tatacgtatt catccttctt ctttccgtcg    6300
tcttgaccca gaagctcgta aacgtttcac tgctaaggta tattcaaata ctcttgctgc    6360
tccagatgta tctcttctcc gtctccgttt acctgttggt aaacgtgcta atttgaagc    6420 tggtcaatat ttactaatcc acttagatga cggtgagagc cgtagctaca gcatggcaaa    6480
tccaccacat gaatctgatg gtatcacctt acatgttcgt catgttccag gtgggcgttt    6540
tagtactatt gtacaacaat tgaaatcagg agatactttg acattgaat taccttttgg    6600 ttctattgcg cttaaacctg atgacgctcg tcctctgatc tgtgtagctg gtggtaccgg    6660
ctttgctcca atcaaatccg ttttagacga tctcgcgaaa cgtaaagtac agcgcgatat    6720
cacacttatc tggggcgcac gcaatccatc tggcttatat cttccatcag ctatcgataa    6780
gtggcgtaag gtatggccac aattccgtta catcgccgct atcactgatc ttggggatat    6840
gccagctgat gcacacgctg gtcgtgtgga cgacgcatta cgtactcatt ttggtaatct    6900
gcatgatcat gttgttcatt gttgtggttc gcctgctcta gttcaaagtg tccgtacagc    6960
cgcctcggac atgggtctac tagcgcaaga tttccatgca gatgtatttg caactggtcc    7020
tacaggtcac cactagcgga acggcgatgt gaaaattaaa agtcaaaaag atttttttc    7080 tggtttgatg ttccttgcag ttggtttagc atttgcaatt ggtgcttcaa attatactat    7140
tggtactggt gctcgtatgg gtccaggtta ttccctctt atacttggtg tactgatggc    7200
gattctaggt gcagctatct gtgttggtgg tcttactaaa ggtccagagg gtggtgataa    7260
aattggtaaa tggcatggc gtcaagtttt ttttatcttg gcagcaaatt ttgcattcgg    7320
cattttgtta gtgggtgtac cagcagttgg tattccacaa tttggtctta ttatcgcaat    7380
ttatgcgtta gtcttcatcg cgtctttggg tggccactct ttcaacttca aagaaaccgc    7440
gatccttgca acggtgcttg cagttggttc ttacttcgct tttgtttggg cattaaactt    7500
acaattccca gtatggccat catttatcgc gggttaaccg gtaagcggca tggatcttat    7560
tcaaaactta agtaccggct tcggtgtggc tttcactttc caaaatttga tttattgttt    7620
cgttggttgt cttttaggta ctttaattgg cgtacttcca ggcattggtc cagttgctac    7680
```

```
aattgcaatg ttattgcctg caacctatgc tttaccacca gtggctgcat tgattatgtt    7740
ggctggtatc tactatggtg cgcagtatgg tggtagtact actgctattt tggtaaatct    7800
tccgggtgaa tcttcttctg tagtcaccgt tatcgatggt taccaaatgg ctcgtaaagg    7860
tcgtgcaggt ccagcgcttg ctgctgctgg tattggttct tttttcgcag gttgtgttgg    7920
tacagtgatc ttagcggctt cgctccacc tctcacggaa gttgcattca agtttggacc    7980
tgcagagtat ttttctttaa tgacattggg tctaattggt gcagttgtcc ttgcttcagg    8040
ctctttgctc aaagcaattg caatgatcgt actcggtctt ttgcttggca tggttggtac    8100
ggacgtaaat tcaggtgtag cgcgttactc atttgacatt ccagagctaa cagatggtat    8160
tgattttgtt gtgatcgcaa tgggtgtttt tggttacggt gaaattattg caaatctttc    8220
aaagcctgat gatgaacgtg aggttttgc agcgaaagtg actggtcttc ttccaacaag    8280
tgaagacttc aaacgtatgt tgccagcaat gttgcgtggc acagcattag gttcagcttt    8340
aggaattttg ccaggtggtg gtgctatgtt gagtgcattt gcagcttata caattgaaaa    8400
aaaaaccaaa ttaaaacctg gtgaagtacc atttggtcag gcaatattc gtggcgtttg    8460
cgctccggaa tcagcaaaca cgctggtag tcaaacatct ttcattccac tgttaacatt    8520
gggcattcct ccaaacgccg taatggctct catggtaggc gcaatgacta ttcacaacat    8580
tcaaccagga ccacaagtga tgacatctaa ccctgaacta ttttggggtc ttattgcaag    8640
catgtggatt ggtaatttga tgttaattat tttgaaccta ccacttatcg gtgtgtggat    8700
caagttgctt acagtaccat atcgttggtt gtttccatct atcgtattat tttgtgcaat    8760
tggtgtgtat ggtactaata acaacgtttg ggatgtttgg atggtaggta tttttggttt    8820
cattggttat gtattccaca gttagggac tgaacctgct cctttgttgt tgggtttcat    8880
tttaggtcca atgatggaag aaaaccttcg ccgtgctcta ttgctatcgc gtggcgactg    8940
gtctgtattt gttacgcgtc caattagtgc atgcttactg gcagcggctg ttgtgcttct    9000
tgtaatcgtt cttatgcctg cagttaagaa taaacgtgaa gaggcctttg tagaagattg    9060
aactagttct agagcggccg ccaccgcggt ggagctcggt acgatccggt gattgattga    9120
gcaagcttta tgcttgtaaa ccgttttgtg aaaaaatttt taaaataaaa aaggggacct    9180
ctagggtccc caattaatta gtaatataat ctattaaagg tcattcaaaa ggtcatccac    9240
cggatcaatt ccctgctcg cgcaggctgg gtgccaagct ctcgggtaac atcaaggccc    9300
gatccttgga gcccttgccc tcccgcacga tgatcgtgcc gtgatcgaaa tccagatcct    9360
tgacccgcag ttgcaaaccc tcactgatcc gtcgaccaaa cgcggccatcg tgcctcccca    9420
ctcctgcagt tcggggcat ggatgcgcgg atagccgctg ctggtttcct ggatgccgac    9480
ggatttgcac tgccggtaga actccgcgag gtcgtccagc tcaggcagc agctgaacca    9540
actcgcgagg ggatcgagcc cggggtgggc gaagaactcc agcatgagat ccccgcgctg    9600
gaggatcatc cagccggcgt cccggaaaac gattccgaag cccaaccttt catagaaggc    9660
ggcggtggaa tcgaaatctc gtgatggcag gttggcgtc gcttggtcgg tcatttcgaa    9720
ccccagagtc ccgctcagaa gaactcgtca agaaggcgat agaaggcgat gcgctgcgaa    9780
tcggagcgg cgataccgta aagcacgagg aagcggtcag cccattcgcc gccaagctct    9840
tcagcaatat cacgggtagc caacgctatg tcctgatagc ggtccgccac acccagccgg    9900
ccacagtcga tgaatccaga aaagcggcca ttttccacca tgatattcgg caagcaggca    9960
tcgccatggg tcacgacgag atcctcgccg tgggcatgc gcgccttgag cctggcgaac   10020
agttcggctg gcgcgagccc ctgatgctct tcgtccagat catcctgatc gacaagaccg   10080
```

```
gcttccatcc gagtacgtgc tcgctcgatg cgatgtttcg cttggtggtc gaatgggcag   10140
gtagccggat caagcgtatg cagccgccgc attgcatcag ccatgatgga tactttctcg   10200
gcaggagcaa ggtgagatga caggagatcc tgccccggca cttcgcccaa tagcagccag   10260
tcccttcccg cttcagtgac aacgtcgagc acagctgcgc aaggaacgcc cgtcgtggcc   10320
agccacgata gccgcgctgc ctcgtcctgc agttcattca gggcaccgga caggtcggtc   10380
ttgacaaaaa gaaccgggcg cccctgcgct gacagccgga acacggcggc atcagagcag   10440
ccgattgtct gttgtgccca gtcatagccg aatagcctct ccacccaagc ggccggagaa   10500
cctgcgtgca atccatcttg ttcaatcatg cgaaacgatc ctcatcctgt ctcttgatca   10560
gatcttgatc ccctgcgcca tcagatcctt ggcggcaaga aagccatcca gtttactttg   10620
cagggcttcc caaccttacc agagggcgcc ccagctggca attccggttc gcttgctgtc   10680
cataaaaccg cccagtctag ctatcgccat gtaagcccac tgcaagctac ctgctttctc   10740
tttgcgcttg cgttttccct tgtccagata gcccagtagc tgacattcat ccggggtcag   10800
caccgtttct gcggactggc tttctacgtg ttccgcttcc tttagcagcc cttgcgccct   10860
gagtgcttgc ggcagcgtga agctcgcgca gatcagttgg aagaatttgt ccactacgtg   10920
aaaggcgaga tcaccaaggt agtcggcaaa taatgtctaa caattcgttc aagccgacgc   10980
cgcttcgcgg cgcggcttaa ctcaagcgtt agatgcacta agcacataat tgctcacagc   11040
caaactatca ggtcaagtct gcttttatta tttttaagcg tgcataataa gccctacaca   11100
aattgggaga tatatcatga aaggctggct ttttcttgtt atcgcaatag ttggcgaagt   11160
aatcgcaaca tccgcattaa aatctagcga gggctttact aagctgatcc ggtggatgac   11220
cttttgaatg accttttaata gattatatta ctaattaatt ggggacccta gaggtcccct   11280
ttttattttt aaaattttt tcacaaaacg gtttacaagc ataaagcttg ctcaatcaat   11340
caccggatct accgggcccc ccctcgaggt cgacggtatc gataagcttg atatcgaatt   11400
cctgcagccc ggggggatcca ctagttaaaa caaaaagaga gcgattagtc gctctctttt   11460
ttatctcggc tgtgtttatt tacaagtgaa attctcggct ttttcactgt cacctgtacc   11520
gttataacgt gcgattttttg gatatggaca tagtggtcga gttcgattgg ccgaccagct   11580
cgatggtaac tcgctattga tttcgccact tgcattaccg acaccgcgtg cagaagcgag   11640
aatttgatct ggtgcttgac catattctac ccagttcacc aaagcagtaa gtgcatcaaa   11700
ctggtcggtc gcaagcccac cccgcgaatg attcattccc ggaacgcgat aaaaacgagc   11760
aaaactttgt gcgtcaccca aactgctgct cttgtatttt gccatcagtt tatcgtacca   11820
gttttgtgtg tcatctaccg aaaatacgcc atctgctgtg ccttgcacca caatcatttt   11880
accgccatgc aagcgtaatt tatccagatt gagctcatct ggcgggatca taaatgcat   11940 cgcgctttct gaataggtcg aattggttgc agaaagtttt gggtaatctg tatcaaaatt   12000
atagttaaag gcaaatttc gtgaattttg cacaattgtt ggatctggtg gtacctgaaa   12060
tataatgcct accgctaccg ggtcgcgtgc cgtacccaca gaagaaacaa atttccagct   12120
tgcccaattg ctgccaagta atcccggatc gtaaggctgg gtcgcataca atgcttcgcc   12180
agatgaattg acagggccgc ggtaaatatt agccacgaca tcgatctggt ctttactcaa   12240
acagcttcca tcacgtgaac ccgagcagac aggcacatct ttatgaatat caaaggcggt   12300
tcgacaggct tcaacgtctt gtaccatacc atctgctaca ccatcgagtg catcacagcg   12360
tgttaaaatc gcattggcaa gtacgttacg ttctgcatag gtgagtgcag tgcttaaatc   12420
```

```
-continued attttcatcg gtggcaacac gacgtaattg ctgcgccgtg tatagctgtg ccgctgctgc   12480
acgtggtaga tgaaatccgg gtgtgcttgc caagatgcca tcgtactgat cgcctaggcg   12540
tgttgcagcc atcatggcat gtcgaccgcc gttagacgta cctcctgcat aagatcgatc   12600
tggcaattta ccgtaagctg ttttaatcag atctttggcc ataggcgtta actttgtaat   12660
agcaccataa ccatagttga tgcgagcttg cggatctaaa ccaaaaagag gattttgtgc   12720
agatgaatgt ccggcatcgg atgaaattac cgcgaatccg tcttttaaag cattgcttaa   12780
catcccgccg ctgcccactt gtccggtcgc tgtggcgatg ttgccgtcgg taccgccatt   12840
tccttgatat agaaaacgtc cgttccagct caccggaagt cgcatttcaa agccaatctg   12900
ataggtttga ccatcgattg ggctaatacg ttgctccata taacctttga ccaaacaatg   12960
cgccggaata tttttcccca cgacggtcag agcgcctgca ttttgtaaag ttgcactttc   13020
aactacggtg gtatcaaatt tgaaaccgct taaatctgta caactgcctt tgagctgagc   13080
acctactgct gggcttaatt gtggaatact ttggctcgac tgtgccgtat catgatcgtt   13140
attgtcatta catgcagcta cactgatgca gacgccgagc aatgcagcat gtttaaaaaa   13200
atgttgaggt tttttcattg caatatcctt atgcct                            13236
```